Sept. 17, 1940.     W. W. HARTMAN     2,215,036
COMBINATION BREAD SLICING AND WRAPPING MACHINE
Filed July 31, 1937     28 Sheets-Sheet 2
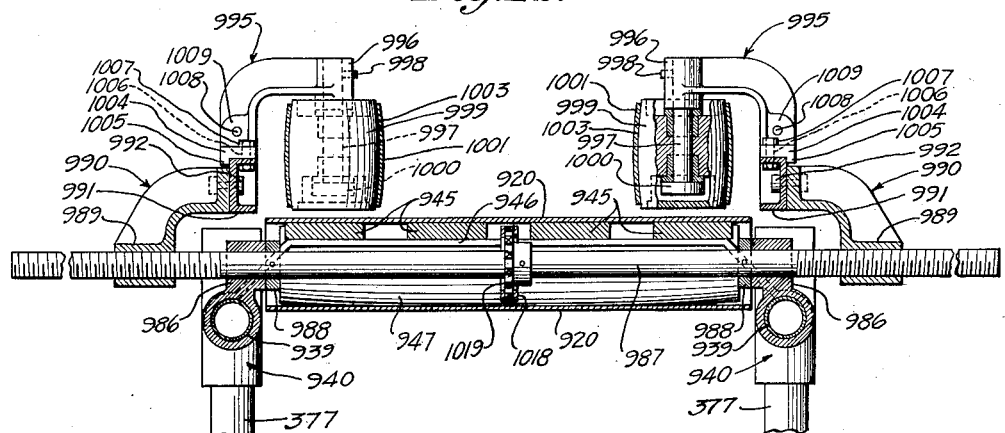
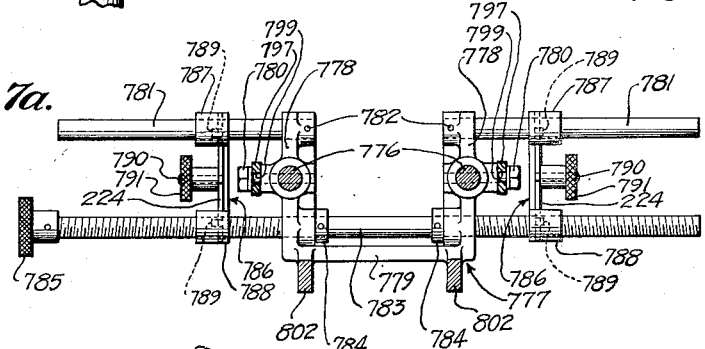
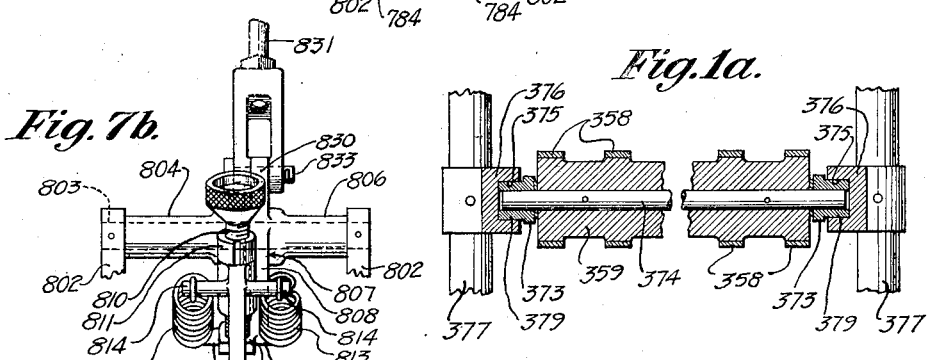
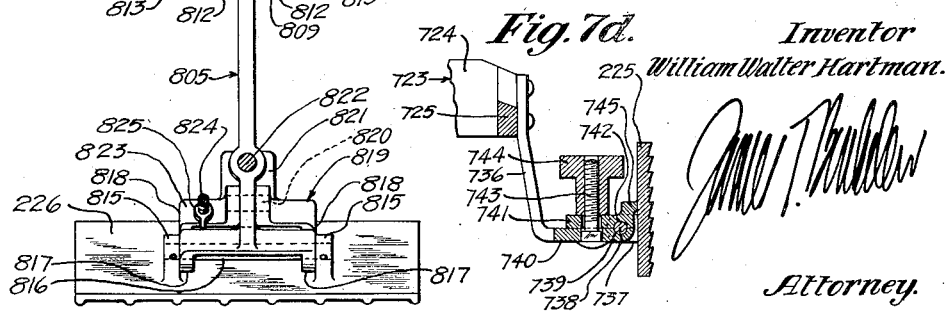
Inventor
William Walter Hartman.
Attorney.

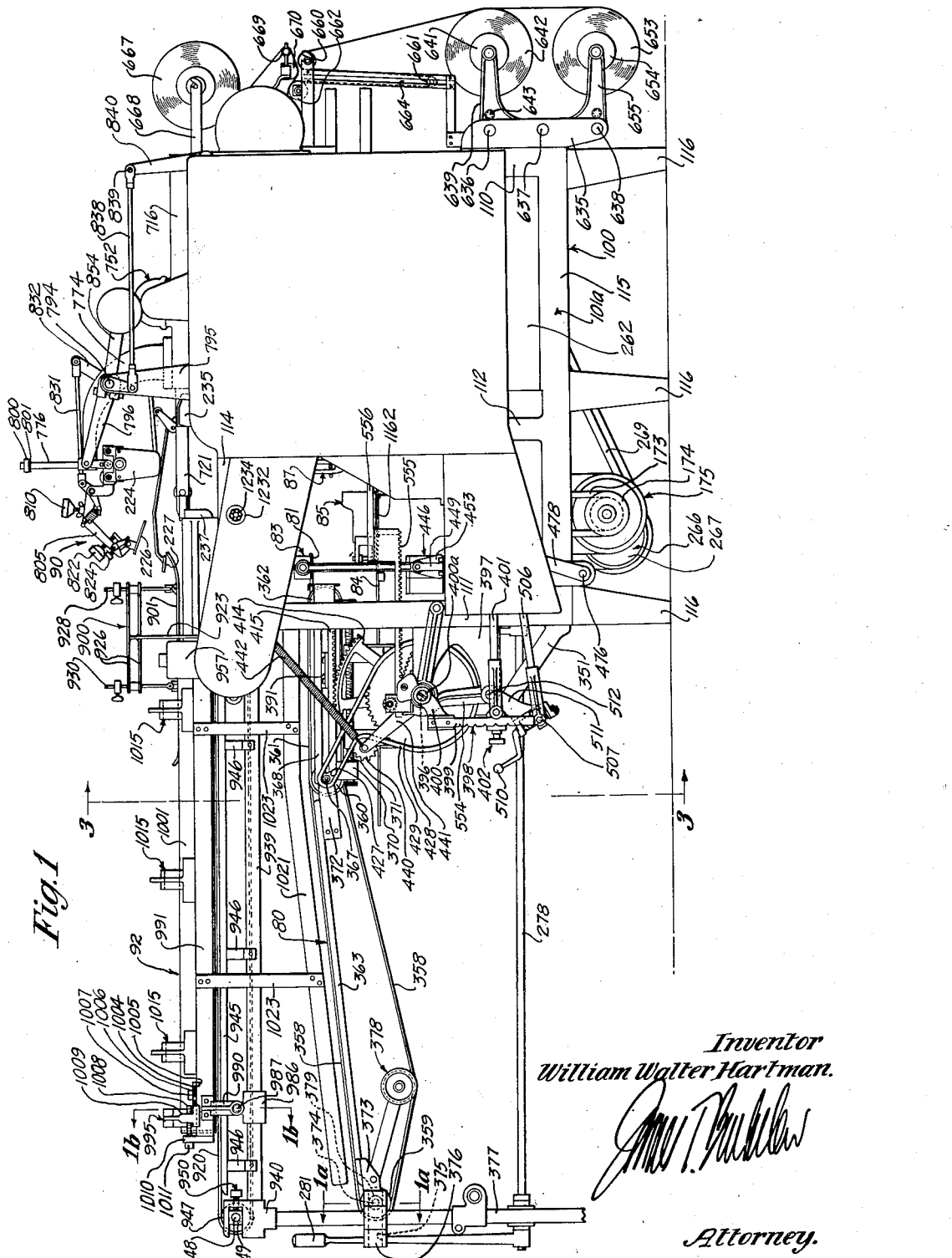

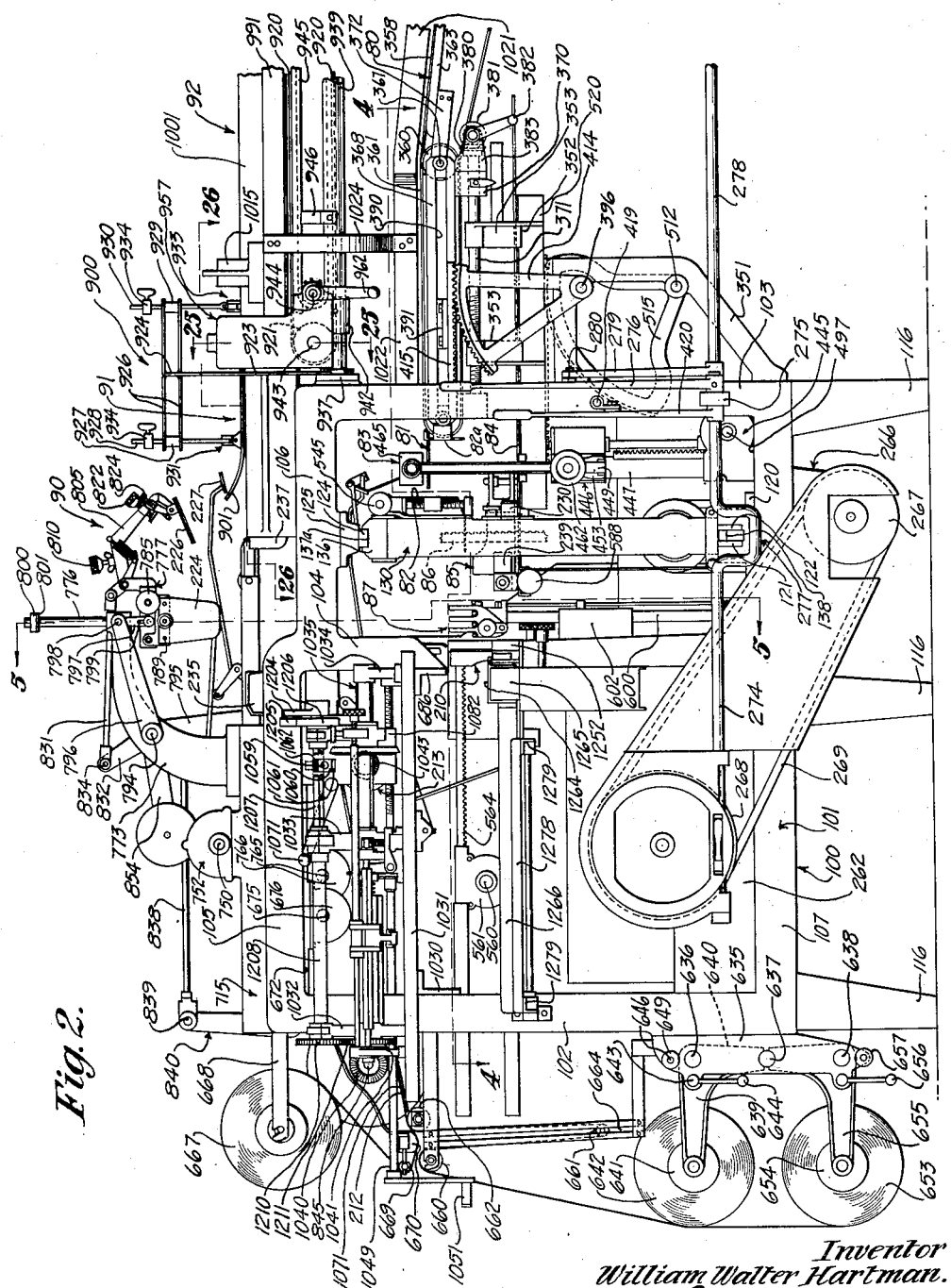

Sept. 17, 1940.  W. W. HARTMAN  2,215,036
COMBINATION BREAD SLICING AND WRAPPING MACHINE
Filed July 31, 1937  28 Sheets-Sheet 4
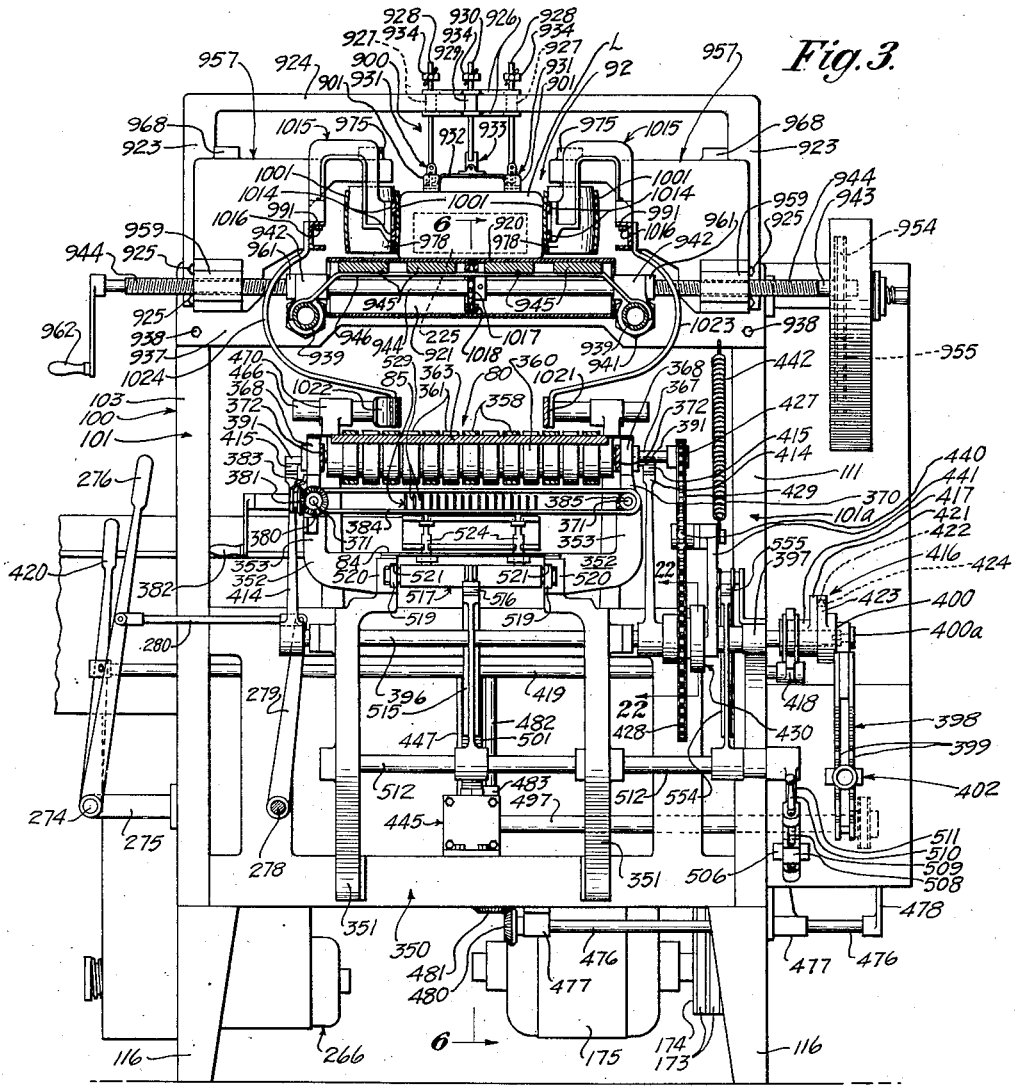
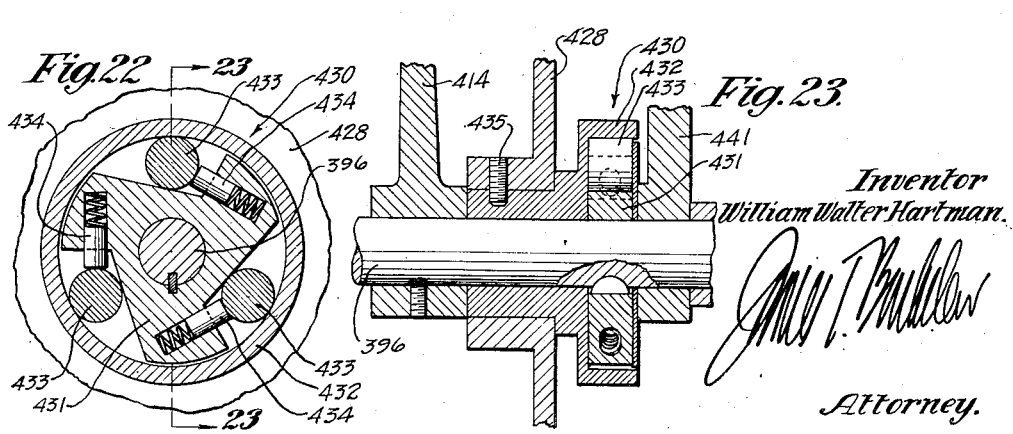
Inventor
William Walter Hartman
Attorney.

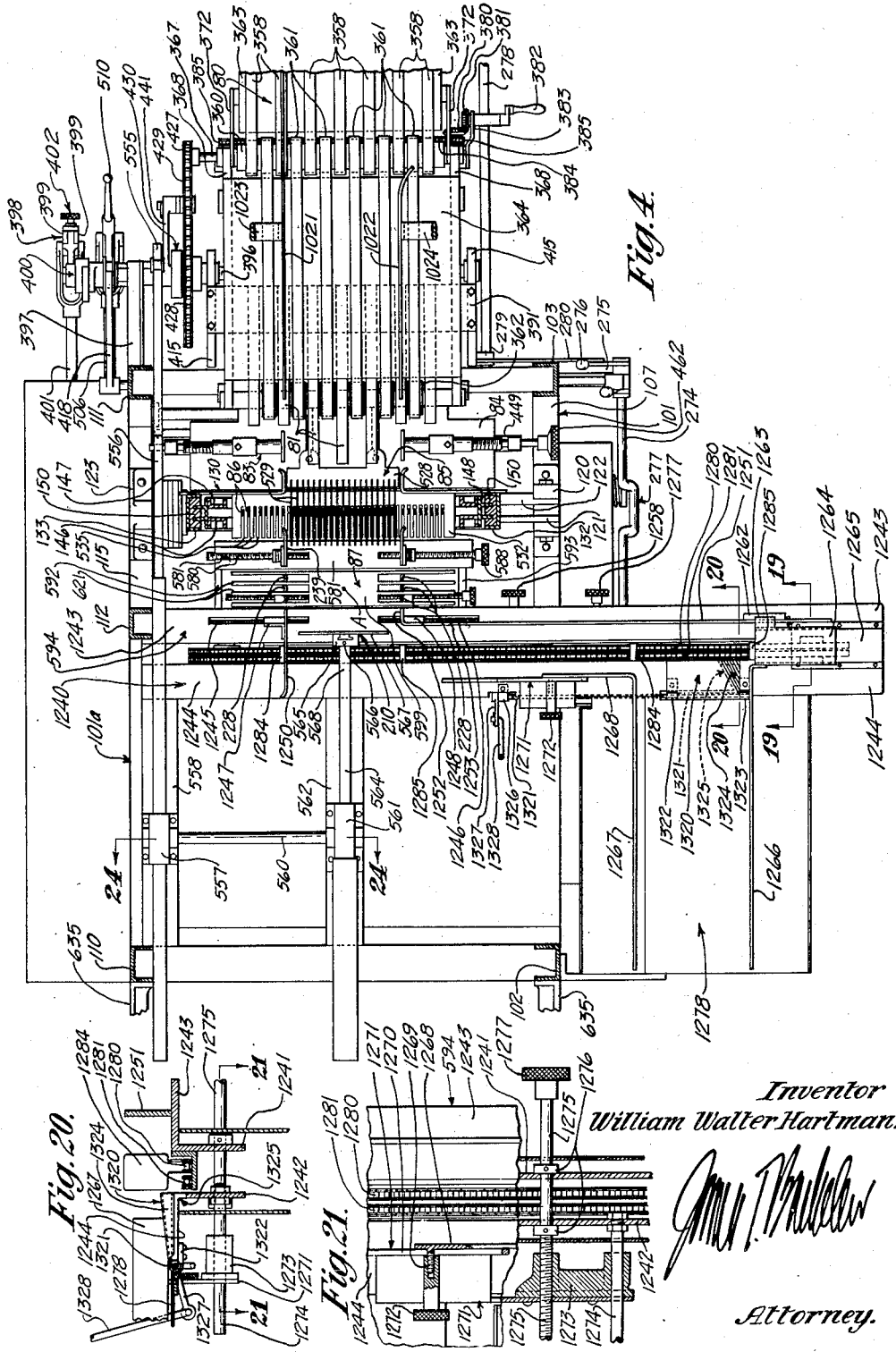

Sept. 17, 1940.  W. W. HARTMAN  2,215,036
COMBINATION BREAD SLICING AND WRAPPING MACHINE
Filed July 31, 1937  28 Sheets-Sheet 6

Inventor
William Walter Hartman.

Attorney.

Sept. 17, 1940. W. W. HARTMAN 2,215,036
COMBINATION BREAD SLICING AND WRAPPING MACHINE
Filed July 31, 1937 28 Sheets-Sheet 7
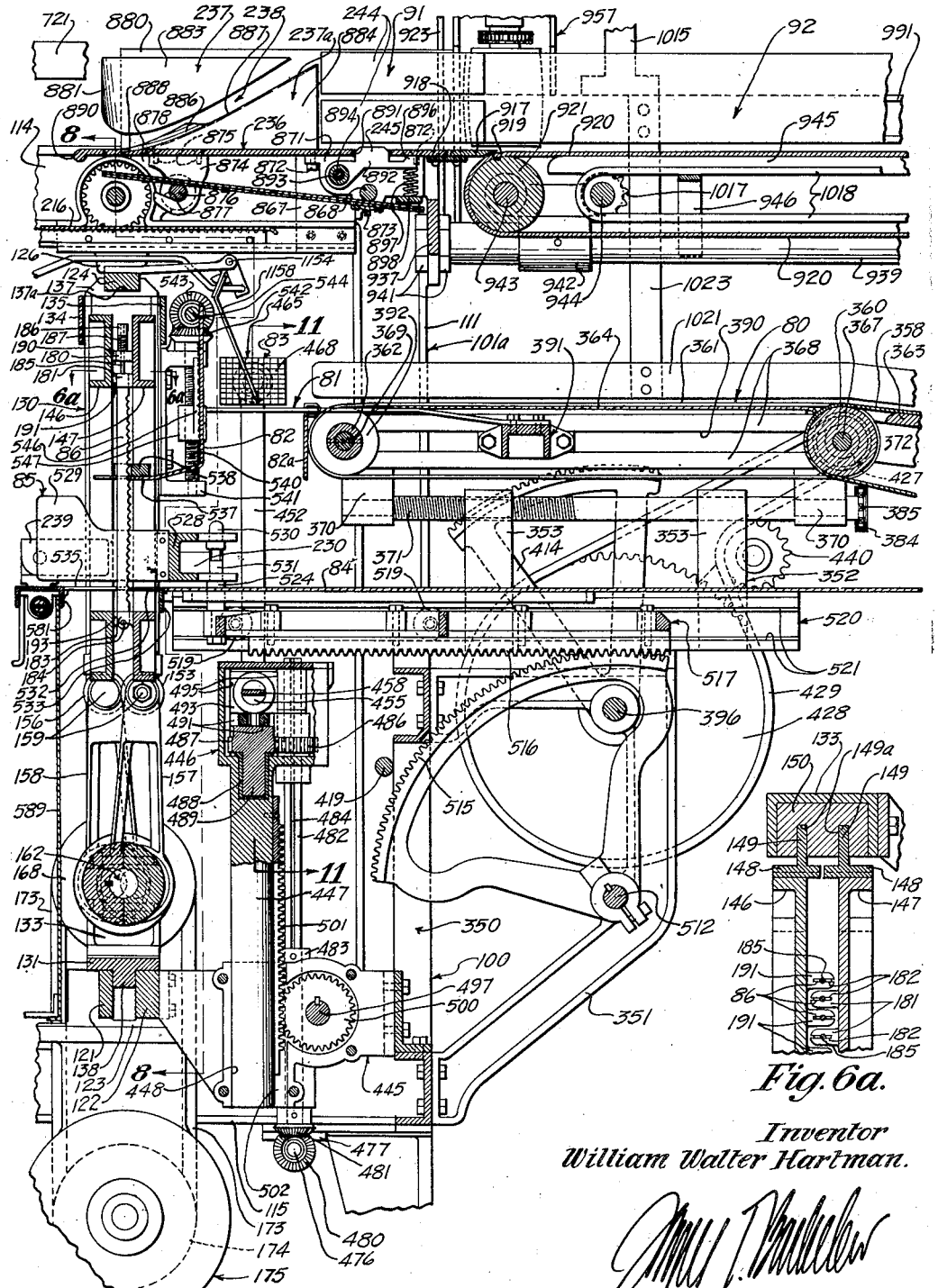
Fig.6a.
Fig.6.
Inventor
William Walter Hartman.
Attorney.

Sept. 17, 1940. W. W. HARTMAN 2,215,036
COMBINATION BREAD SLICING AND WRAPPING MACHINE
Filed July 31, 1937 28 Sheets-Sheet 9

Inventor
William Walter Hartman.
Attorney.

Inventor
William Walter Hartman.

Attorney.

Sept. 17, 1940.     W. W. HARTMAN     2,215,036
COMBINATION BREAD SLICING AND WRAPPING MACHINE
Filed July 31, 1937     28 Sheets-Sheet 11
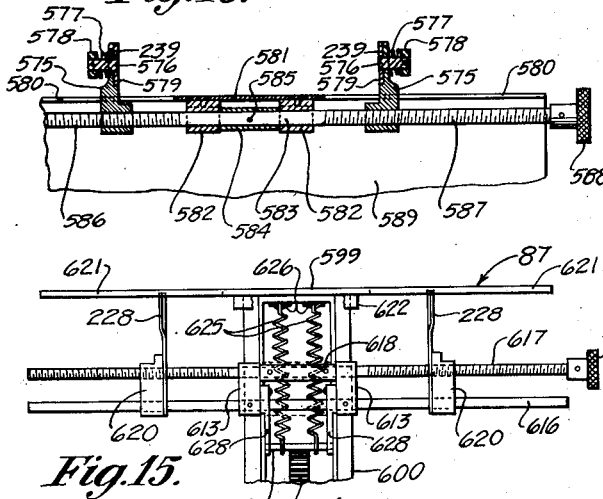
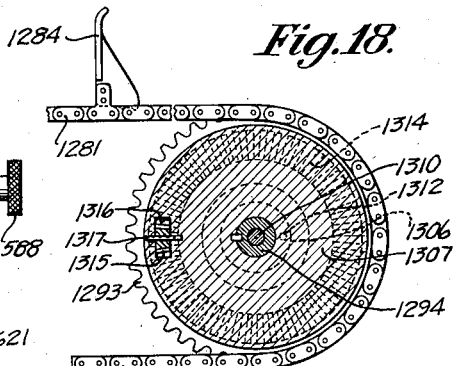
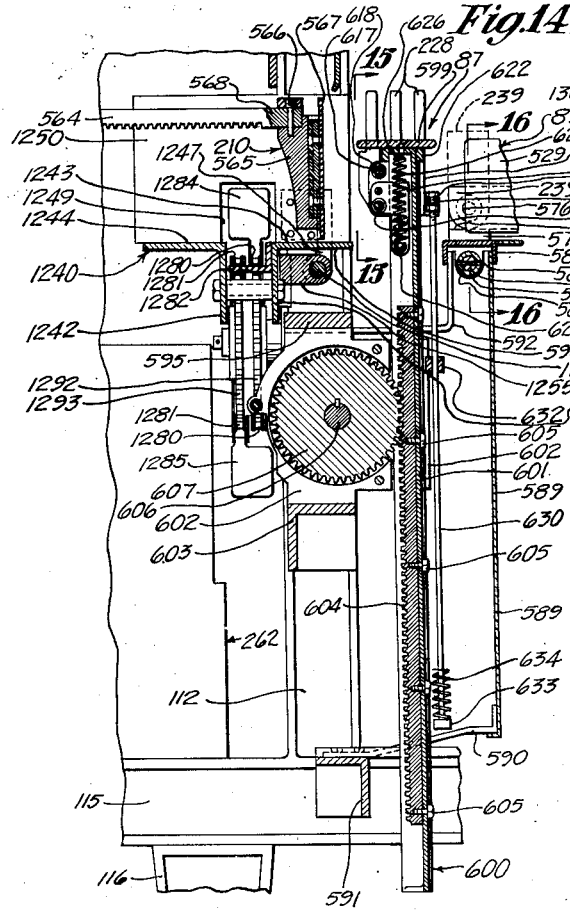
Inventor
William Walter Hartman.
Attorney.

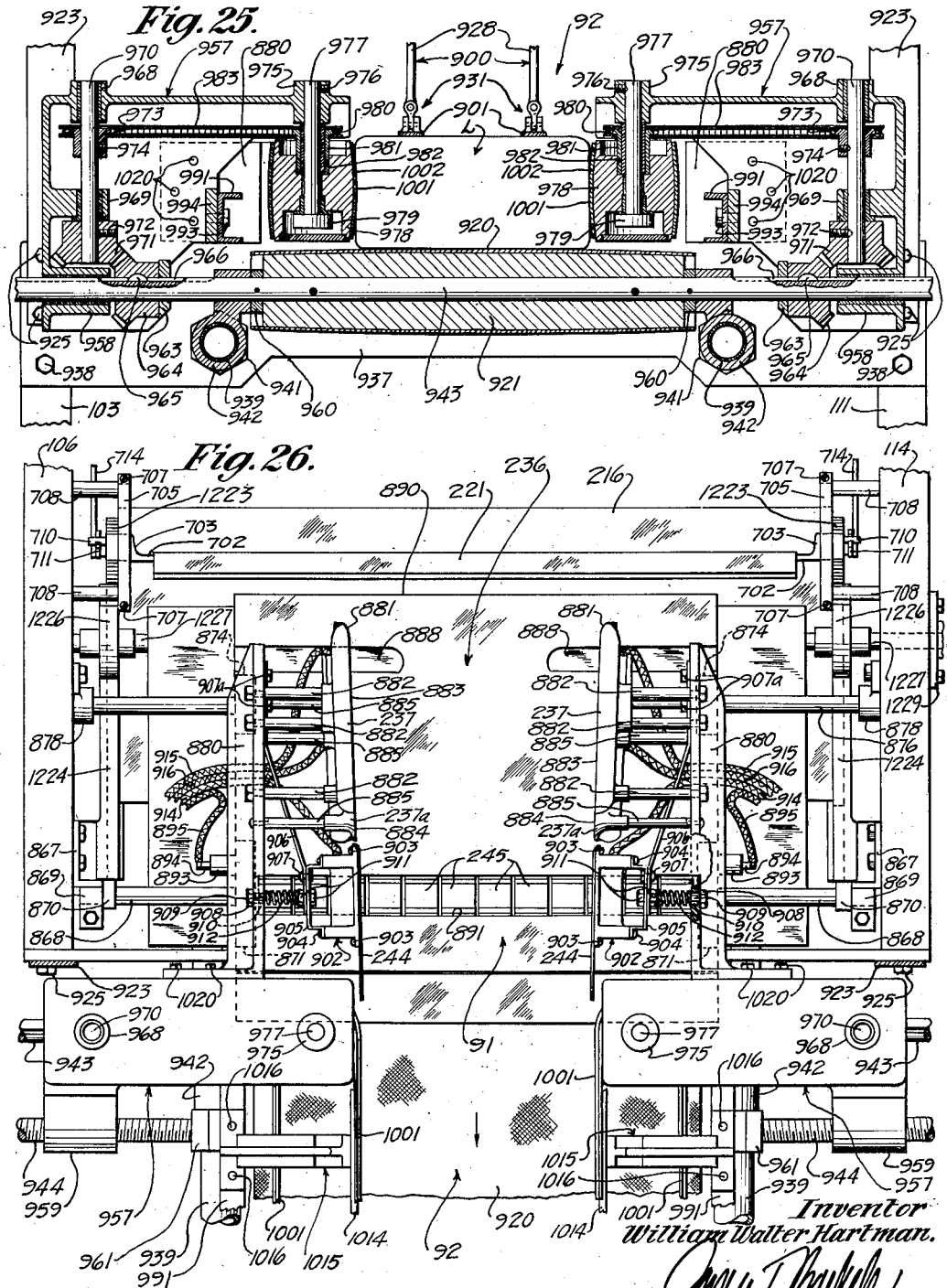

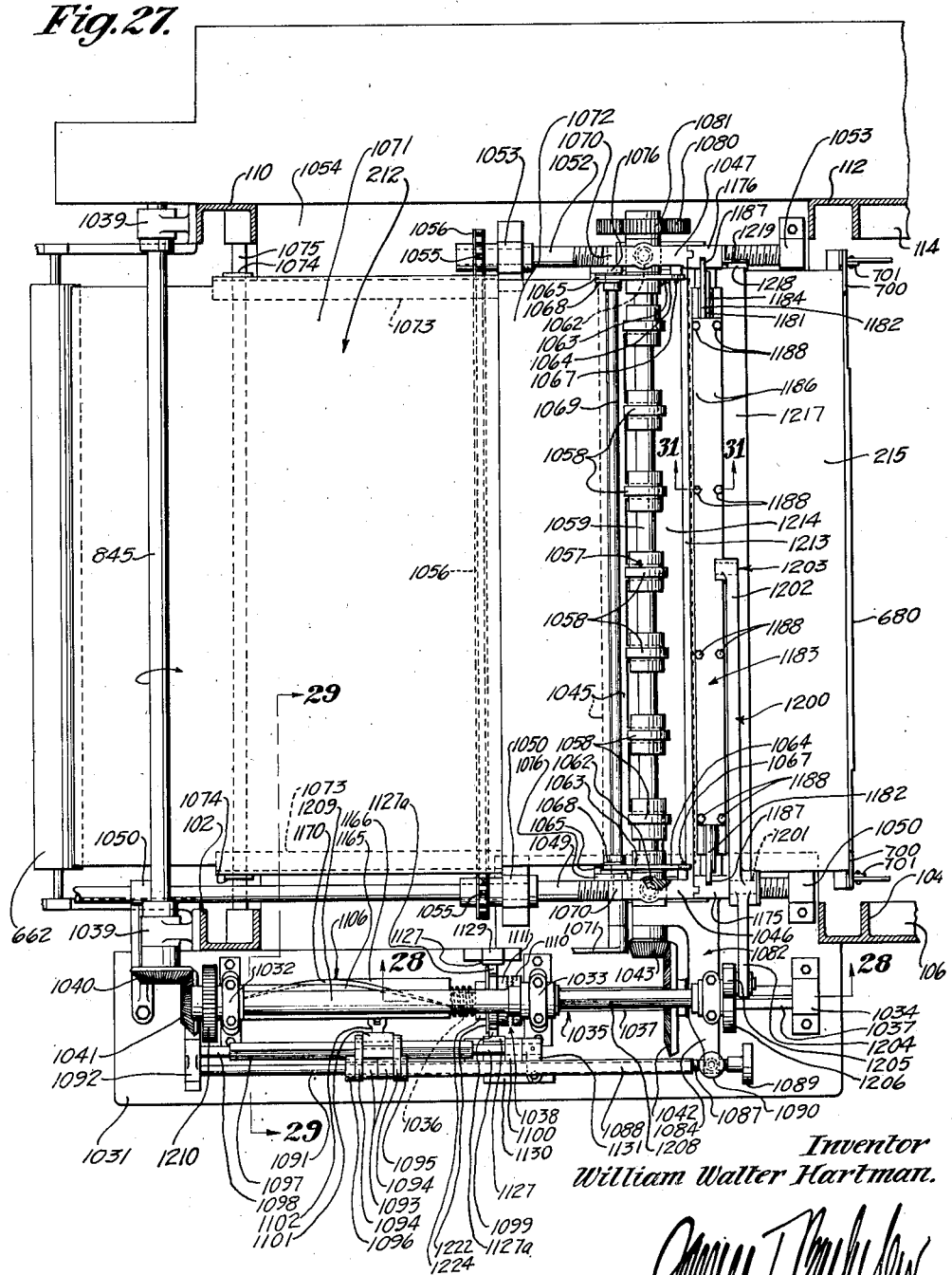

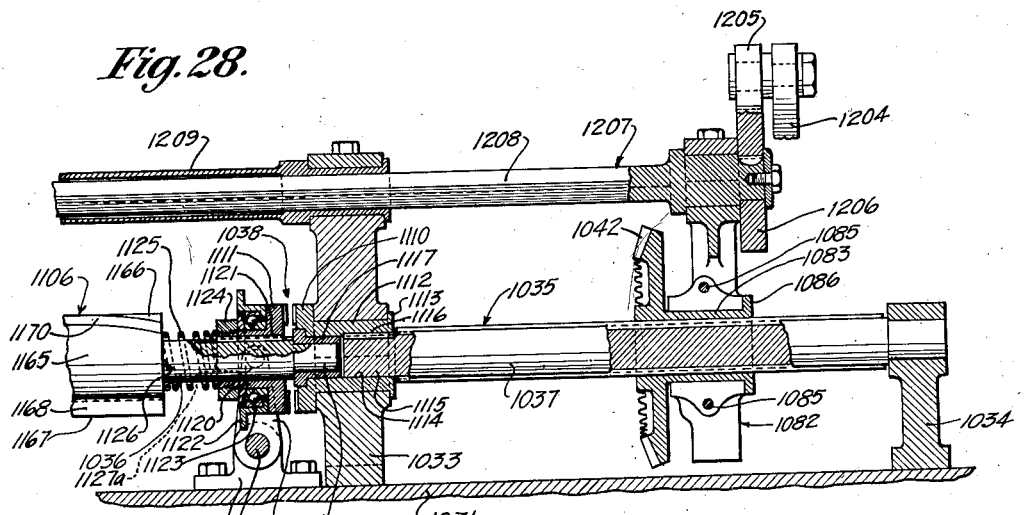

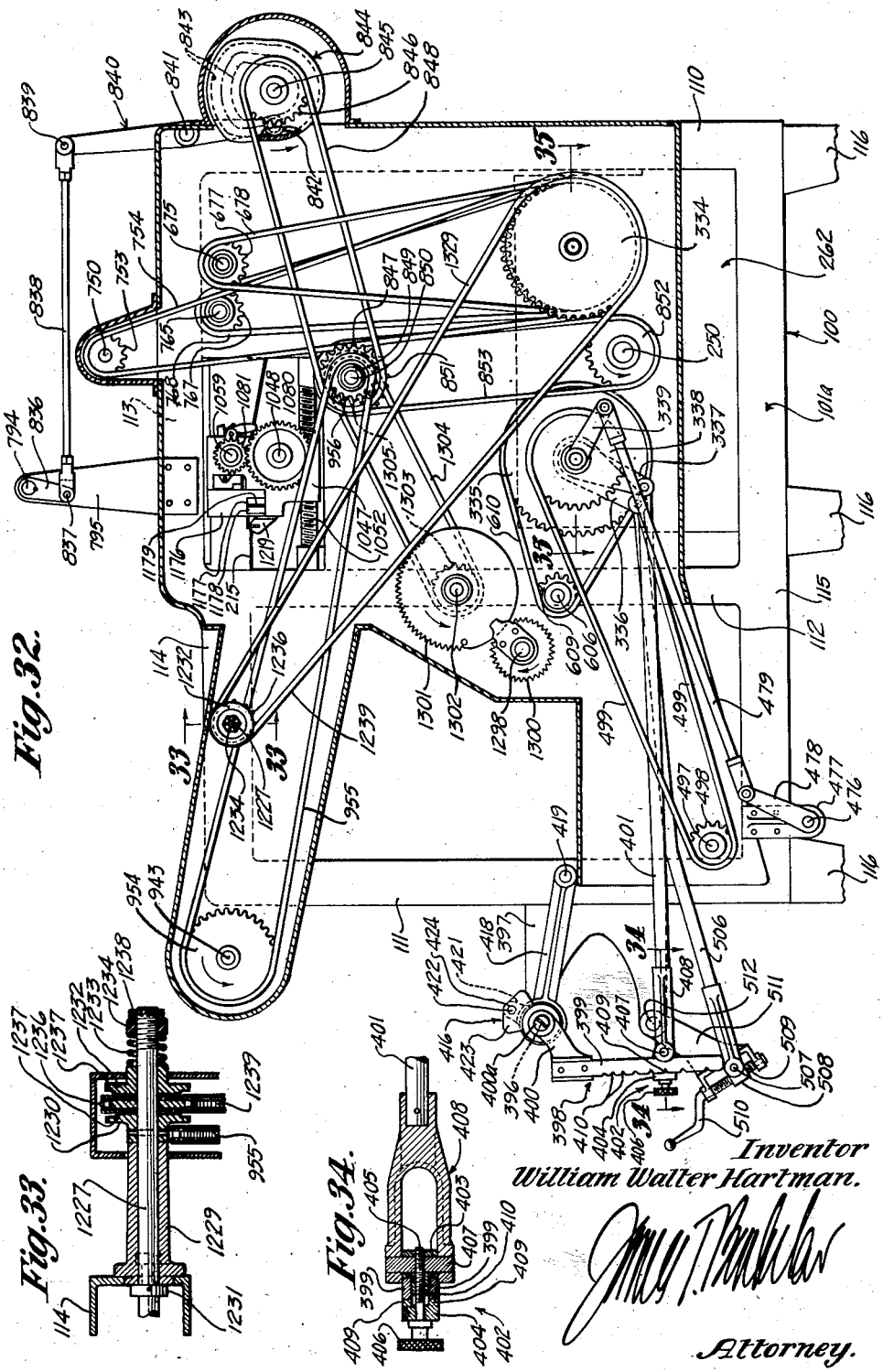

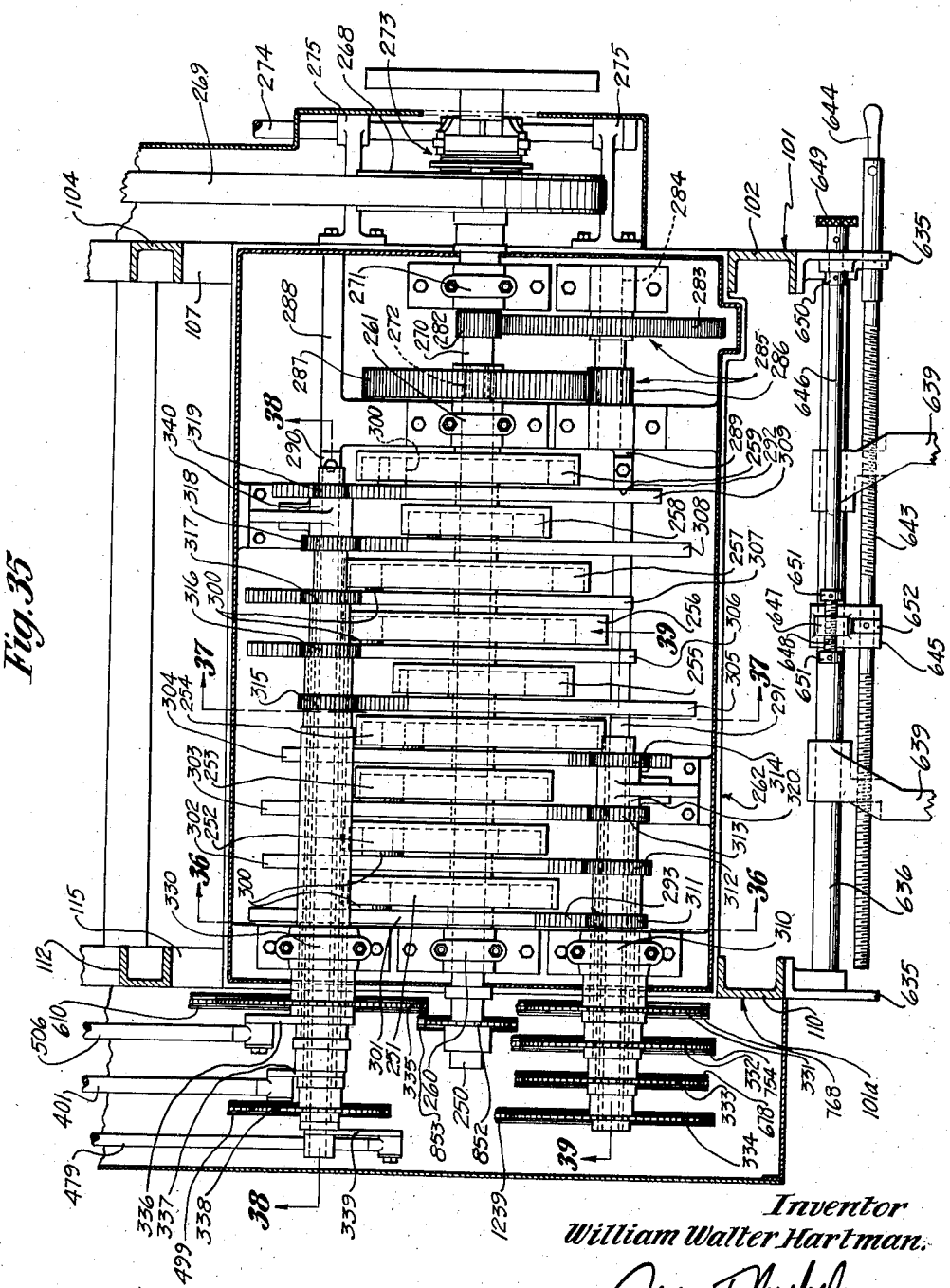

Sept. 17, 1940.    W. W. HARTMAN    2,215,036
COMBINATION BREAD SLICING AND WRAPPING MACHINE
Filed July 31, 1937    28 Sheets-Sheet 17

Inventor
William Walter Hartman.

Attorney.

Sept. 17, 1940.　　　W. W. HARTMAN　　　2,215,036
COMBINATION BREAD SLICING AND WRAPPING MACHINE
Filed July 31, 1937　　　28 Sheets—Sheet 18
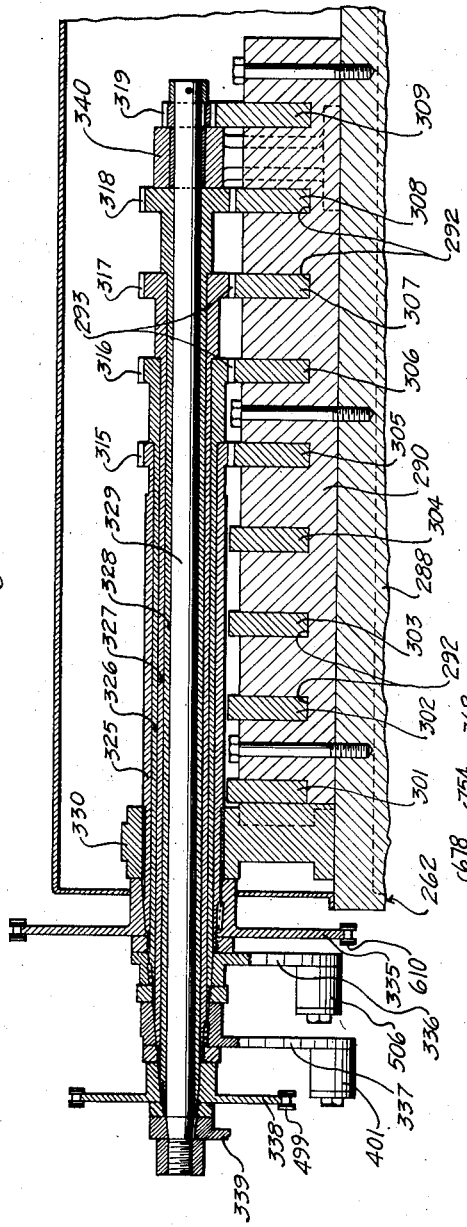
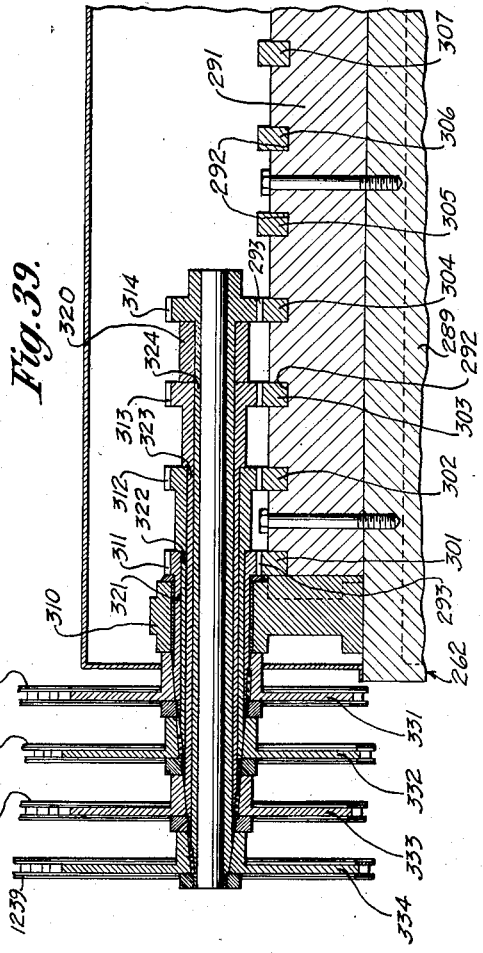
Inventor
William Walter Hartman.
Attorney.

Sept. 17, 1940.  W. W. HARTMAN  2,215,036
COMBINATION BREAD SLICING AND WRAPPING MACHINE
Filed July 31, 1937   28 Sheets-Sheet 19
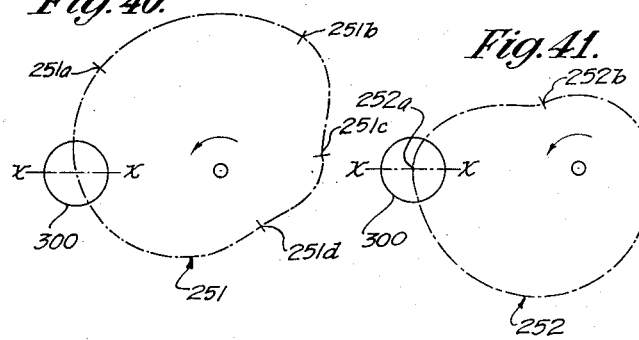
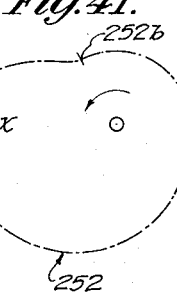
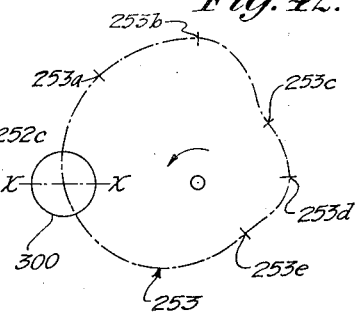
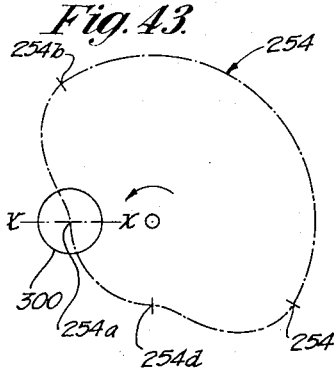
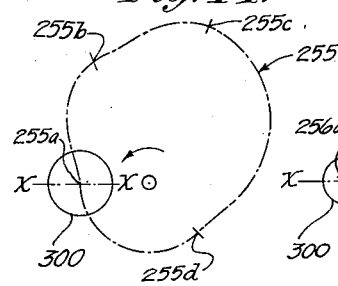
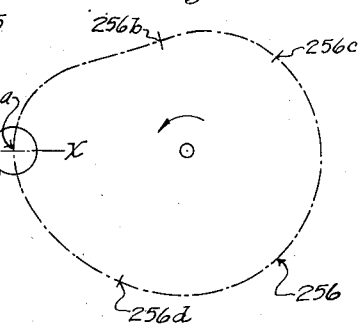
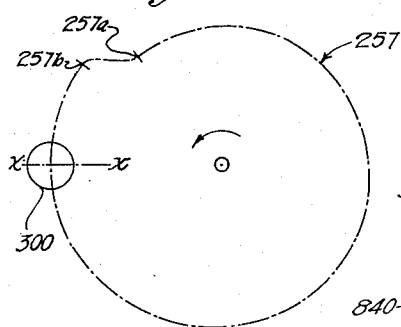
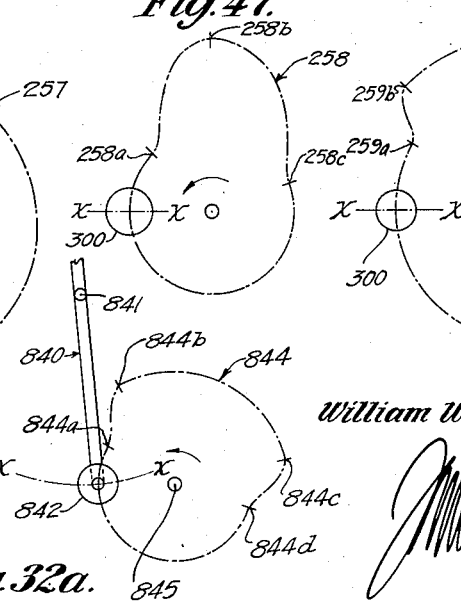
Inventor
William Walter Hartman.
Attorney.

Sept. 17, 1940.  W. W. HARTMAN  2,215,036
COMBINATION BREAD SLICING AND WRAPPING MACHINE
Filed July 31, 1937   28 Sheets-Sheet 20

Inventor
William Walter Hartman.

Attorney.

Sept. 17, 1940.   W. W. HARTMAN   2,215,036
COMBINATION BREAD SLICING AND WRAPPING MACHINE
Filed July 31, 1937   28 Sheets-Sheet 21

Inventor
William Walter Hartman.
Attorney.

Inventor
William Walter Hartman.
Attorney.

Inventor
William Walter Hartman.
Attorney.

Sept. 17, 1940.  W. W. HARTMAN  2,215,036
COMBINATION BREAD SLICING AND WRAPPING MACHINE
Filed July 31, 1937   28 Sheets-Sheet 25
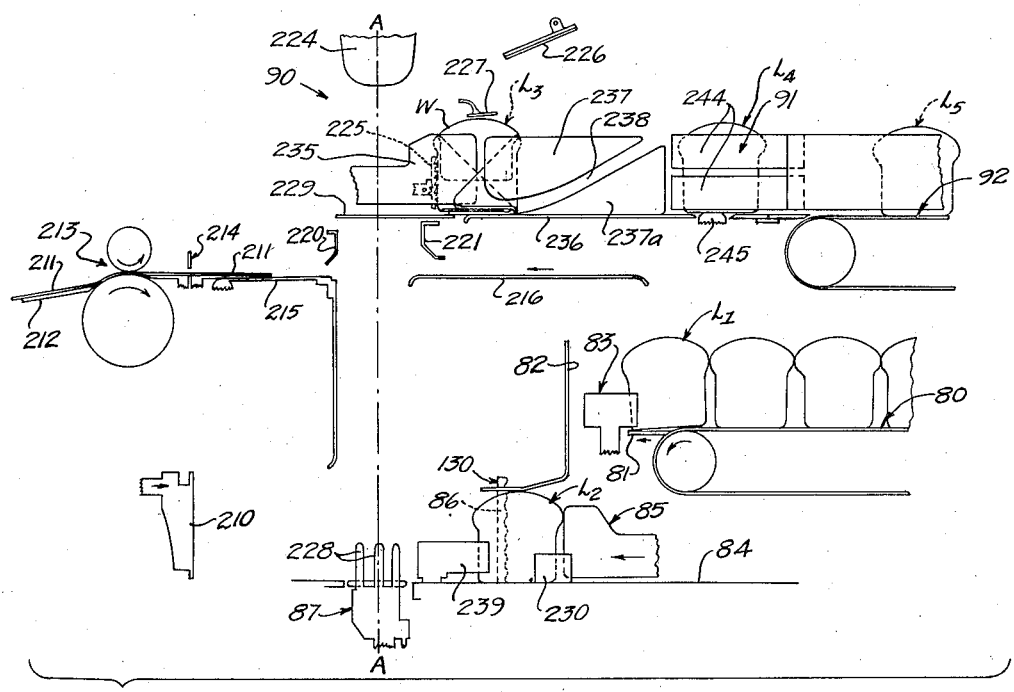
*Fig.58.*
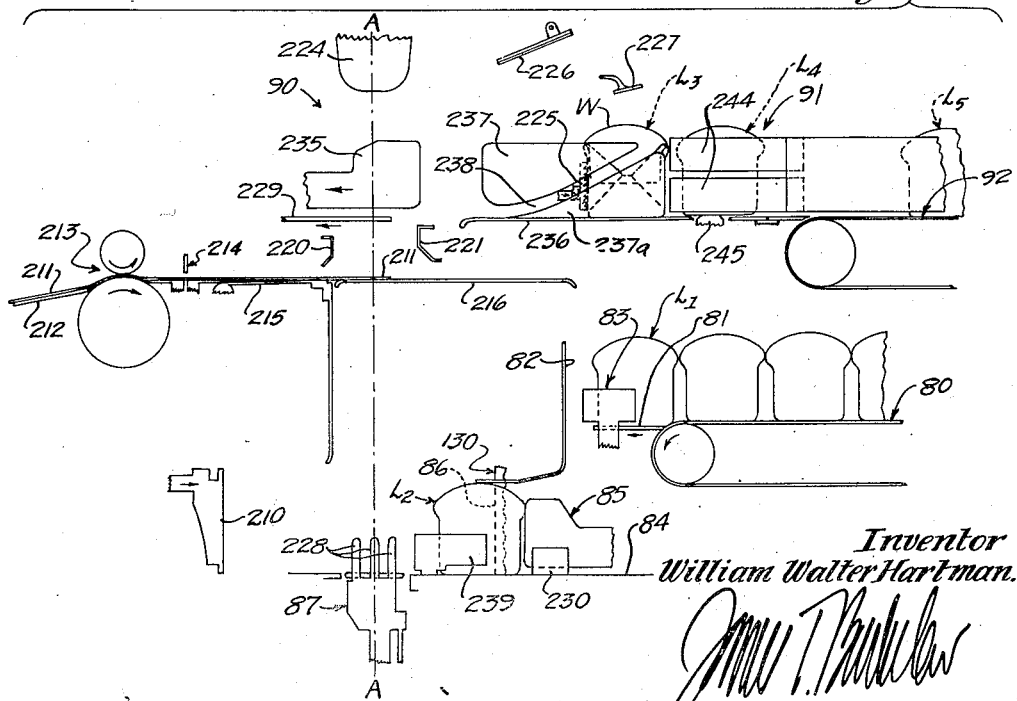
*Fig.59.*
Inventor
William Walter Hartman.
Attorney.

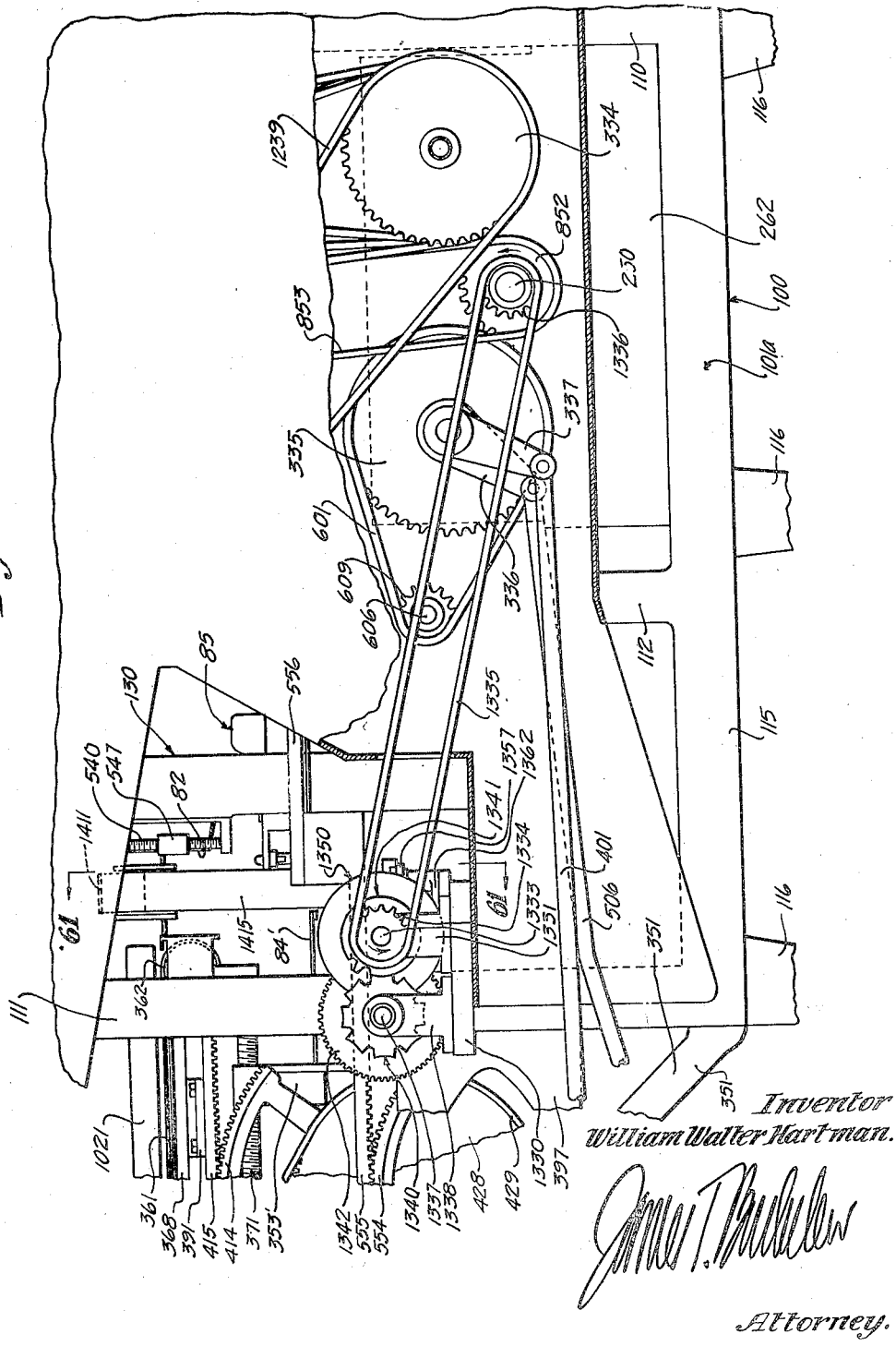

Sept. 17, 1940.  W. W. HARTMAN  2,215,036
COMBINATION BREAD SLICING AND WRAPPING MACHINE
Filed July 31, 1937  28 Sheets-Sheet 27
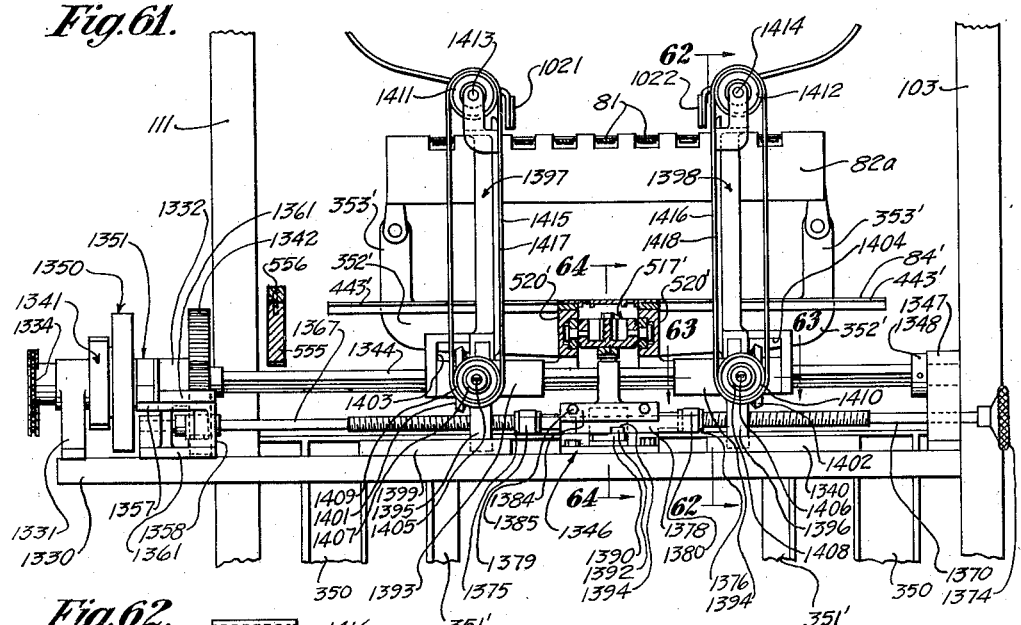
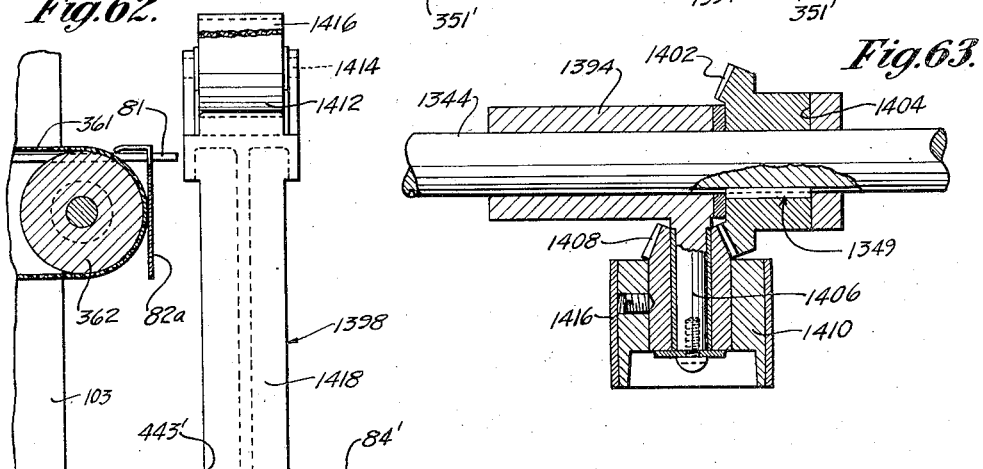
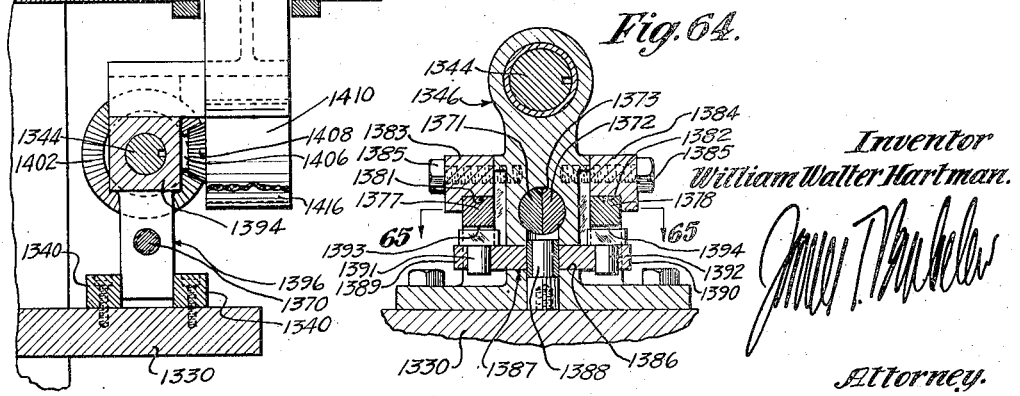
Inventor
William Walter Hartman.
Attorney.

Sept. 17, 1940.    W. W. HARTMAN    2,215,036
COMBINATION BREAD SLICING AND WRAPPING MACHINE
Filed July 31, 1937    28 Sheets-Sheet 28
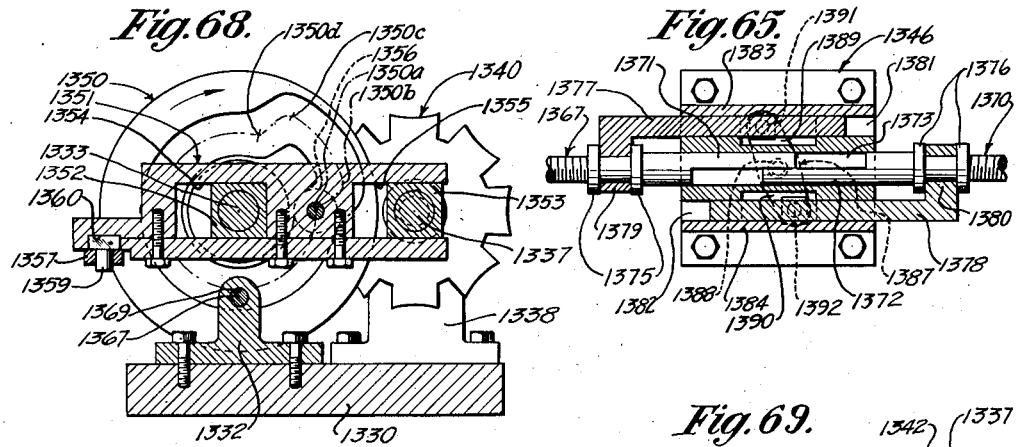
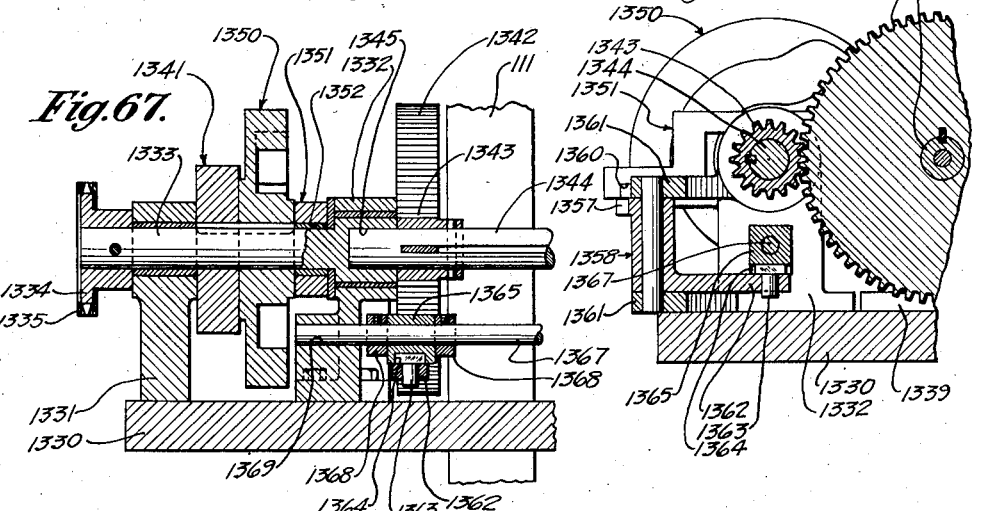
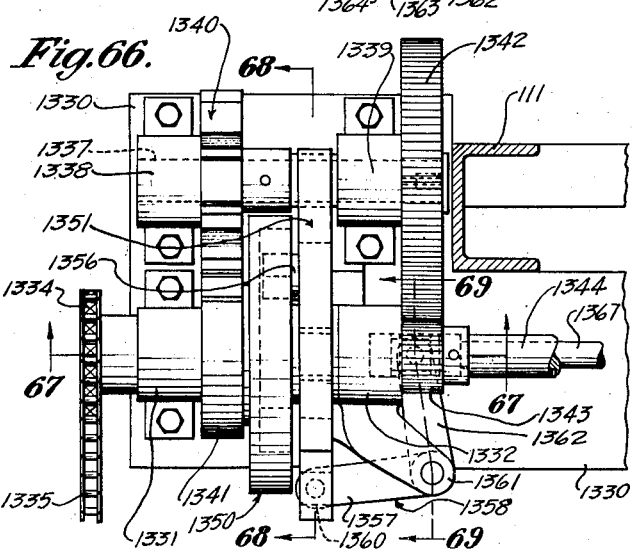
Inventor
William Walter Hartman.
Attorney.

Patented Sept. 17, 1940

2,215,036

UNITED STATES PATENT OFFICE 2,215,036

COMBINATION BREAD SLICING AND WRAPPING MACHINE

William Walter Hartman, Los Angeles, Calif.

Application July 31, 1937, Serial No. 156,717

46 Claims. (Cl. 93—2)

This invention relates generally to combination machines for slicing and wrapping articles such as loaves of bread, it being a general object of the invention to provide an improved combination slicing and wrapping machine, characterized by high capacity in loaves handled per minute, quick adjustability to loaves of various commercial sizes, convenience of manipulation by the attendant, and improvement in mechanical and structural design.

For any given bread slicing machine, the maximum number of loaves that can be handled per unit time is limited by the speed at which a loaf can be sliced by the machine without substantial tearing or crushing. Therefore, assuming minimum practicable slicing time, further increase in number of loaves handled per minute can be gained only by decreasing the duration of that proportion of the operating cycle of the machine which is not devoted to the slicing operation—in other words, by decreasing the duration of the cycle without further decreasing the slicing time.

It is thus one specific object of the invention to provide a bread slicing and wrapping machine in which the slicing operation occupies an exceptionally large proportion of the operating cycle of the machine.

The machine of the present invention is of the type in which a horizontally reciprocating ram moves the loaves, one after another, through the slicing blades. In a prior combination machine of the general type in question, such a ram moved the loaf first through the slicing blades and then on beyond the blades and against the wrapper, effecting the first wrapper folding operation. The ram of the present invention moves the loaf only just beyond the blades, and then quickly returns for the next loaf, leaving the sliced loaf to be carried through the wrapping mechanism by separate synchronized members. This ram, having moved the sliced loaf just clear of the slicing unit, returns quickly, the succeeding loaf being then immediately placed in front of it, and then immediately begins its forward stroke to move the latter loaf through the knives. The sliced loaf is left by the ram in a centered position on a vertically moving ram or elevator, which then immediately lifts the loaf into engagement with a wrapper which has been fed to a position over the elevator, the loaf and wrapper being moved upwardly by the elevator between two spaced side folding plates, which cause the wrapper to be draped downwardly along the sides of the loaf. By thus curtailing the movement of the horizontal reciprocating ram beyond the slicing unit on its forward stroke, returning it quickly and then immediately placing the next loaf ahead of it, and then at once beginning the relatively slow forward stroke of the ram, the proportion of the cycle of the machine which is not devoted to slicing of the loaf is reduced to a minimum, and the duration of the operating cycle of the machine is accordingly shortened materially, with corresponding increase in loaves sliced and wrapped per minute.

The machine of the present invention is designed with particular attention to convenience to the attendant, being so arranged that an attendant standing in one position can place loaves on the infeed conveyor, remove sliced, wrapped loaves from the outfeed conveyor, and manipulate the various operating controls of the machine. A further desirable end accomplished in the design of the machine of the present invention consists in reduction of the number of separate directions taken by the loaf in passing through the machine, together with shortening of the several paths of travel of the loaf. In accordance with the present preferred form of the invention, the loaf comes into the machine on a substantially horizontal infeed conveyor, is lowered to a position immediately in front of the horizontally movable ram, is then moved by said ram through the slicing unit, the loaf traveling at this time in the same direction as it travelled on the infeed conveyor. The loaf is then lifted by the elevator into engagement with the wrapper, which has been moved over the loaf on the elevator in a direction opposite to the direction of travel of the loaf on the infeed conveyor. During folding of the wrapper about the loaf and sealing of the wrapper, the loaf is moved horizontally in a direction contrary to its direction of infeed travel, and is then received by the outfeed conveyor, which is spaced above the infeed conveyor and delivers the sliced and wrapped loaf from the machine in a direction contrary to the direction of infeed and at an elevation above the infeed conveyor. The infeed conveyor is at a level convenient for placement of the loaves thereon, while the outfeed conveyor is also within convenient reach of the attendant when standing by the side of the machine in position to place loaves on the infeed conveyor.

The various adjustments of the machine are designed with reference to a vertical center line passing through the elevator that lifts the sliced loaf to the wrapping mechanism. Regardless of the size of the loaf being sliced, the machine is so adjusted that the loaf is moved by the ram to a centered position with reference to this center line, and is lifted along said center line by the elevator. The wrapper severing and feeding mechanism is so adjustable that regardless of the size of wrapper which it may be set to sever and feed, the wrapper always is fed to a centered position with reference to this main center line, so that the wrapper is always centered with reference to the centered loaf moving upwardly toward it on the elevator. Various features of the invention are concerned with adjustment of the machine to bring the loaf to centered position with reference to this center line, and also to feed the wrapper to a centered position with reference to the same center line, as will be explained in detail in the body of the specification. In order that the wrapper may be fed out to different width dimensions for different sized loaves, the paper is fed from a roll in a direction at right angles to the length of the loaf, and is severed to provide a wrapper of a width suitable for the circumference of the loaf to be wrapped. The long dimension of the severed wrapper then corresponds to the width of the paper strip fed from the wrapper supply roll. A further advantage in the arrangement described is that the severed wrapper, which is frequently relatively flexible, is easier to support when fed in a direction parallel to its short rather than its long dimension.

A further feature of the present invention is an auxiliary side feed arrangement, by means of which loaves may be delivered to the wrapper part of the machine without passing through the slicing mechanism. It sometimes occurs that a few loaves are improperly wrapped or sealed, and it is common that it will be required that a certain number of loaves be wrapped without slicing. To provide for wrapping of said loaves without first removing the slicing unit, an auxiliary side feed is provided, which introduces the loaves to the machine just beyond the slicing mechanism. These loaves then progress through the wrapping mechanism and are delivered by way of the outfeed conveyor in the usual manner.

There are many other objects and features of the invention, too numerous to mention preliminarily, but all of which will appear and be made apparent in the course of the following detailed description of a present preferred embodiment thereof, reference for this purpose being had to the accompanying drawings, in which:

Fig. 1 is a general side elevation as viewed from the rear side of the machine, the slicer unit being removed;

Figs. 1a and 1b are enlarged fragmentary sections taken as indicated on lines 1a—1a and 1b—1b, respectively, of Fig. 1;

Fig. 2 is an enlarged side elevation as viewed from the front side of the machine, a portion of the conveyor mechanism illustrated in Fig. 1 being broken away;

Fig. 3 is a transverse section on line 3—3 of Fig. 1;

Fig. 4 is a horizontal section taken on line 4—4 of Fig. 2;

Fig. 6 is an enlarged medial longitudinal section of a portion of the machine taken as indicated by line 6—6 of Fig. 3;

Fig. 6a is a fragmentary horizontal section taken on line 6a—6a of Fig. 6;

Figures 5, 24:
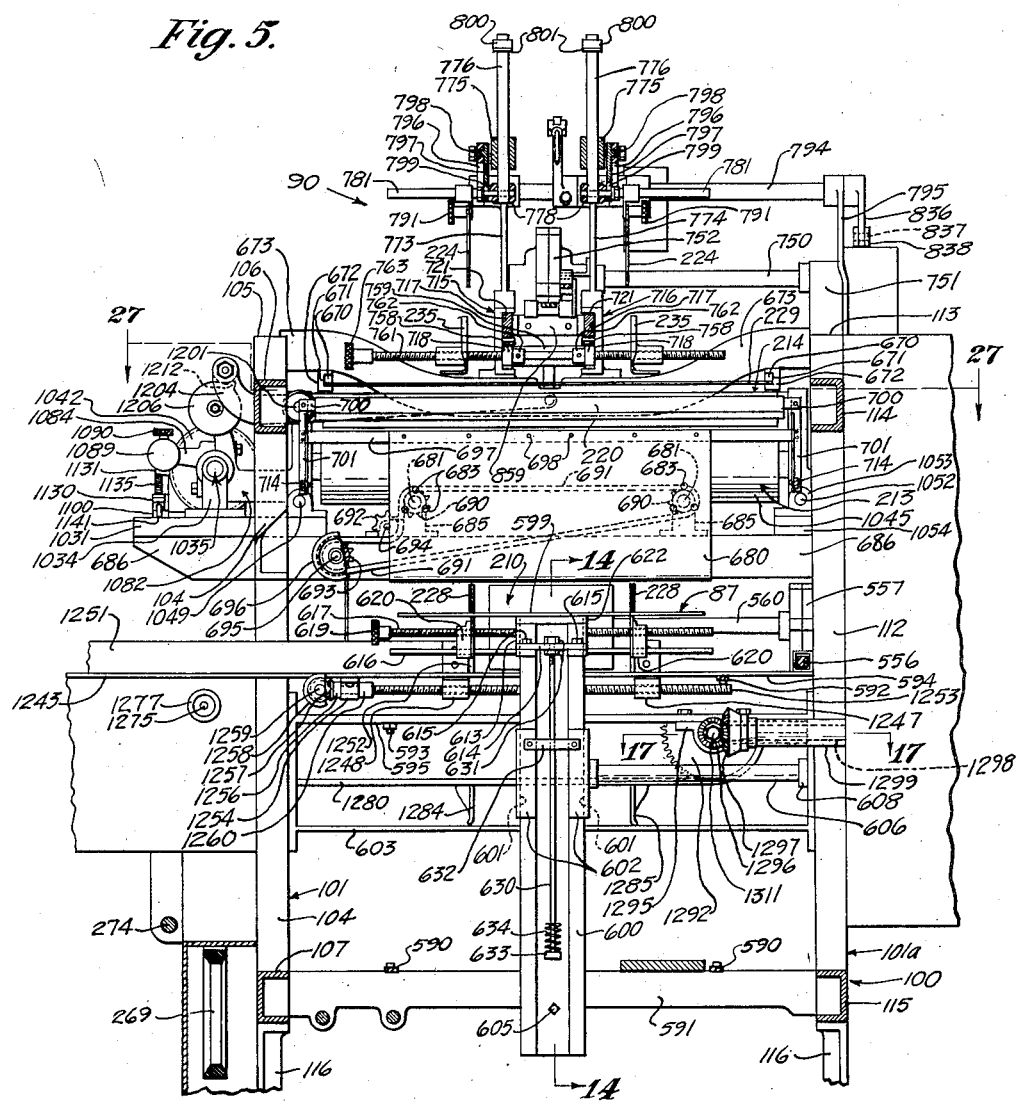
Fig. 5 is a vertical transverse section taken on line 5—5 of Fig. 2.
Figure 7:
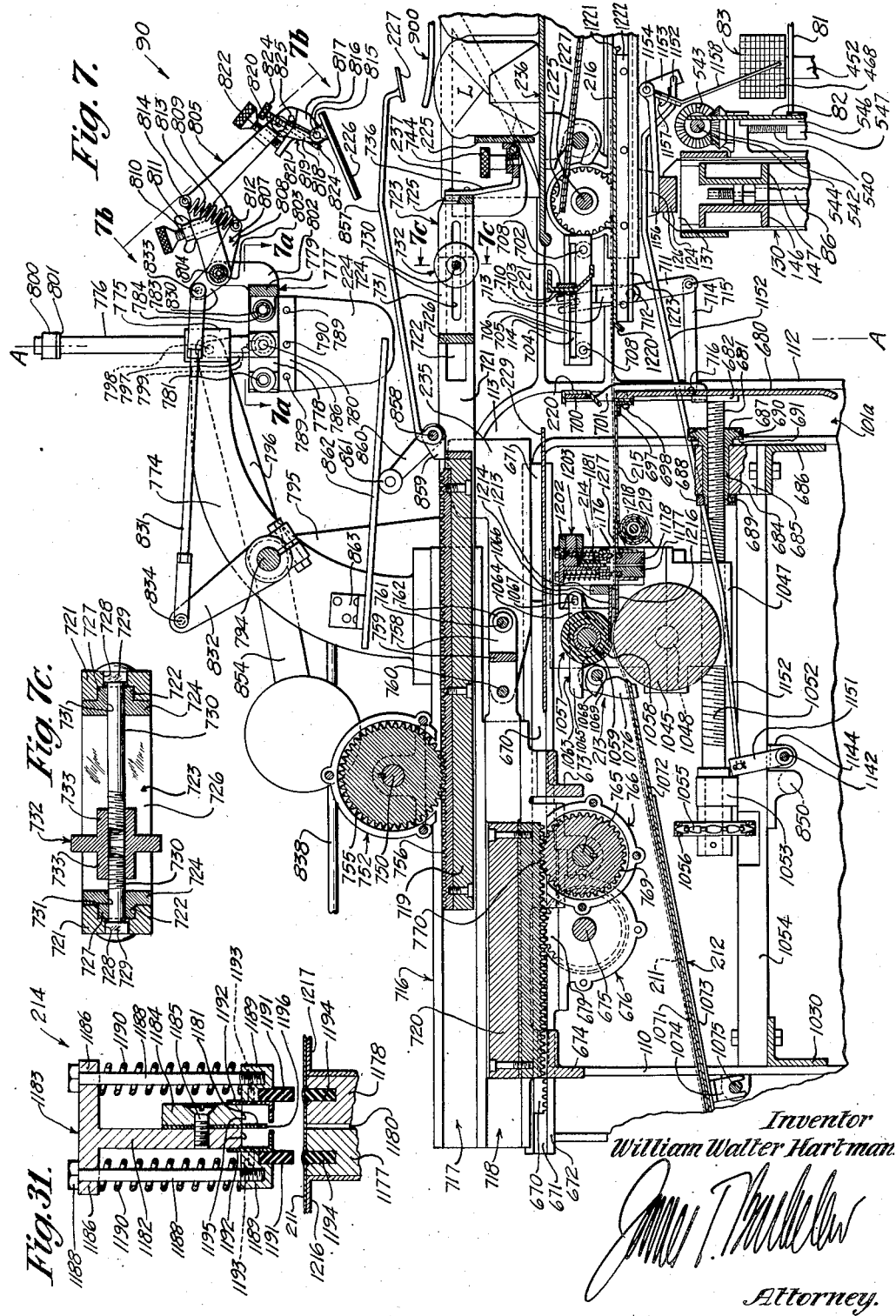
Fig. 7 is an enlarged medial longitudinal section of a portion of the machine adjoining the portion shown in Fig. 6, certain parts which are shown in Fig. 6 being duplicated in order to clearly relate those portions.
Figure 8:
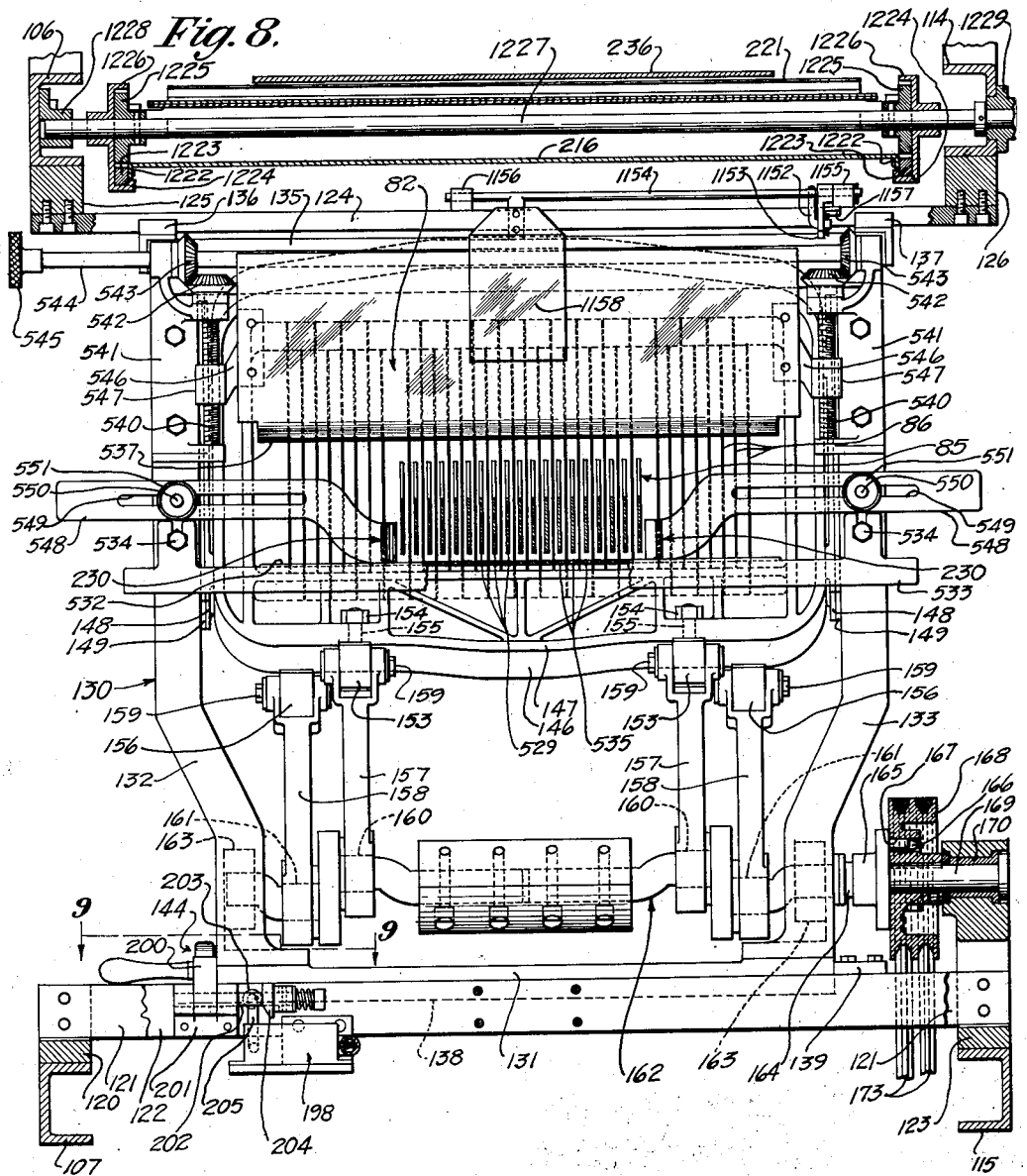
Figure 9:
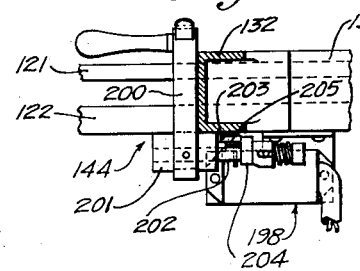
Figure 10:
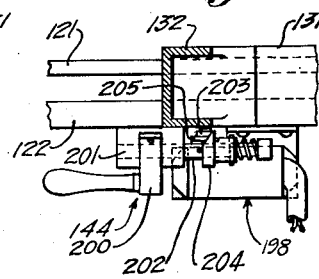
Figure 11:
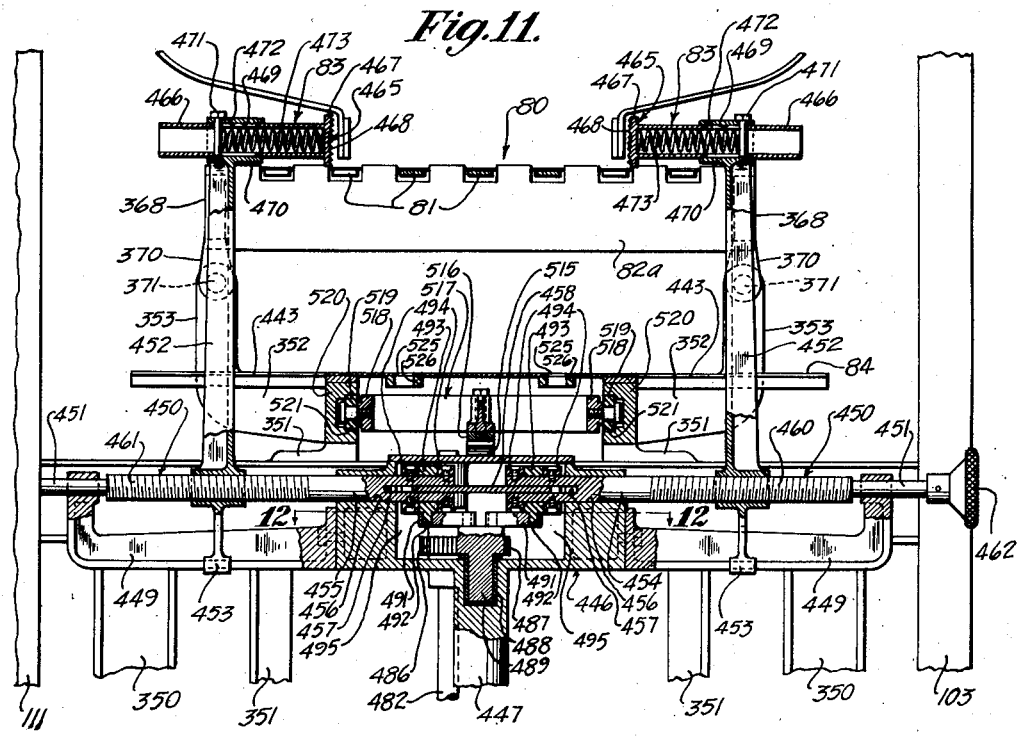
Figure 12:
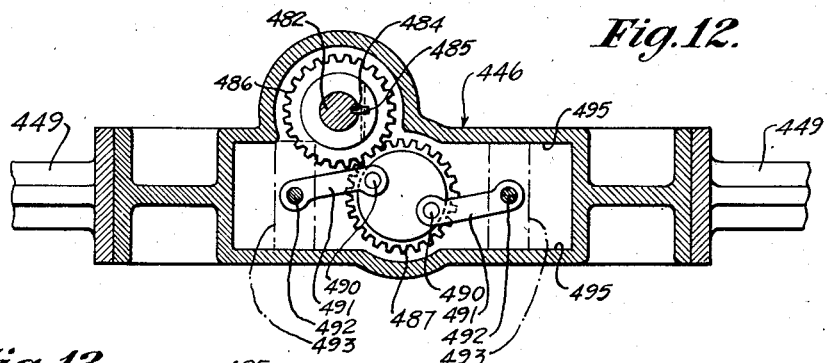
Figure 13:
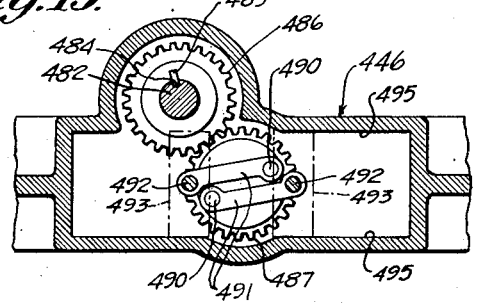
Figure 36:
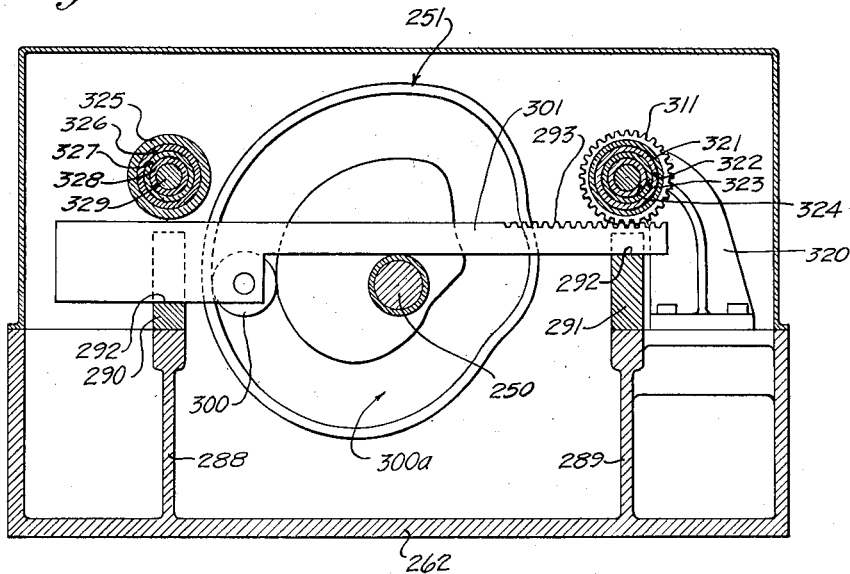
Figure 37:
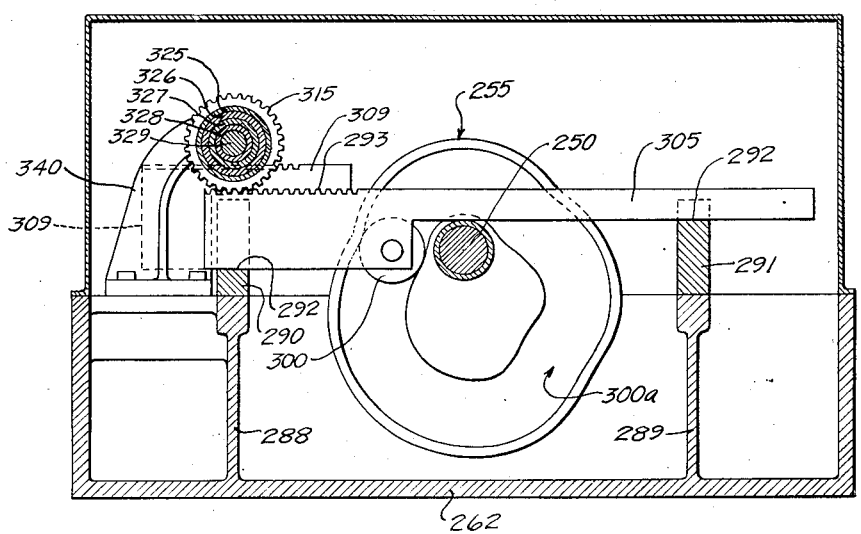
Figure 49:
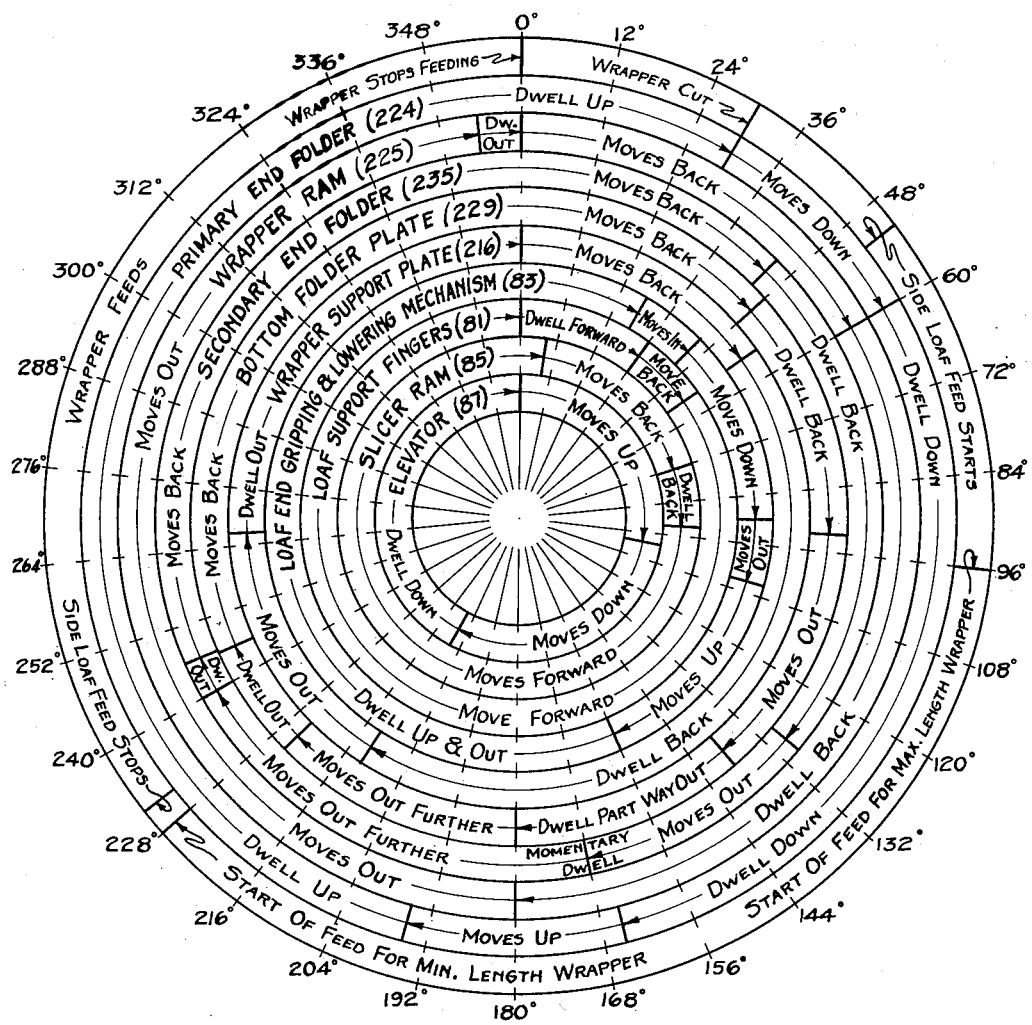

Figs. 7a, 7b and 7c are enlarged fragmentary sections taken as indicated on lines 7a—7a, 7b—7b and 7c—7c, respectively, of Fig. 7;

Fig. 7d is a fragmentary enlargement of a portion of the machine as illustrated in Fig. 7;

Fig. 8 is an enlarged transverse sectional view indicated by line 8—8 of Fig. 6 and which mainly illustrates the slicer head assembly;

Fig. 9 is a plan section taken on line 9—9 of Fig. 8 which illustrates the cutter head latch and switch mechanism in closed position;

Fig. 10 is a view similar to Fig. 9 showing the cutter head latch and switch mechanism in open position;

Fig. 11 is a vertical transverse section on line 11—11 of Fig. 6 showing the loaf gripping and lowering mechanism;

Fig. 12 is a horizontal fragmentary section taken on line 12—12 of Fig. 11;

Fig. 13 is a fragmentary view similar to Fig. 12 which illustrates the parts in an alternate position;

Fig. 14 is a longitudinal section taken on line 14—14 of Fig. 5 and illustrates the elevator mechanism;

Fig. 15 is an elevation of the elevator head taken as indicated by line 15—15 of Fig. 14, but which illustrates the elevator head in a different position from that shown in Fig. 14;

Fig. 16 is a transverse section taken on line 16—16 of Fig. 14;

Fig. 17 is a fragmentary horizontal section taken on line 17—17 of Fig. 5;

Fig. 18 is a vertical section taken on line 18—18 of Fig. 17;

Figs. 19 and 20 are vertical sectional views taken as indicated by lines 19—19 and 20—20, respectively, of Fig. 4;

Fig. 21 is a horizontal section taken on line 21—21 of Fig. 20;

Fig. 22 is a vertical section taken on line 22—22 of Fig. 3;

Fig. 23 is a vertical section taken on line 23—23 of Fig. 22;

Fig. 24 is a vertical fragmentary section taken on line 24—24 of Fig. 4;

Fig. 25 is a vertical transverse section taken on line 25—25 of Fig. 2;

Fig. 26 is a fragmentary plan view taken as indicated by line 26—26 of Fig. 2, certain parts being broken away;

Fig. 27 is a fragmentary plan view taken as indicated by line 27—27 of Fig. 5;

Fig. 28 is a vertical fragmentary section taken on line 28—28 of Fig. 27;

Fig. 29 is a vertical fragmentary section taken on line 29—29 of Fig. 27;

Fig. 30 is a vertical fragmentary section taken as indicated on line 30—30 of Fig. 29;

Fig. 31 is a vertical fragmentary section taken on line 31—31 of Fig. 27;

Fig. 32 is a fragmentary elevation, taken in the same aspect as Fig. 1, in which the drive housing has been broken away in order to reveal the driving connection between the cam box and the various operating parts;

Fig. 32a schematically illustrates the contour of a cam shown in Fig. 32 and is rotatively related to the cams schematically illustrated in Figs. 40 to 48, inclusive;

Fig. 33 is a vertical section taken on line 33—33 of Fig. 32;

Fig. 34 is a fragmentary section taken on line 34—34 of Fig. 32;

Fig. 35 is a plan section of the cam box taken on line 35—35 of Fig. 32;

Figs. 36 and 37 are vertical sectional views taken transversely of the cam box as indicated by lines 36—36 and 37—37, respectively, of Fig. 35;

Figs. 38 and 39 are vertical sectional views taken longitudinally of the cam box as indicated by lines 38—38 and 39—39, respectively, of Fig. 35;

Figs. 40 to 48 inclusive are taken in the same aspects as Figs. 36 and 37, and schematically illustrate the contours and relationship of the cams in order from left to right as viewed in Fig. 35;

Fig. 49 is a timing diagram of the machine;

Figs. 50 to 59 inclusive are diagrammatic views illustrating the order in which the various operating parts are actuated to move the loaves through the machine and to accomplish the wrapping thereof;

Fig. 60 illustrates the driving connection at the rear side of the machine for a modified form of loaf gripping and lowering mechanism, being a view taken in the same aspect as Fig. 32;

Fig. 61 is an elevation, partly in section, of the modified form of loaf gripping and lowering mechanism taken in the direction as indicated by line 61—61 of Fig. 60;

Fig. 62 is a vertical section taken on line 62—62 of Fig. 61;

Fig. 63 is a horizontal section taken on line 63—63 of Fig. 61;

Fig. 64 is a vertical section taken on line 64—64 of Fig. 61;

Fig. 65 is a horizontal section taken on line 65—65 of Fig. 64;

Fig. 66 is a plan of the drive mechanism shown in Figs. 60 and 61;

Fig. 67 is a vertical longitudinal section of the drive mechanism taken on line 67—67 of Fig. 66; and Figs. 68 and 69 are vertical transverse sections of the mechanism taken as indicated by lines 68—68 and 69—69 of Fig. 66, respectively.

*General description*

In Figs. 1 and 2 a belt type intermittently moving infeed conveyor is indicated at 80, means for receiving the loaf and lowering it to the slicing level at 83, a typical slicing mechanism at 130, a ram for moving the loaf through the slicing mechanism at 85, means for elevating the sliced loaf at 87, wrapper feeding mechanism at 213, loaf wrapping mechanism at 90, and an outfeed conveyor at 92.

The loaves are placed upon and carried into the machine by intermittently moving infeed conveyor 80. Each loaf upon passing from the end of the conveyor is received by a reciprocating loaf supporting member comprising a plurality of fingers, generally indicated at 81, which support the loaf and move it outwardly from the end of the conveyor. The loaf is moved by said fingers up to stop plate 82 and is supported in this position by the fingers until loaf gripping and lowering mechanism 83 grips the ends of the loaf, whereupon fingers 81 are quickly retracted. Immediately upon retraction of the fingers, the loaf is lowered by mechanism 83 and placed upon a table 84. Mechanism 83 then releases the loaf and moves upwardly to receive the next one. Ram 85 then engages the loaf and moves it in the same direction as it travelled on the infeed conveyor (to the left as viewed in Fig. 2) through slicing mechanism 130, here typically shown as comprising a plurality of vertically reciprocating blades 86, which performs the slicing operation. Ram 85 continues to the left until the sliced loaf is centered over elevator 87. The loaf is then raised by the elevator and delivered to the wrapping mechanism generally indicated at 90. This mechanism folds the wrapper about the loaf and then delivers the loaf to a sealing compartment, generally indicated at 91, the loaf at this time travelling horizontally in a direction contrary to the direction of infeed. The loaf is moved from sealing compartment 91 onto outfeed conveyor 92, which travels above and in a direction contrary to that of infeed conveyor 80, and carries the wrapped and sealed loaves out of the machine to a position where they may be removed by the operator.

Figure 50:
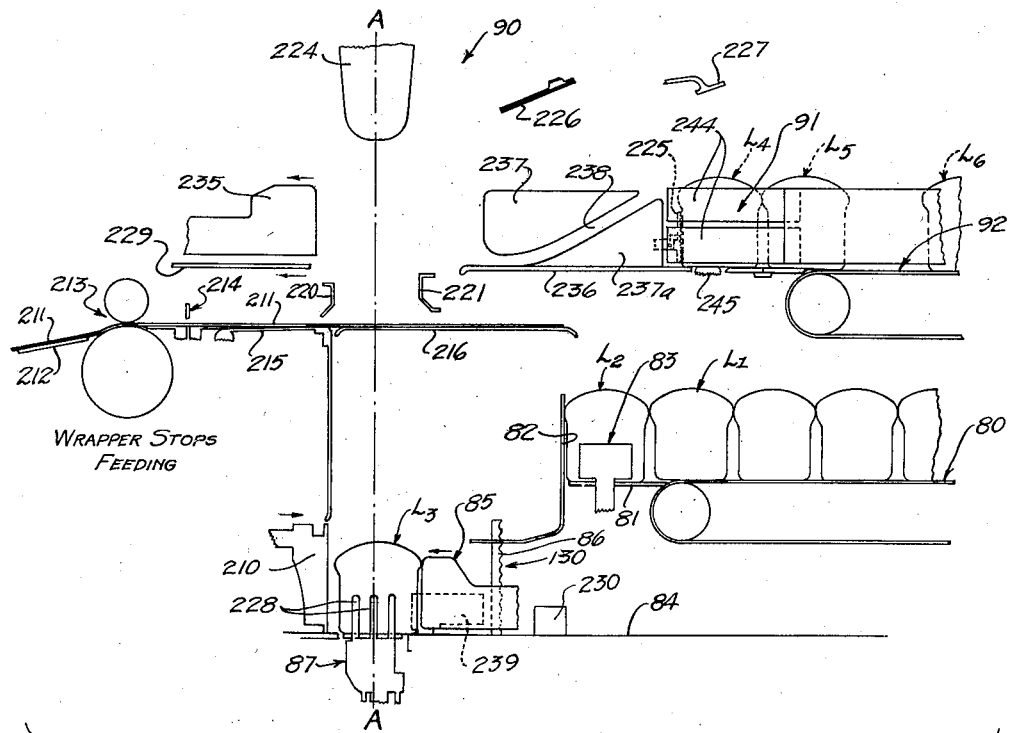

Reference is now directed to Fig. 49, which is a timing diagram of the machine, and to the diagrammatic views of Figs. 50 to 59, inclusive, showing the loaf engaging elements of the machine in various positions of a complete cycle of operation of the machine. The timing diagram indicates the direction of movement of the major operating parts for one cycle of operation of the machine as a whole and is based on 360° rotation of a primary drive mechanism later to be described. The position of the parts as indicated in Fig. 50 is arbitrarily chosen as the zero degree position or starting point of the cycle of operation. In this position, the loaves, which have been manually placed on conveyor 80 with their sides in immediate juxtaposition, have been carried into the machine by the conveyor, the loaf indicated at $L_1$ having reached the end of the conveyor, and the preceding loaf $L_2$ having been carried from the conveyor by the fingers 81 and against stop plate 82. As indicated by the timing diagram (Fig. 49), fingers 81 have at this point reached their limit of movement toward the stop plate. The loaf gripping and lowering mechanism indicated at 83 is at its limit of upward movement but has not as yet moved inwardly to grip the loaf. The loaf gripping and lowering mechanism comprises, generally, a pair of vertically extending arms, spaced transversely of the machine, and a loaf gripping element carried on the upper end of each, as will be more fully described hereinafter. It may at this time be stated that the gripping elements of this mechanism have movement in four directions, i. e., upward movement to receive the next loaf, inward movement (toward one another) to grip the loaf, downward movement to place the loaf on horizontal, slicing-level table 84, and outward movement to release the loaf.

Loaf $L_3$, preceding loaf $L_2$, has previously been placed on table 84 by the lowering mechanism 83 and moved through the reciprocating slicer blades 86 by ram 85, and is at this time being centered by the ram on elevator 87. A second ram 210 acts at this time as a cooperating centering stop for the loaves that are moved onto the elevator by ram 85. Rams 85 and 210 move in opposite directions and are synchronized to move equally toward and away from a vertical center line A—A which passes through the center of the elevator. Loaf $L_3$ is immediately to be moved upwardly along line A—A by elevator 87.

The wrapper web 211 is passed into the machine over support plate 212 and is fed, in a direction at right angles to the length of the loaf being elevated on elevator 87, across the upward path of the loaf by a paper feed mechanism generally indicated at 213. The wrapper web is fed under a severing element 214 and over adjustable support 215 and a horizontal, reciprocating support 216. A predetermined length of wrapper is fed out and centered with reference to line A—A, and at this point in the cycle the wrapper feed mechanism stops feeding.

Loaf $L_4$ preceding loaf $L_3$, has at this time been wrapped and moved into sealing compartment 91. Loaf $L_5$ has been moved out of the sealing compartment and onto the outfeed conveyor 92 by loaf $L_4$. Loaf $L_6$ is being carried out of the machine by conveyor 92.

Figure 51:
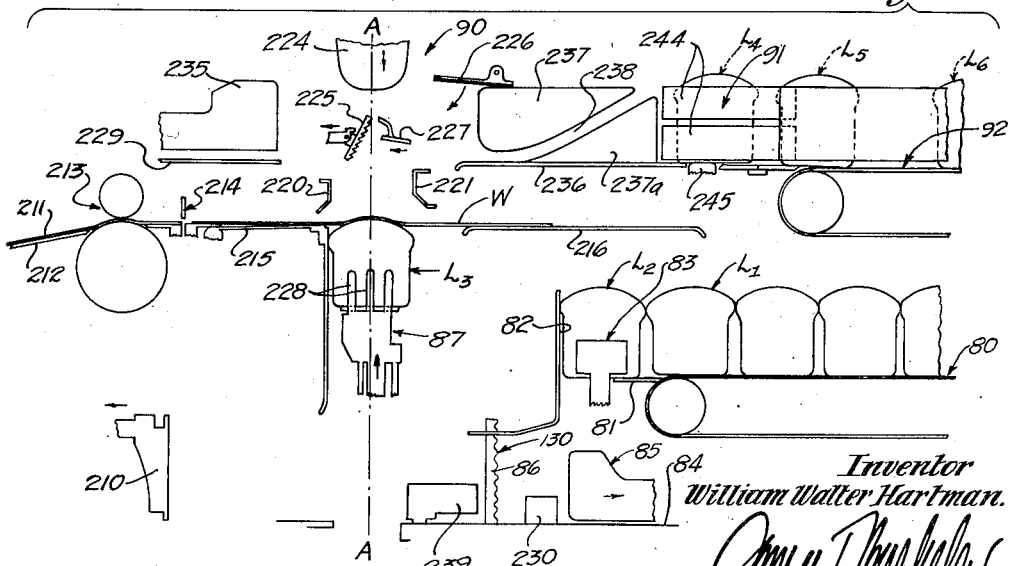

Fig. 51 shows the position of the loaves and the operating parts at approximately 48° of the cycle. In this position (compare with the timing diagram), the loaf gripping and lowering mechanism 83 has moved in to grip the ends of loaf $L_2$, fingers 81 are being retracted, and ram 85 is moving back and away from line A—A to receive loaf $L_2$. Loaf $L_3$ is now being moved upwardly by the elevator and in this position is engaging the underside of wrapper blank W, which by this time has been severed from the web by severing element 214. As illustrated, wrapper support plate 216 has been moved away from the upward path of the loaf.

Figure 52:
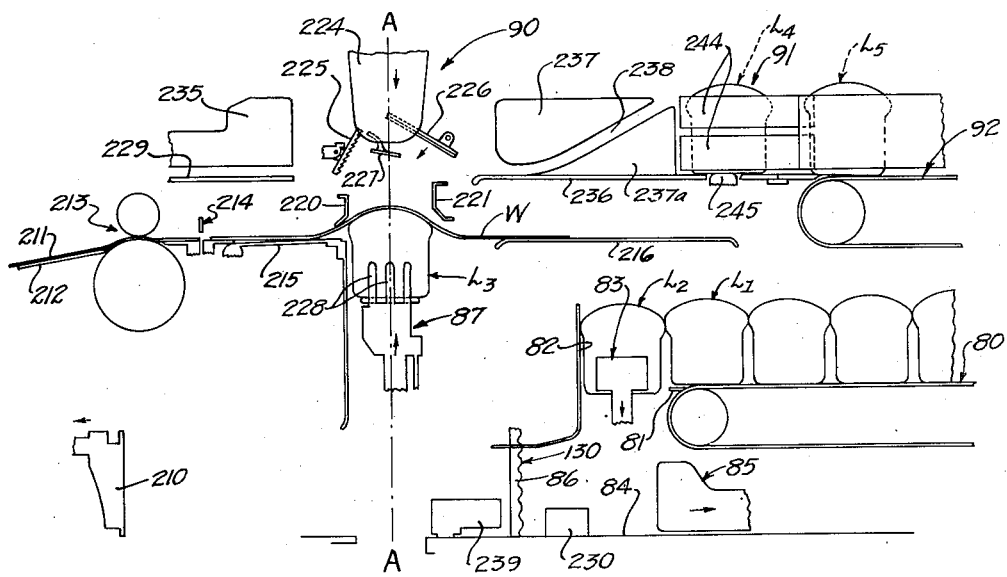

Fig. 52 shows the position of the loaves and the operating parts at approximately 60° of the cycle. In this position fingers 81 have been fully retracted, loaf gripping and lowering mechanism 83 has fully gripped the loaf and has started its downward movement, while ram 85 continues to retract. Wrapper blank W, having been engaged by loaf $L_3$, is now being moved upwardly by the loaf and is about to engage side folding plates 220 and 221. The folding mechanism 90 is at this time moving to a position to receive upwardly moving loaf $L_3$, and it will particularly be noted that primary end folding plates 224 are now moving downwardly.

Figure 53:
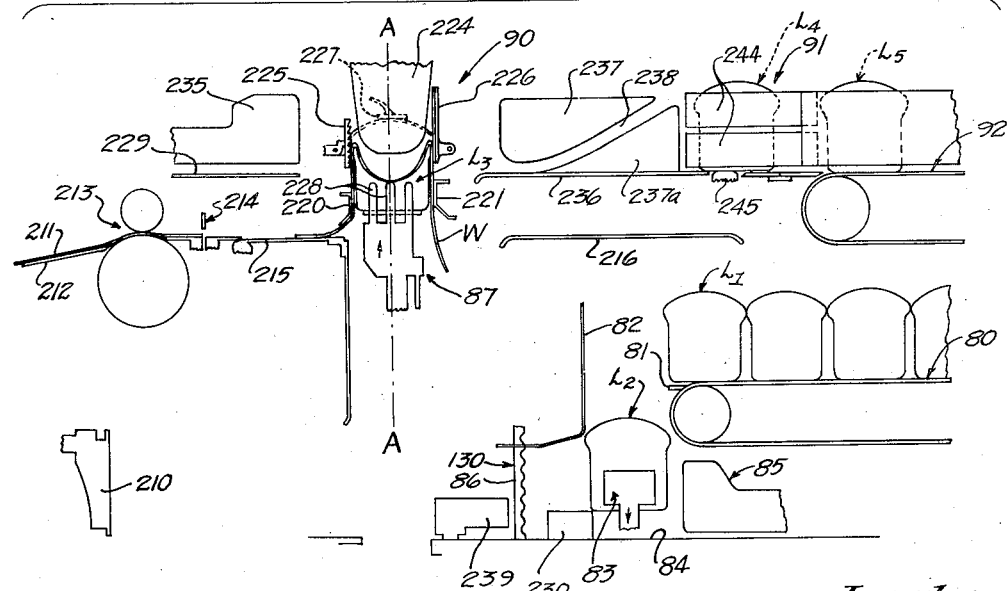

In Fig. 53, the position of the loaves and the operating parts is at approximately 84° of the cycle. In this position loaf $L_2$ is being moved downwardly toward table 84, ram 85 being at its limit of movement away from line A—A. Loaf $L_3$ has by this time been moved upwardly between side folding plates 220 and 221 which have caused the wrapper to be draped downwardly along the sides of the loaf. The upper portion of the loaf has passed between side engaging plates 225 and 226. It will be noted in Fig. 52 that plates 225 and 226 hang, by their own weight, in a tilted position, and that movement of the loaf between these plates, as in Fig. 53, causes them to be righted. Plates 225 and 226 in this instance serve to draw the wrapper tightly over the top of the loaf and also to hold the loaf from sidewise movement. Primary end folding plates 224, which are spaced to receive the ends of the loaf, have by this time reached their limit of downward movement, and, as the loaf passes upwardly between plates 224, the upper portion of the wrapper, which extends beyond the ends of the top of the loaf, is folded down against the ends of the loaf. A top plate 227 rests, by its own weight, upon the top of the loaf and, with plates 225 and 226, serves to hold the wrapper from shifting relative to the loaf. Fingers 228, projecting upwardly from elevator 87, are positioned to engage the ends of the loaf and thus hold it from endwise movement. These fingers are carried upwardly with the elevator until their upper ends arrive at a position just below the horizontal plane of bottom folder plate 229, at which position they are held from further upward movement. The elevator, however, continues to move the loaf upwardly until the bottom surface of the loaf is well above the plane of the bottom folder plate (as shown in Fig. 54).

Figures 54, 55:
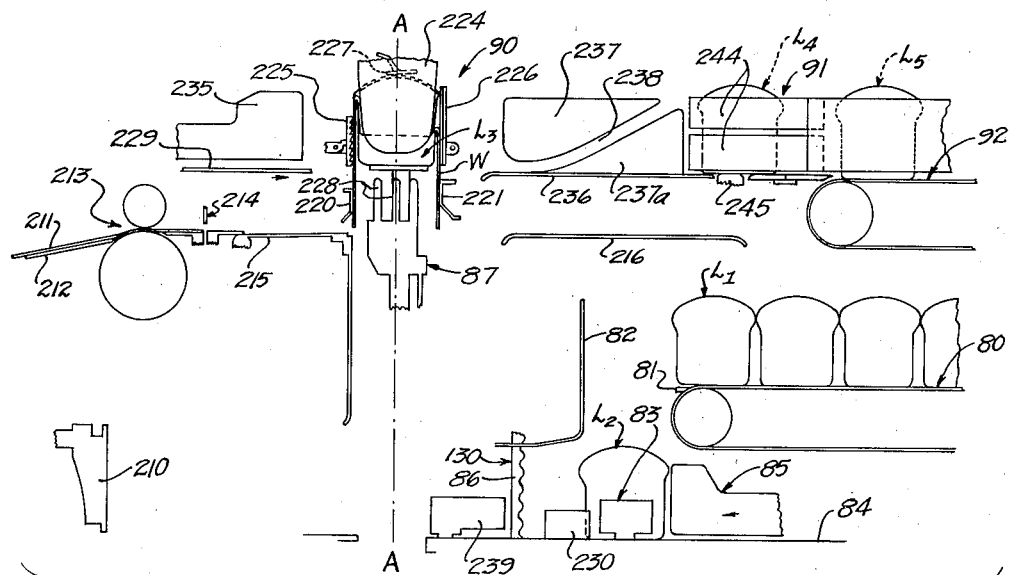

The position of the loaves and the operating parts shown in Fig. 54 is at approximately 96° of the cycle. At this time, loaf gripping and lowering mechanism 83 is in the act of releasing loaf $L_2$ which has been deposited on table 84. Loaf $L_3$ has approximately reached its uppermost position. Bottom folder plate 229 is now moving to the right, toward line A—A to perform a folding operation.

Fig. 55 shows the position at approximately 144° of the cycle. In this position, loaf gripping and lowering mechanism 83 has released loaf $L_2$ and is now moving upwardly to receive the next loaf $L_1$. Rams 85 and 210 have by this time started their movement toward line A—A; ram 85 having moved loaf $L_2$ a distance toward slicer blades 86. During this movement, loaf $L_2$ passes between a pair of guides 230 which serve to center the loaf with respect to the slicer unit. Referring to loaf $L_3$, bottom folder plate 229 has by this time moved inwardly to fold that portion of the wrapper which depends from the left side of the loaf, upwardly against the underside of the loaf. Just prior to this position, the elevator starts downwardly and the loaf is momentarily held in its elevated position by plates 224, 225 and 226 as plate 229 passes beneath the loaf. Thus loaf $L_3$ is transferred from the elevator to the bottom folder plate. After reaching the position shown in Fig. 55, plate 229 dwells in that position, while a pair of secondary end folding plates 235 advance toward center line A—A. These secondary end folding plates are spaced slightly further apart than primary end folding plates 224 so that they may pass, with suitable clearance, outside of plates 224.

Figure 56:
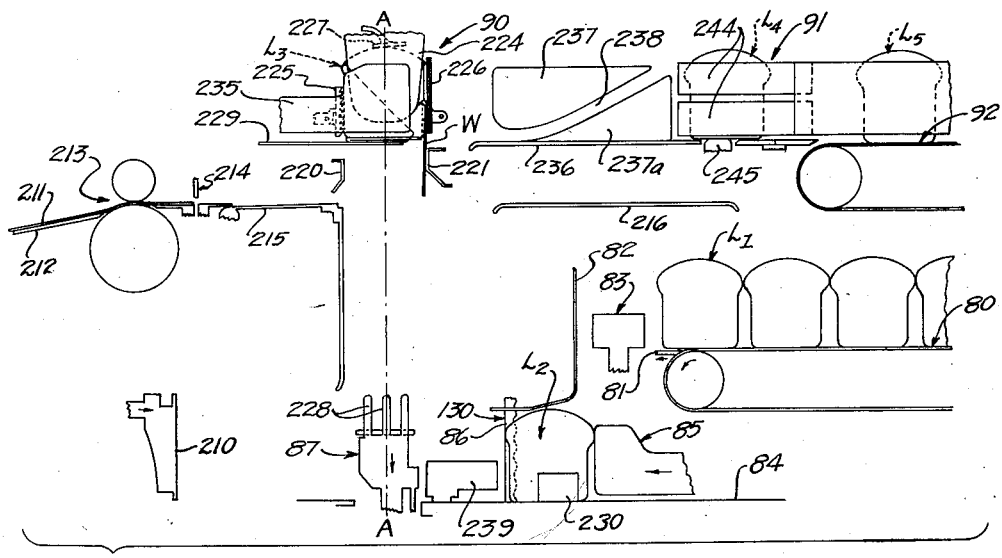

Fig. 56 shows the position at approximately 180° of the cycle. In this position, intermittent infeed conveyor 80 and fingers 81 are moving loaf $L_1$ inwardly toward plate 82; loaf gripping and lowering mechanism 83 is at its uppermost position; ram 85 is moving loaf $L_2$ through the slicer; and elevator 87 is moving downwardly to receive loaf $L_2$.

Secondary end folding plates 235 have, during their inward or advancing movement, engaged the projecting portions of the wrapper that extend from the ends of the left side of the loaf and have folded those portions over the ends of the loaf outside of primary end folding plate 224. As plates 235 near the end of this portion of their travel (as shown in Fig. 56), side engaging plate 226 and primary end folding plates 224 are immediately moved away from the loaf, plate 226 moving to the right and upwardly, and plates 224 moving upwardly. In the event that plates 224 have a tendency to carry the loaf ($L_3$) upwardly, such movement of the loaf is resisted by means of top plate 227 which rests upon the loaf. As plates 224 and 226 are thus moved away from the loaf, said loaf then, if such has not previously occurred, comes to rest upon the bottom folding plate 229. Side engaging plate 225, bottom folding plate 229, secondary end folding plate 235, and top plate 227 then simultaneously move to the right to a position illustrated in Fig. 57.

Figure 57:
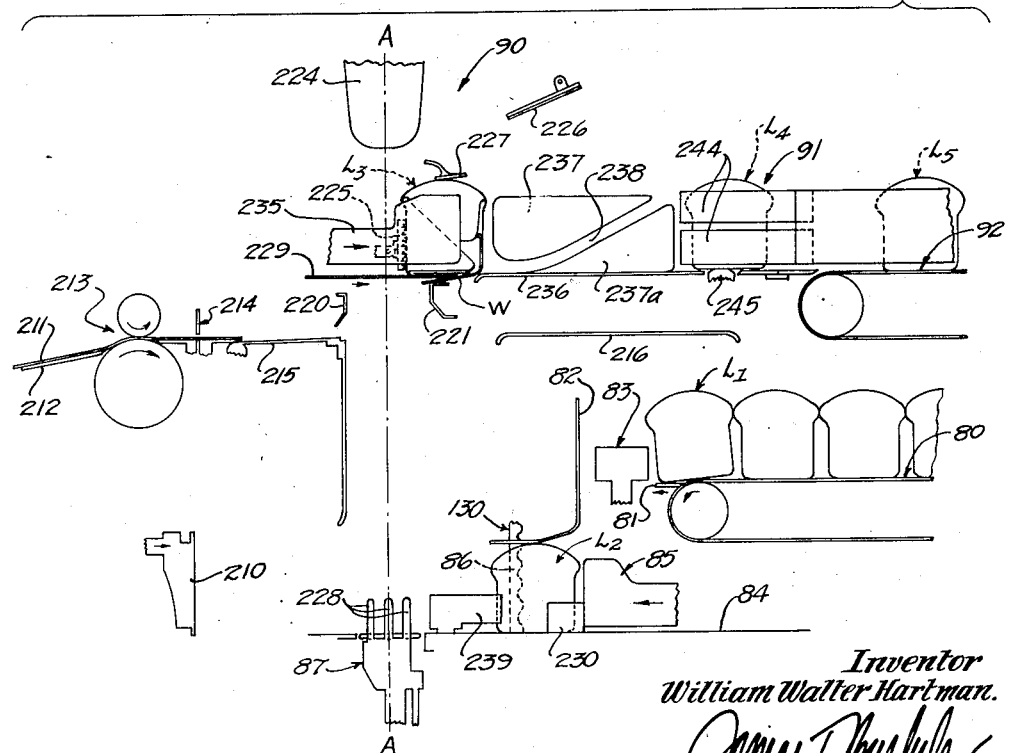

The position shown in Fig. 57 is at approximately 216° of the cycle. In this position, loaf L₃ has been moved toward a loaf receiving plate 236. As the portion of the wrapper that depends from the right side of the loaf engages the leading edge of plate 236, it is folded by that plate against the underside of the loaf. Bottom folding plate 229 continues to move to the right with elements 225, 227 and 235, until it nears the leading edge of plate 236, then slows down and finally stops a short distance therefrom. Elements 225, 227 and 235, however, continue their movement to the right and thus slide the loaf off of plate 229 and onto plate 236.

It will be noted in Fig. 57 that the wrapper feed mechanism 213 has started to feed the wrapper across support 215. The wrapper feed starts during the inward movement of rams 85 and 210 so that during the time it takes the next loaf (L₂ in this instance) to move to the position of loaf L₃ in Fig. 51, the wrapper will have been fed out to the proper length and severed.

Fig. 58 shows the position at approximately 240° of the cycle. Loaf L₃ in its movement from the position of Fig. 57 to the position of Fig. 58 passes between the ends of a pair of parallel end plates 237 which are spaced just outside the ends of the loaf. During this movement, the portions of the wrapper that extend outwardly from the ends of the right side of the loaf first engage the leading edges of plates 237 and are then, as the loaf moves further, folded by said plates backwardly against the ends of the loaf. Secondary end folding plates 235 reach their limit of movement toward the right as they arrive at the position of Fig. 58, a short distance from plate 237. Side engaging plate 225, however, continues to move the loaf to the right and between plates 237. Wrapper 211 is now being fed across the support 215 and, as will be noted, support plate 216 is moving to the left in order to support the wrapper as the leading edge thereof passes from support 215 and across center A—A.

In order to hold each sliced loaf in unitary relation as it passes from the slicer to the elevator, a pair of transversely spaced guides 239 are provided. These guides are positioned to engage the ends of each loaf as it passes from the slicer and serve not only to prevent the slices from separating but also to guide the loaf between the transversely spaced fingers 228 of the elevator. Loaf L₂ is at this time passing through the slicer and between the guides.

Fig. 59 shows the position at approximately 300° of the cycle. As loaf L₃ moves from the position of Fig. 58 to the position of Fig. 59, the last folding operation of the wrapper is performed, i. e., the folding of the portions of the wrappers that extend from the ends of the bottom of the loaf, against the ends of the loaf. Thus as the loaf moves to the right from the position of Fig. 58, the projecting portions of the wrapper enter spaces 238 between plates 237 and 237a and ride upwardly along the inclined upper edges of plates 237a, finally coming into position against the end of the loaf. Having arrived at the position of Fig. 59, the loaf is completely wrapped and is now ready to be moved into the sealing compartment 91. From this position, side engaging plate 225 moves the loaf to the right until it is centered in the sealing compartment between two pairs of loaf end engaging fingers 244 and over a plurality of bottom engaging fingers 245. Fingers 244 and 245 are provided with suitable heating elements, fingers 244 being spring-pressed to engage and seal the overlapping portions of the wrapper at the ends of the loaf, and fingers 245 being spring-pressed to engage and seal the overlapping portions of the wrapper on the underside of the loaf. The position at which the loaf is centered within the sealing compartment is shown in the 360° (zero degree) position illustrated in Fig. 50. It will be noted in Fig. 59 that the bottom folding plates and the secondary end folding plates 229 and 235, respectively, are moving to the left and away from plates 236 and 237. It will also be noted that wrapper support plate 216 has reached its limit of movement toward the left, and that the wrapper is now passing over the support plate. The slicing of loaf L₂ is nearly completed and ram 85 will continue to move toward the left until the loaf is deposited on the elevator. Fingers 81 continue to move outwardly until loaf L₁ abuts stop plate 82. Thus during the next sixty degrees of movement, the parts are moved to the original position of Fig. 50, completing the cycle. It will be noted that one loaf is sliced during each such cycle of operation, and is wrapped during the succeeding cycle, so that for each cycle of operation one loaf is wrapped and the next following loaf is sliced.

*Machine main frame and drive*

The frame of the machine, generally indicated at 100 (see particularly Figs. 1, 2, 3 and 32), comprises a front side member 101, a rear side member 101a, and a plurality of transverse members which will later be described. Member 101 is comprised of vertical end members 102 and 103, vertical intermediate member 104, upper offset horizontal members 105 and 106, and lower horizontal member 107. Member 101a is comprised of vertical end members 110 and 111, vertical intermediate member 112, upper offset horizontal members 113 and 114, and lower horizontal member 115. Legs 116, attached to side members 101 and 101a, support the machine.

In the preferred illustrative form of the invention, the loaf feeding and handling, paper feeding and loaf wrapping elements are all driven from a single cam shaft powered by the prime mover of the machine. As shown in Figs. 32 and 35 to 39 inclusive, this cam shaft comprises a horizontal shaft 250 extending transversely of the machine and cams 251 to 259, inclusive, keyed thereto. Shaft 250 is journalled in bearings 260 and 261 mounted within a cam box 262, which in turn is mounted at its ends on horizontal members 107 and 115 of frame sides 101 and 101a, respectively, and serves as a transverse frame member.

A main drive motor 266 is carried by the underside of frame 100 (see Figs. 2 and 3), and is provided with a pulley 267 which drives pulley 268 via belt 269, pulley 268 (see Fig. 35) being rotatably mounted on a shaft 270 which is journalled in bearings 271 and 272 mounted in box 262 and within the end of shaft 250, respectively. A clutch 273, operated by rock shaft 274 (Figs. 2 and 35), provides releasable drive connection between pulley 268 and shaft 270. Shaft 274 is journalled in hangers 275 and carries at one end a manually operable lever 276 (see Fig. 3). Shaft 274 is bent into a U-shape at 277 to provide clearance during installation and removal of the slicer unit. A rock shaft 278 is operatively connected with shaft 274, as by arm 279 connected with lever 276 by link 280 (see Figs. 2 and 3), and carries at its left end (as viewed in Fig. 1)

a manually operable lever 281. It will readily be seen that shaft 274 may be rotated to throw clutch 273 in or out by manual operation of either of the levers 276 and 281.

The aforementioned cam shaft 250 is driven from shaft 270 through a reduction gear train generally indicated at 285 (Fig. 35), and comprising a small pinion 282 mounted on shaft 270, a large gear 283 meshing with pinion 282 and mounted on a countershaft 284, a small pinion gear 286 mounted on shaft 284, and a large gear 287 in mesh with pinion 286 and rigidly mounted on the end of cam shaft 250.

Cam box 262 is formed with integral webs 288 and 289 providing mountings for bearing blocks 290 and 291, respectively. Blocks 290 and 291, which are mounted on opposite sides of shaft 250 and extend parallel therewith, are notched as indicated at 292 to provide slide way supports for each of a plurality of cam follower bars 301 to 309, inclusive, which extend above and across cam shaft 250 between the cams. In their consecutive order, cam follower bars 301 to 309, are positioned adjacent cams 251 to 259, respectively, and are reciprocated by said cams by means of rollers 300 carried by the cam follower bars and engaging in cam grooves 300a formed in the faces of adjacent cams (as typically illustrated in Fig. 36 and Fig. 37).

As illustrated in Figs. 35, 36 and 39, rack teeth 293 are formed on cam follower bar 301 and are adapted to mesh with a pinion 311. Thus, as rack bar 301 is reciprocated by cam 251, pinion 311 is oscillated by rack 293. Pinions 312, 313 and 314 are similarly oscillated by racks formed on cam follower bars 302, 303 and 304, respectively. Pinions 311, 312, 313 and 314 are formed on nested, relatively rotatable tubular shafts 321, 322, 323 and 324, respectively, which are supported by bearings 310 and 320. Sprockets 331, 332, 333 and 334 are keyed to the projecting ends of tubular shafts 321, 322, 323 and 324, respectively.

Pinions 315 to 318, inclusive, carried by nested, relatively rotatable tubular shafts 325 to 328, inclusive, are in a similar manner respectively oscillated by rack teeth 293 formed on cam followers 305 to 308, inclusive. Shaft 329, rotatable within innermost tubular shaft 328, carries pinion 319 and is oscillated by cam follower 309. Shafts 325 to 329 inclusive, are supported by bearings 330 and 340, as indicated in Fig. 38. Sprockets 335 and 338 are keyed to the projecting ends of shafts 325 and 328, and crank arms 336, 337 and 339 are keyed to the projecting ends of shafts 326, 327 and 329, respectively. Thus, sprockets or crank arms 331 to 339 are oscillated in a manner directly proportional to the characteristics of their respective cams 351 to 359.

*Infeed mechanism*

As illustrated in Fig. 3, frame 100 includes a transverse frame member 350 which is secured at its ends to vertical frame members 103 and 111. Transverse frame member 350 has secured thereto a pair of hangers 351 (see Figs. 3 and 6), and secured to the upper portion of each hanger is a bracket 352. Each of the brackets is provided with a pair of vertically extending arms 353 upon which the horizontal portion of infeed conveyor 80 is mounted.

As shown in Figs. 1 and 4, the present preferred infeed conveyor 80 comprises a set of transversely spaced conveyor belts 358 passing over pulleys 359 and 360 and a second set of transversely spaced conveyor belts 361 passing over pulley 360 between belts 358 and over pulley 362. The upper run of belts 358 inclines upwardly into the machine, and passes over an inclined support plate 363, while the upper run of the second set of belts 361 is horizontal and passes over a horizontal support plate 364 (see Figs. 4 and 6). Intermediate pulley 360 is fixed to a shaft 367 which is mounted for rotation in the outer ends of a pair of transversely spaced bars 368, which are supported as later to be described. Pulley 362 is carried by a shaft 369 which is similarly mounted for rotation between the inner ends of bars 368. Bars 368 also provide a mounting for horizontal support plate 364.

Support plate 363 is supported at its upper end by a pair of brackets 372 which encircle shaft 367. A pair of brackets 373 are attached to the lower end of support plate 363 and rotatably receive a shaft 374 upon which pulley 359 is mounted (see Figs. 1 and 1a). The hub portions 379 of brackets 373 are slidably received by horizontal ways 375 formed in a pair of guide blocks 376 mounted on a pair of uprights 377. Conveyor belts 358 are individually provided with tensioning idlers generally indicated at 378.

As shown in Figs. 3 and 6, each pair of bracket arms 353 threadedly receives a lead screw 371 extending longitudinally of the conveyor, the reduced end portions of each of said screws being journalled within lugs 370 which are attached to the undersides of the aforementioned conveyor pulley carrying bars 368. One of the lead screws 371 (Figs. 3 and 4) carries at its outer end a bevel gear 380, and meshing therewith is a second bevel gear 381 which is journalled in a bracket 383, the latter gear being provided with a hand crank 382. Thus lead screw 371, to which bevel gear 380 is attached, may be rotated by manual operation of hand crank 382, while a chain 384 passing over sprockets 385 attached to the lead screws drives the other lead screw. Rotation of lead screws 371 by crank 382 effects translation of bars 368, and in this manner the infeed conveyor unit may be moved bodily toward or away from stop plate 82 to adjust the spacing between the inner end of the infeed conveyor unit and the stop plate for loaves of various widths. Bars 268 are apertured to provide longitudinally extending horizontal ways 390 which slidably receive the end portions of a transversely extending slide member 391. The aforementioned bread support fingers 81 are mounted on and project forwardly from slide member 391 passing between the spaced conveyor belts 361 and through annular grooves 392 formed in pulley 362 between those portions which are engaged by the conveyor belts. The upper sides of these fingers 81 are located just below the upper surface of belts 261 (see Fig. 6). As shown best in Fig. 4, in the present form of the machine, seven of such support fingers 81 are provided, of which the two outside fingers at each side are of reduced length in order to afford clearance for loaf lowering mechanism 83.

Fingers 81 are reciprocated toward and away from stop plate 82 through a driving connection between slide member 391 and the previously described cam shaft driven crank arm 337 (Fig. 32). Referring to Figs. 1, 2, 3 and 6, a rock shaft 396 is journalled within hangers 351 and 397, the latter being attached to frame member 111. Carried by the end of the shaft 396 which projects toward the rear side of the machine (that seen in Fig. 1), is an offset arm generally indicated at 398. This arm comprises a pair of spaced bars 399 which are attached to and extend downwardly from a member 400 which is rotatably mounted on rock shaft 396. As illustrated in Figs. 32 and 34, a link 401 is pivotally connected at one end to crank arm 337 and at its other end to an adjustable clamp generally indicated at 402. As indicated in Fig. 34, the adjustable clamp comprises a T-shaped member 403 and a clamping plate 404 which engage opposite edges of bars 399, the reduced portion of member 403 being received within the space between the bars. Member 403 and plate 404 are clamped against the edges of bars 399 by a bolt 405 passing through plate 404 and threadedly received by member 403, bolt 405 being provided with a hand knob 406. Link 401 is provided with a forked end 408 which is fulcrumed on a stub shaft 407 passing through the T-shaped member. Shaft 407 is held from endwise movement by bolt 405 which passes through it. Clamping plate 404 is provided with a pair of V-shaped projections 409, which are adapted to be received within complemental notches 410 which are provided in the corresponding edges of bars 399. By loosening bolt 405, the adjustable clamp may be moved upwardly or downwardly from the position indicated in Fig. 2 and thus increase or decrease the angular movement of arm 398 for a given stroke of link 401.

Member 400 is rotatable relative to rock shaft 396 but is confined against longitudinal movement thereon, as by a screw 400a, arm 398 carried by member 400 being drivingly connected with rock shaft 396 by means of a clutch generally indicated at 416 (Figs. 3 and 32). This clutch includes a member 417 which is splined to rock shaft 396 and which is movable toward and away from member 400 by means of a fork arm 418 attached to the rear end of a push rod 419. This push rod extends transversely through the frame of the machine and outwardly from the front of the machine where it is operatively connected to a manually operated lever 420, the lower end of which is pivoted on clutch operating shaft 274. Clutch member 417 has integrally formed thereon an upturned clutch flange 421 provided with a pin 422 which is adapted to register with and be received within a hole 424 provided in the flange 423 of member 400.

As illustrated in Figs. 2, 3 and 4, rock shaft 396 has keyed thereto, just outside of hangers 351, a pair of segmental gears 414. Racks 415 attached to the projecting end portions of slide member 391 mesh with these segmental gears. Thus, oscillation of rock shaft 396 acts through these segmental gears and racks to cause longitudinal reciprocation of slide member 391, and therefore reciprocation of loaf sustaining fingers 81 toward and away from stop plate 82.

The above described driving connection between crank arm 337 and fingers 81 is operated in accordance with the effective characteristics of cam 257 as diagrammatically illustrated in Fig. 46. The preferred type of cams within the cam box, as here shown, are of the grooved or double surface type as typically illustrated in Figs. 36 and 37. The cam curves as illustrated in Figs. 40 to 48, inclusive, are simply diagrams showing the effective center lines of the cam grooves, these cam groove center lines being followed by the centers of the associated cam followers. In referring to Figs. 40 to 48, inclusive, the diagrammatically represented cam curves will for convenience be considered as though they were the actual cams which they represent.

As cam 257 rotates in a counter-clockwise direction from the position illustrated in Fig. 46, its follower 300 is moved toward the left until the point 257b of the cam reaches the line x—x which represents the path of follower movement. Thereafter, the cam moves the follower toward the right until the point 257a reaches line x—x. as point 257a passes line x—x, continued rotation causes the follower to move toward the left until point 257b again reaches line x—x. It is evident that movement toward the left represents the greater portion of the cycle and is much slower than the movement towards the right. Movement of the follower towards the left causes clockwise movement of the crank arm 337 (as viewed in Fig. 32) and movement of loaf sustaining fingers 81 toward stop plate 82. Thus, the fingers have a comparatively slow movement toward and a quick movement away from the stop plate as indicated in Fig. 49.

Infeed conveyor 80 is intermittently driven in timed relation with fingers 81 by a driving connection with rock shaft 396. Referring to Figs. 1, 3 and 6, shaft 367, which carries intermediate conveyor belt pulley 360, projects from bar 368 toward the rear side of the machine and carries on its end a sprocket 427, which is connected by chain 429 with a sprocket 428 mounted on rock shaft 396. Sprocket 428 is drivingly connected with rock shaft 396 by means of a roller racket clutch generally indicated at 430. This clutch, which is typically illustrated in Figs. 22 and 23, comprises a spider-shaped driving member 431 keyed to the rock shaft and a driven member 432 which is rotatable on the shaft. Sprocket 428 is mounted on the driven member 432 and fixed thereto as by set screw 435. When rock shaft 396 is rotated in a clockwise direction (see Figs. 1 and 22), member 432 and sprocket 428 are driven in the same direction through the action of rollers 433 wedging between the spider and the driven member. However, when the shaft is rotated in the opposite direction, the rollers move out of wedging engagement and member 432 and the sprocket remain stationary. The rollers are constantly held in engagement with members 431 and 432 by means of spring pressed plungers 434. Thus, as the shaft begins its clockwise movement, the rollers immediately move into wedging engagement and thus cause the sprocket to be driven throughout said movement, while during anti-clockwise movement of the shaft the rollers release member 432 and sprocket 428 remains stationary. The infeed conveyor is therefore actuated to feed only during the time that fingers 81 are moving toward the stop plate, and to feed at the same linear speed as that of the fingers, while during the time that the fingers are retracted (moved away from the stop plate), the infeed conveyor remains stationary. It will be evident that fingers 81 may be considered as a retractible extension of the infeed conveyor.

Referring now to Figs. 32 and 46, as point 257b of cam 257 reaches line x—x, arm 398 is at its limit of clockwise movement, and fingers 81 reach their limit of inward movement toward stop plate 82. At this limit position, arm 398 is approximately at right angles to link 401. Accordingly, adjustment of clamp 402 along arm 398 does not materially alter this position of said arm. Consequently, insofar as adjustment of clamp 402 is concerned, the limit of clockwise movement of the arm is fixed, though, as will be evident, the limit of counter-clockwise movement of said arm will vary with the position of clamp 402 along arm 398. Thus, the limit of movement of fingers 81 toward stop plate 82 is fixed while the limit of movement away from the stop plate is adjustable. Movement of clamp 402 upwardly from the position shown in Fig. 32, for instance, serves to adjust the infeed for a greater width of loaf, in that it increases the angular movement of rock shaft 396 and thereby increases the linear travel of the infeed conveyor and the fingers.

As hereinbefore described, the infeed conveyor is adjustable toward and away from stop plate 82 in order to pass loaves of various widths between stop plate 82 and a vertical guide plate 82a (Fig. 6) supported in any suitable manner on conveyor support bars 368. To allow for this adjustment, chain 429 (see Fig. 1) is provided with a sufficient amount of slack, and this slack is taken up by idler 440 which is yieldingly pressed against the chain by spring 442. The idler is carried on the end of an arm 441 pivoted on rock shaft 396.

As above described with reference to Figs. 50 to 59, inclusive, each loaf, as it passes the end of the infeed conveyor, is moved against stop plate 82 by fingers 81, and is then gripped at its ends by a loaf gripping and lowering mechanism 83 which holds said loaf in a suspended position while fingers 81 are retracted, and then lowers the loaf to a position directly below on table 84. One typical loaf gripping and lowering mechanism will now be described in more detail, reference being had to Figs. 1 to 4 inclusive, 6 and 11 to 13 inclusive.

Referring more particularly to Fig. 6, mechanism 83 is supported by a housing 445 which is attached to frame member 350 and to track bar 122. Mounted for vertical movement within vertical bore 448 of housing 445 is a vertical, cylindrical member 447. A transversely extending housing 446 is formed integral with the upper end of member 447 and has attached to its ends a pair of transversely extending arms 449 (see Fig. 11). The outer upturned ends of these arms are apertured to slidably and rotatively receive the reduced end portions 451 of a threaded shaft, generally indicated at 450.

Shaft 450 is comprised of axially alined shaft portions 454 and 455 which are keyed against relative rotation but are axially movable relative to one another. As here shown, the adjacent ends of shaft portions 454 and 455 project through bores 456 in housing 446 and are provided with diametrical slots 457 which receive the ends of a flat rectangular key 458. Shaft portions 454 and 455 are provided with screw threads 460 and 461, respectively, which are of opposite pitch. Threadedly engaging the two sections 454 and 455 of shaft 450 and carried thereby are a pair of vertically extending arms 452 which carry at their upper ends the loaf gripping elements, as will be described. The arms are transversely and vertically movable within slots 443 provided in the opposite sides of table 84, and are held in their upright position by means of guide portions 453 which are formed integral with arms 452 and which bear on opposite sides of arms 459. Thus, upon rotation of the shaft, as by manual operation of hand knob 462, arms 452 may be adjusted toward or away from one another.

The loaf gripping elements, generally indicated at 465, are comprised of horizontal tubular members 466 having heads 467 formed on their inner ends, the opposed faces 468 of the two heads being roughened or knurled for gripping purposes. The tubular members 466 are slidably received within bores 469 in bosses 470 which are formed on the upper ends of arms 452. Longitudinal movement of tubular members 466 within bores 469 is limited by means of bolts 471 which pass through longitudinal slots 472 provided in the tubular members. The loaf gripping elements are yieldingly held at their limit of inward movement relative to arms 452 by means of compression springs 473 which bear at one end against heads 467 and at the other end against bolts 471.

Loaf gripping elements 465 are moved inwardly to grip the loaves and outwardly to release the loaves through a driving connection between crank arm 339 and shaft sections 454 and 455, as will now be described. As shown in Figs. 3 and 32, a transversely extending shaft 476, journalled within bearings 477 mounted on the frame of the machine, carries on its rearward end a crank arm 478, which is connected with crank arm 339 by link 479. A bevel gear 480 (see Figs. 3 and 6) is mounted on the other end of shaft 476 and meshes with a bevel gear 481 attached to the lower end of a vertically extending shaft 482. Shaft 482 is journalled for rotation within housing 445 but is held from axial movement by means of set collar 483 and the hub of gear 481 bearing on the top and bottom, respectively, of the housing. Shaft 482 extends upwardly from housing 445 and through housing 446. A spur gear 486, which is vertically positioned within housing 446 (see Figs. 6, 11, 12 and 13), is slidably mounted on shaft 482 and is keyed against rotation thereon by means of key 485 which is pinned to gear 486 and projects within key way 484 provided in shaft 482. Key way 484 extends from collar 483 to the upper end of shaft 482 in order to accommodate the full range of vertical movement of gear 486 and housing 446. Gear 486 meshes with and drives a second spur gear 487, integral the stub shaft portion 489 of which is journalled within bearing 488 concentric within cylindrical member 447. Gear 487 is provided with a pair of diametrically opposed, eccentric pins 490. A pair of links 491 are pivotally connected at one end to pins 490, and are pivotally connected at their other end to pins 492 which depend from rectangular blocks 493. Blocks 493 are apertured to rotatively receive shaft sections 454 and 455, but are held from longitudinal movement relative thereto by set collars 494 as illustrated. The vertical edges of blocks 493 slidably engage the vertical side walls 495 of housing 446 and are thus held against rotative movement.

The throw of cam 259 which actuates crank 359, and the driving connection with spur gear 487 are so proportioned that gear 487 will be oscillated through an angle less than 180°. Fig. 12 illustrates the limit of outward movement of links 491. In this position, which corresponds to that of Fig. 11, links 491 have, through blocks 493 and collars 494, moved shaft sections 454 and 455 outwardly and have thus moved bread gripping elements 465 outwardly to loaf releasing position. As gear 487 is moved to its other limit of movement, as illustrated in Fig. 13, blocks 493 are moved inwardly by links 491 and thus move shaft members 454 and 455 and loaf gripping elements 465 inwardly to loaf gripping position. In operation, loaf gripping elements 465 are adjusted toward or away from each other, as by manual operation of knob 462, as previously described, to provide ample clearance between the gripping faces 468 and the ends of the loaf as it is carried from infeed conveyor 80 by fingers 81 when said gripping elements are at their limit of outward movement, and yet to grip the loaf firmly, though without unduly compressing it, at their limit of inward movement. The loaf gripping elements are moved inwardly from their limit of outward movement until faces 468 engage the ends of the loaf, whereupon continued movement of arms 452 to the limit of inward movement causes springs 473 to be compressed. The adjustment of the device must of course be such that faces 468 are urged into gripping engagement with the loaf with just such pressure as will assure positive handling of the loaf without causing crushing of the loaf.

As hereinbefore stated with reference to Figs. 50 to 59 inclusive, the loaf having been carried inwardly by fingers 81 and gripped by the gripping mechanism is then lowered to table 84. This vertical movement is caused by axial movement of cylindrical member 447 within housing 445 as will now be described. Referring more particularly to Figs. 6 and 32, a transversely extending shaft 497 is journalled within suitable bearings carried by the frame and within housing 445, and has attached to its rearward end a sprocket 498 which is connected with sprocket 338 by chain 499. A gear 500 is keyed to the inner end of shaft 497 and is positioned within housing 445 to mesh with a vertical rack gear 501 which is attached to cylindrical member 447. Rack gear 501 is received within way 502 of housing 445 and co-acts with said way to confine cylindrical member 447 against rotation. As sprocket 338 is oscillated by its drive connection with cam 258, gear 500 is oscillated by its connection with sprocket 338 through chain 499, sprocket 498, and shaft 497, and thus cylindrical member 447 is vertically reciprocated in accordance with the characteristics of cam 258. The throw of cam 258 and its driving connection with rack 501 are proportioned so that loaf gripping elements 465 (carried by member 447) move between an upper limit of vertical movement which is slightly above the horizontal plane of fingers 81 and a lower limit of vertical movement which is slightly above table 84.

With cam 259 in the position illustrated in Fig. 48, cam follower 300 is at its limit of movement toward the right along line x—x which corresponds to the outward limit of movement of gripping elements 465. As the cam rotates in a counter-clockwise direction from this position, the cam follower remains at this limit of movement until point 259a of the cam coincides with line x—x. Further counter-clockwise movement of the cam causes the follower to move toward the left along line x—x, and causes the gripping elements carrying arm 452 to be moved inwardly, until point 259b of the cam reaches line x—x. The gripping elements are carried inwardly by arms 452 but are arrested from further inward movement by their engagements with the end of the loaf at a point, depending upon the adjustment, which may be substantially midway between points 259a and 259b. As the cam rotates further in a counter-clockwise direction, moving point 259b of the cam from line x—x, the cam follower remains or dwells at its limit of movement toward the left and arms 452 accordingly remain at their inward limit of movement until point 259c of the cam reaches line x—x. During this dwell, the gripping elements are moved downwardly by cam 258 (see Fig. 47). With cam 258 in the position illustrated in Fig. 47, its follower is at its limit of movement toward the right along line x—x which corresponds to the upper limit of vertical movement of the gripping elements. As cam 258 rotates in a counter-clockwise direction, its follower remains at is limit toward the right along line x—x until point 258a passes line x—x whereupon the follower is moved toward the left, which causes downward movement of arms 452 and the gripping elements. The follower continues to move toward the left until point 258b of the cam reaches line x—x, at which point the follower is at its limit of movement toward the left and accordingly arms 452 and the gripping elements are at their limit of downward movement.

The shape of cam 258 from point 258a nearly to point 258b is preferably such that, with the machine running at normal speed, the gripping elements will descend with an acceleration substantially approximating gravity. The reason for this is that the loaf, which is still ordinarily warm and soft, is unsupported in the middle during the lowering operation, and if the gripping elements move down with an acceleration substantially less than gravity, the loaf sags in the middle. It is also desirable to get the loaf down and in front of ram 85 as quckly as possible after the ram has moved rearwardly of the loaf in order that the ram may start its forward stroke at the earliest possible instant, thus saving time in the cycle which may be allotted to the slicing period. Lowering the loaf with an acceleration approximating gravity meets the requirements stated to best advantage. The cam is so designed, of course, that the gripping elements are brought to a gradual stop at the end of the lowering operation. It will be noticed by comparing Figs. 47 and 48 with the timing diagram (Fig. 49) that points 258a of cam 258 and 259b of cam 259 lie substantially in the same radial plane. Accordingly, as arms 452 reach their limit of inward movement, they are immediately moved downwardly. As compared with Fig. 46, point 257b of cam 257 lies in a radial plane substantially midway between points 259a and 259b of cam 259 which correspond to the point of engagement of the gripping elements with the ends of the loaf. Thus, at the same time that the loaf is gripped by the gripping elements, fingers 81 begin to retract, and by the time points 258a and 259b reach line x—x, fingers 81 have been moved from beneath the loaf and have thus freed the loaf for downward movement. Point 257a of cam 257, at which point fingers 81 are fully retracted, lies in a radial plane which is angularly spaced behind the radial plane of points 258a and 259b. The reason for this is to provide ample clearance between the ends of fingers 81 and the side of the loaf and also to provide ample time for downward movement of the loaf before fingers 81, and the infeed conveyor, begin their inward or feeding movement. When points 258b and 259c, which lie substantially in the same radial plane, reach line x—x, the gripping elements have reached their limit of downward movement and the loaf has been deposited upon table 84. Further counter-clockwise movement of the cams then causes the gripping elements to move outwardly to release the loaf, and when point 259d reaches line x—x, the gripping elements have reached their limit of outward movement. At this time the gripping elements are being moved upwardly by cam 258 and continue to move upwardly until point 258c of cam 258 reaches line x—x. As the cams continue to rotate counter-clockwise from this point, the gripping elements dwell at their upward and outward limits of movement until point 259a again reaches line x—x. During this time, the infeed conveyor 80 and fingers 81 are moving inwardly to position the next loaf between the gripping elements.

The loaf having been deposited upon table 84 is next acted upon by reciprocating ram 85, which engages and moves it through the slicing mechanism. Before proceeding with a detailed description of the ram, however, a typical slicing mechanism and mounting therefor will be described. While the slicing mechanism per se forms no part of the present invention, its action, position and mounting are pertinent to an understanding of the invention herein claimed.

*Slicing mechanism*

Referring now to Figs. 2 and 4 and more particularly to Figs. 6 and 8, a block 120 mounted on horizontal frame member 107 is centrally recessed to provide a mounting for one end each of a pair of horizontally spaced track bars 121 and 122 which extend horizontally transversely across the machine just ahead of loaf lowering mechanism 83. The other ends of track bars 121 and 122 are mounted in a recessed block 123 which in turn is mounted on lower horizontal frame member 115. These track bars provide a horizontal slide mounting for the aforementioned slicer unit 130. An upper guide bar 124 for the slidably mounted slicer unit is carried by blocks 125 and 126 mounted on horizontal frame members 106 and 114, respectively.

While the slicer unit may be of any usual or suitable type, that here shown for illustrative purposes is of the reciprocating blade type. As here shown, the slicer unit 130 includes a frame comprising base 131, a pair of upright members 132 and 133 mounted on the base, and a pair of spacer bars 134 and 135 mounted on the upper ends of the upright members. Guide blocks 136 and 137 mounted on the upper ends of uprights 132 and 133, respectively, are recessed as at 137a for slidable reception of the aforementioned guide bar 124. Base 131 rests upon and is slidable along track bars 121 and 122, and is provided with a tongue 138 which is received within the space between the track bars. Thus the slicing unit may, when desired, be removed by movement to the left and installed by movement to the right as viewed in Fig. 8. A plate 139 mounted on the track bars acts as a stop to limit the movement to the right and thus center the slicer unit with respect to the machine. A latch 144, hereinafter to be described, is positioned to engage the left end of base 131 and lock the slicer unit in centered position.

Mounted for vertical reciprocation on upright members 132 and 133 are a pair of parallel knife carrying frames 146 and 147. The mechanism for reciprocating the frames and the method for attaching the knives to the frame may be of the same general character as disclosed in Figs. 6, 7 and 8 of my United States Patent No. 1,975,942. Attached to the ends of frame members 146 and 147 are guide members 148, each of which has an outwardly disposed tongue 149 (compare Fig. 4 with Fig. 6a). Tongues 149 are slidably taken within vertical grooves 149a formed in blocks 150 which are attached to upright members 132 and 133.

A pair of spaced bearing blocks 153 (see Fig. 8) are rigidly secured to the underside of frame member 147 by nuts 154 threaded onto the upper ends of bolt portions 155 integrally formed on the bearing blocks. A second pair of spaced bearing blocks 156 are similarly secured to the underside of frame member 146. As shown in Fig. 8, bearing blocks 156 are spaced further apart than bearing blocks 153. Connecting rods 157 and 158 are pivotally connected at their upper ends, as by wrist pins 159, to bearing blocks 153 and 156, respectively, and are formed at their lower ends with strap portions surrounding eccentrics 160 and 161, respectively, of crank shaft 162. This crank shaft is journalled in bearings 163 mounted on upright members 132 and 133. One end 164 of the crank shaft projects beyond the frame of the slicer unit and has keyed thereto a flanged hub 165. One or more tapered pins 166 are carried by the flange of hub 165 and are adapted to register with and be thrust into holes 167 provided in the face of pulley 168. The pulley is provided with a stub shaft 169 which is journalled, concentrically with crank shaft 162, in a suitable bearing 170 provided in block 123. A slicer drive motor 175 (see Fig. 6) is mounted on the frame of the machine below the slicer unit and is provided with a pulley 174, pulley 168 being driven by motor 175 through belt 173 and pulley 174.

As best shown in Figs. 6, 6a and 8, the upper horizontal portion of frame 147 is provided with a row of horizontally spaced lugs 180. Vertically spaced below lugs 180 is a second row of lugs 181. The lower horizontal portion of frame 147 is also provided with a row of horizontally spaced lugs 183. Corresponding lugs of the rows of lugs 180, 181 and 183 are in vertical alinement and each set of vertically alined lugs provides a vertical mounting for one of the plurality of knife blades 86. As indicated in Fig. 6a, each of the lugs 181 is slotted, as indicated at 182, to receive the upper end of a knife blade 86. Lugs 183 are likewise slotted to receive the lower ends of a number of the knife blades 86. In addition lugs 183 are grooved on their underside to receive pins 184 provided in the lower ends of the knife blades. The upper ends of blades 86 are provided with shanks 185 which extend through apertures provided in lugs 180. Nuts 186 are threaded on the upper ends of shanks 185 and bear down upon compression springs 187, which serve to tension the knives.

As shown in Fig. 6a, the frame 147 carries only the alternate knives of the plurality of knife blades 86. The other alternate blades are similarly carried by lugs 190, 191 and 193 which are formed on frame 146. Frames 146 and 147 are identically formed, and when placed back to back, as shown in Fig. 6a, the lugs of one are received by the spaces between lugs of the other.

Eccentrics 160 and 161 of crank shaft 162 are spaced 180° apart, and thus upon rotation upon the crank shaft, frames 146 and 147 are reciprocated in opposition to one another.

As previously described, the slicer unit is installed in the machine by placing it between track bars 121—122 and guide bar 124, and moving it to the right (as viewed in Fig. 8) until base 131 abuts stop 139, tapered pins 166 entering into holes 167 in pulley 168 and thus establishing a driving connection between pulley 168 and the crank shaft. If the machine is operated before the slicer unit is fully centered (as by base 131 abutting stop 139) interference is apt to occur between the blades and certain elements of the ram. To guard against such interference and consequent damage, a switch 198 operated by latch 144 is provided to control the circuit (not shown) of motor 175.

A manually operated latch arm 200 is pinned to a shaft 202 which is journalled in bearing 201 mounted on frame guide bar 122. As latch arm 200 is swung from unlatched to latched position (as from Fig. 10 to Fig. 9), a spring pressed cam 204, keyed to shaft 202, contacts a roller 203 on the end of a pivoted switch operating arm 205 extending from switch 198 and moves said arm from open switch position to closed switch position. Latch arm 200 is so positioned that it will not move to latching position until the slicer unit fully abuts stop 139; consequently, the slicer unit will not operate until it is fully centered with respect to the machine.

Loaf conveying and wrapping mechanism

The ram which moves the loaf through the slicing unit and its drive connection with cam 256 will now be described. Referring first to Fig. 32, a link 506 is pivotally connected at one end to crank arm 336 which is operated in accordance with the characteristics of cam 256. Link 506 is pivoted at its other end as at 507, to an adjustable slide block 508. This slide block is carried by an adjustment screw 509 which is journalled for rotation in the ends of a forked arm 511 and which is provided with a hand crank 510. Arm 511 is keyed to a transversely extending shaft 512 and oscillates said shaft by means of its connection with crank arm 336. As shown in Figs. 3 and 6, shaft 512 is journalled in hangers 351 and 397, and has keyed thereto, midway between hangers 351, a segmental gear 515. This segmental gear meshes with a rack gear 516 which is attached to the underside of a horizontal, longitudinally movable carriage generally indicated at 517. This carriage comprises a frame having longitudinally extending side members 518 (see Fig. 11) carrying rollers 519 which are received within ways 521 of transversely spaced longitudinally extending side members 520 formed integrally with brackets 352. In this manner, the carriage is guided for horizontal movement in a direction longitudinally of the machine, and is actuated by the drive connection between crank arm 336 and segmental gear 515 which, in turn, drives rack 516 secured to the carriage.

As best illustrated in Figs. 3 and 6, a pair of transversely spaced, upright posts 524 are carried by the forward end of carriage 517 and serve as a mounting for ram 85. Posts 524 extend upwardly from carriage 517 through longitudinal openings 525 in table 84 (see Fig. 11), which is mounted upon guide bars 520 and is reenforced at openings 525 by ribs 526.

Ram 85 comprises a channel-shaped mounting member 528, the flanges of which extend rearwardly, which carries a plurality of forwardly projecting, vertical, transversely spaced plates 529, which are so spaced as to be movable in between knives 86 when the ram is advanced to move the loaves through the slicer unit. The upper and lower rearwardly extending flanges of mounting member 528 are apertured to receive the reduced diameter portions 530 and 531, respectively, of posts 524.

Ram 85 is reciprocated between rearward and forward limits of movement, the rearward limit being set at a suitable clearance distance behind the loaf as it is deposited on table 84 by gripping elements 465, and the forward limit being that at which the ram has moved the loaf to a centered position with respect to the elevator. These limits are necessarily adjustable in order that the machine may accommodate loaves of various widths. For purposes of illustration, assume that the loaves being carried inwardly by the infeed conveyor are four inches wide and that the desired clearance distance is one inch. Since the loaves carried inwardly by fingers 81 are always moved up to stop plate 82 and then vertically downward to table 84, it follows that the forward face of ram 85 will, at its rearward limit of movement, be longitudinally spaced five inches to the rear of stop plate 82. Since it is desired that the loaf be centered over the elevator, the forward face of the ram at its forward limit of movement will be two inches from the center of the elevator (or line A—A). Now assuming that the loaves next to be fed into the machine are six inches in width, the limit of ram 85 will necessarily be adjusted so that at its rearward limit it will be horizontally spaced seven inches from stop plate 82 and at its forward limit it will be spaced three inches from the center of the elevator. By comparing the above illustrated cases, it will be evident that for each increment of adjustment at the forward limit of movement, there must be a corresponding adjustment in the same direction but of twice the amount at the rearward limit of movement. Adjustment of ram 85 at both limits of movement, in accordance with this requirement, is accomplished by manual operation of hand crank 510 as will now be explained. Assuming the machine to be stopped with the parts in the position illustrated in Fig. 32, crank arm 336 is at its limit of clockwise movement, which corresponds to the forward limit of movement of the ram. In the present illustrative embodiment of the invention, screw 509 is disposed on a line offset from the center of shaft 512, and at such an angle to the line connecting the center of pivot 507 with the pivot connection between crank 336 and link 506, that when rotated in a direction to cause pivot 507 to move nearer the center of shaft 512, link 506, moving about its pivotal connection with crank arm 336, will move arm 511 in a counter-clockwise direction. This movement of arm 511 causes the ram at its forward limit of movement to be adjusted a given distance away from the center of the elevator in order to accommodate a given wider loaf. At the same time the rearward limit of the ram is adjusted to accommodate the wider loaf by reason that, since the effective length of arm 511 has been decreased, the angular movement of the arm is increased, resulting in a corresponding increase in travel of the ram, the relations of the members being made such that the described increased travel of the ram sets its rearward limit of travel back substantially double the distance of the adjustment made at the forward limit of travel. For example, an adjustment movement of one inch toward or away from the center of the elevator at the forward limit of the ram, caused by a certain rotation of screw 509 and consequent movement of arm 511, brings about not only a corresponding one inch adjustment at the rearward limit of the ram, but effects an additional inch adjustment at the rearward limit by reason of the accompanying change in effective length of arm 511 and resulting increase in travel of the ram. Thus adjustment of the forward limit of travel of the ram by a given distance is accompanied by an adjustment of the rearward limit of travel of the ram of twice that distance.

The timed movement of the ram will now be described, reference being had to Fig. 45 in which the effective shape of cam 256 is illustrated. With the cam in the position illustrated, point 256a of the cam coincides with line x—x, at which position the follower is at its limit of movement toward the left and ram 85 is at its limit of forward movement. As the cam rotates in a counter-clockwise direction from this position, the follower moves toward the right along line x—x, and the ram moves rearwardly (away from line A—A) until point 256b of the cam reaches line x—x, at which point the follower is at its limit of movement toward the right and the ram is at its limit of rearward movement. As compared with Figs. 47 and 49, it will be seen that point 256b of cam 256 lies in a radial plane ahead of point 258b of cam 258 (Fig. 47). Accordingly, the timing of the ram is such that it reaches its limit of rearward movement during the time that the gripping elements are moving downwardly. The ram is moved rearwardly as quickly as possible, and as soon as it has cleared the path of the lowering mechanism and loaf carried thereby, said mechanism lowers the loaf and deposits it in front of the ram. Immediately that point 256b passes line x—x, upon further counter-clockwise movement of the cam, the follower starts its movement toward the left and the ram starts its forward movement. However, the gripping elements reach their limit of downward movement and deposit the loaf on table 84 before the forward face of the ram engages the loaf. The forward movement of the ram is comparatively fast until point 256c of the cam reaches line x—x, at which point the loaf is about to move into engagement with the knives. As point 256c of the cam passes line x—x, upon further counter-clockwise movement, the forward movement of the ram is comparatively slow, the greater portion of the cycle being devoted to slicing of the loaf. As point 256d of the cam passes line x—x, the greater portion of the loaf has by this time moved through these slicer blades. The ram is then moved comparatively faster by the cam substantially until point 256a again reaches line x—x, at which point the cam reaches its limit of forward movement and the slicer loaf is centered over the elevator. The movements of the ram in moving the loaf beyond the knives and in returning from its advanced position, the operation of lowering a loaf in front of the retracted ram, and the movement of the ram and unsliced loaf up to the slicing blades, are all performed as quickly as possible, so that the maximum possible proportion of the operating cycle may be reserved for the slicing operation. Since the output of the machine is only limited by the time required for proper slicing; this reservation of a comparatively large share of the cycle for the slicing operation makes for high production.

The second ram 210, above referred to, is moved directly oppositely to ram 85 by the following means. A segmental gear 554 (see Figs. 1 and 3), having a pitch radius equal to that of segmental gear 515, is keyed to shaft 512 adjacent hanger 397. This segmental gear meshes with a longitudinally movable rack 555 and imparts the same longitudinal movement to said rack as segmental gear 515 imparts to ram 85. As illustrated in Fig. 1, rack 555 has connected to its inner end a longitudinally movable rack bar 556 which is slidably received within gear housing 557. Housing 557 is mounted on a longitudinal frame member 558 (see Figs. 4 and 24) and provides a rotatable mounting for one end of shaft 560. Spur gear 559 is keyed, within housing 557, to shaft 560 and is driven by rack 556 which meshes with the underside of the gear. The other end of shaft 560 is journalled within housing 561 which is carried by longitudinal frame member 562. A spur gear 563, of substantially the same pitch diameter as spur gear 559, is keyed, within housing 561, to shaft 560 and meshes at its upper side with a rack 564 which is longitudinally slidably supported by said housing. Thus, as shaft 512 and segmental gear 554 rotate to move racks 555 and 556 in one direction, rack 564 is correspondingly moved in the opposite direction by gear 559, shaft 560 and gear 563. Ram 210 is carried by the inwardly projecting end 568 of rack 564 and comprises a mounting member 565 (see Fig. 14) which is attached to rack end 568 as by screw pin 566, and a ram plate 567 which is removably mounted on mounting member 565. Accordingly, rams 85 and 210 are equally moved in opposite directions toward and away from the center (line A—A) of the elevator.

Referring to Figs. 6 and 8, a support plate 532, mounted on the slicer unit and removable therewith, serves as an extension of table 84 to support the loaves as they are moved from table 84 and through the slicer. Plate 532 is a horizontal extension of a transversely extending bar 533 which is secured to upright members 132 and 133 of the slicing unit by bolts 534. Plate 532 is slotted to provide fingers 535 which are passed between knives 86 and thus provide support for the load as it passes from the slicer.

The lower portion of stop plate 82 is bent inwardly to provide a horizontal hold-down plate 537 which is adapted to hold the loaves from upward movement as they pass through the slicer unit. Plate 537 is slotted, similarly to plate 532, in order that it may be passed in between and beyond knives 86 a suitable distance. A slotted guide block 538 is mounted on the upper sides of plate 537 and is adapted to slidably receive and guide knives 86.

In order that hold-down plate 537 may be vertically adjustable toward and away from plate 532 to accommodate various sizes of loaves, stop plate 82 is mounted for vertical adjustment in the following manner. With reference to Figs. 6 and 8, a pair of transversely spaced, vertically disposed screw shafts 540 are mounted for rotation within brackets 541 which are attached to upright members 132 and 133 of the slicing unit. Bevel gears 542 are attached to the upper ends of screw shafts 540 and mesh with bevel gears 543 which are attached to a transversely extending horizontal shaft 544. Shaft 544 is also mounted for rotation within brackets 541 and carries at one end a hand knob 545. Plate 82 is secured to the ear portions 546 of nuts 547 which are threadably carried by screw shafts 540. It will be evident that manual rotation of the hand knob will cause screw shafts 540 to rotate and thus move plate 537 toward or away from plate 532.

As the loaf is moved along table 84 toward the slicer, it passes between guides 230 which serve to center the loaf with respect to the slicer unit. Guides 230 are formed on the inner ends of transversely extending guide bars 548, illustrated in Fig. 8. Guide bars 548 are transversely adjustably mounted upon uprights 132 and 133 by means of stud bolts 550 which pass through slots 549 in the guide members, the latter being clamped in their adjusted position by hand nuts 551

In order that the sliced loaf be held in unitary relation as it is moved from the slicer to the elevator, transversely spaced guides 239 are provided which are adapted to bear against the end slices of the loaf. Referring to Figs. 2, 4 and 6 and more particularly to Figs. 14 and 16, guides 239 are mounted on transversely adjustable guide blocks 575 by means of pins 576 which pass through the upper portion of the guide block and carry collars 578 on their outer ends. The guides are frictionally held against the guide blocks by means of springs 577 which are placed between the guide blocks and the collars. Guides 239 are movable on the blocks from a horizontal operative position to a vertical inoperative position, respectively illustrated in full and dotted lines in Fig. 14, to permit the removal or installation of the slicer unit, shoulders 579 of the guide blocks serving as limiting stops. As illustrated in Fig. 16, guide blocks 575 are slidably received within guide slots 580 which are formed in channel member 581 (see Figs. 4 and 14). Bearing blocks 582 are mounted within member 581 and provide spaced bearing supports for a screw shaft 583. Spacer sleeve 584 attached to the shaft by pin 585 serves to axially position the shaft relative to member 581. The ends of the shaft are provided with left and right hand screw threads 586 and 587, respectively, which threadably engage the guide blocks, and, as will be seen, rotation of the shaft in one direction or the other by hand knob 588 moves guides 239 toward or away from one another for the purpose of adjusting the guides for various sized loaves. As illustrated in Figs. 4, 5 and 14, channel member 581 is supported at one side on brackets 592 and 593 which are respectively carried by transverse frame members 594 and 595, and at its other side is supported by apron 589 which in turn is supported at its lower end by brackets 590 mounted on transverse frame member 591.

As above described, the loaf is moved from the slicer between guides 239 and onto the elevator 87, which in turn lifts the loaf upwardly against the wrapper which has been fed out to a position over the elevator. As illustrated in Figs. 5 and 14, the horizontal elevator platform 599 is secured to the upper end of a slide member 600 which is slidably movable in a vertical direction within ways 601 of a split housing 602. The housing is positioned between, and secured to, transverse frame members 595 and 603. Slide member 600 is channel shaped in horizontal section and has attached to its web portion, as by screws 605, a vertically disposed rack 604. A spur gear 607, positioned within housing 602 and keyed to shaft 606, meshes with rack 604 and operates to vertically reciprocate the rack and slide member. Shaft 606, journalled within housing 602, extends rearwardly therefrom through frame bearing 608 and has keyed to its rearward end a sprocket 609 (see Fig. 32). Shaft 606 is oscillated in accordance with the characteristics of cam 255 by means of chain 610 connecting sprockets 609 and 335.

Extending upwardly from elevator platform 599 are two sets of transversely adjustable fingers 228 between which the loaf is passed as it is moved onto the elevator, and which serve to hold the loaf in unitary relation (Figs. 4, 5 and 14). As above described with reference to Figs. 50 to 59 inclusive, the elevator moves the loaf upwardly across the path of the wrapper and to a position above the horizontal plane of bottom folder plate 229. Fingers 228 move upwardly with the elevator until their upward movement is arrested at a position where the upper ends of the fingers are just below the horizontal plane of bottom folder plate 229. The reason for arresting the upward movement of the fingers will be obvious in view of the fact that during the inward movement of the bottom folder plate, said plate passes with slight clearance over the elevator platform during the transfer of the loaf from the elevator to said folder plate.

The adjustable mounting and the means for arresting upward movement of the fingers will now be described, reference being had to Figs. 5 and 14 in which the fingers are illustrated as extending above the elevator platform, and Fig. 15 in which the elevator platform has moved above the upper ends of the fingers. A pair of mounting members 613 are slidably carried by slide member 600 and are connected by means of a cross bar 614 which is suitably secured to the mounting members as by screws 615. Extending through mounting members 613 and pinned thereto is a horizontal transversely extending guide shaft 616, and parallel with and vertically spaced above said guide shaft is a transversely extending screw shaft 617 which is journalled for rotation in mounting members 613. A sleeve 618, positioned between the mounting members, is pinned to screw shaft 617 and serves to prevent axial movement of the shaft. The opposite end portions of the screw shaft are provided with right and left hand threads, as indicated in Fig. 15, a hand knob 619 being attached to one end for manual rotation of the shaft. A pair of mounting blocks 620, positioned opposite slide member 600, are slidably mounted on guide shaft 616 and threadedly engage screw shaft 617. The sets of fingers 228 are secured to these mounting blocks and may be adjusted toward or away from one another by manual rotation of the screw shaft. The elevator platform 599 is slotted inwardly from its ends to provide fingers 621 between which fingers 228 are free to pass. At the upper limit of movement of the fingers relative to the elevator platform, mounting members 613 engage a buffer 622 which surrounds member 600 and abuts the under surface of the elevator platform. Fingers 228 are yieldably held at their uppermost limit of movement relative to the elevator by means of springs 625 which are connected at their upper ends to member 600 by clips 626 and at their lower ends to rod 627 which is carried by brackets 628, the brackets in turn being secured to mounting members 613.

Fingers 228 are arrested in their movement upwardly with the elevator by the following means. Cross bar 614 is centrally apertured (see Fig. 5) to receive the upper threaded end of a vertically extending rod 630, nuts 631 securing said rod to the cross bar. Rod 630 is slidably received by an apertured cross bar 632 which is secured at its ends to housing 602. The lower end of the rod is provided with a head 633 upon which rests a compression spring 634 that encircles the rod. Rod 630 moves upwardly with the elevator and fingers 228 until spring 634, engaging cross bar 632, becomes sufficiently compressed to overcome the tension of springs 625, thus arresting mounting members 613 and fingers 228 from further upward movement with the elevator. Thereupon, the elevator platform continues to move upwardly, elongating springs 625, until it reaches its uppermost limit of movement above the horizontal plane of plate 229 as previously described. During and after the transfer of the loaf from the elevator to plate 229, the elevator platform moves downwardly, springs 625 contracting, until buffer 622 engages mounting member 613, at which point fingers 228 are again extended above the elevator. Said fingers and elevator then, together, move downwardly to their lowermost limit of movement at which position the elevator platform lies in the same horizontal plane as loaf supporting plates 84 and 532.

Referring to Fig. 44, the cam 255, which operates the elevator, is shown in a position wherein point 255a of the cam coincides with the line of cam follower movement x—x, at which position the cam follower is at its limit of movement toward the right. This position corresponds to the lowermost limit of movement of the elevator. As the cam rotates in a counter-clockwise direction from this position, the cam follower is immediately moved toward the left, which movement effects an upward movement of the elevator. This movement continues until point 255c of the cam arrives at line x—x, at which point the cam follower is at its limit of movement toward the left and the elevator is at its uppermost limit of movement. Considering the rotational speed of the cam to be constant, the movement of the cam follower toward the left is checked or decelerated as point 255b nears line x—x, this position corresponding to that of the elevator at which the loaf has been moved into initial engagement with the under surface of the wrapper. However, after point 255b passes line x—x, the cam follower is again accelerated in its movement toward the left until point 255c nears line x—x, where it is then decelerated and finally stopped as point 255c reaches line x—x. Continued counter-clockwise movement of the cam from the last position causes movement of the follower toward the right until point 255d of the cam reaches line x—x, at which position the cam follower is at its limit of movement toward the right. The follower then remains or dwells at this position until point 255a again reaches line x—x. As compared with cam 256 (Fig. 45) which operates the ram, it will be seen that point 256d of cam 256 lies in a radial plane between points 255d and 255a of cam 255. Accordingly, during the time that a loaf is being moved from the slicer by the ram, the elevator dwells at its lowermost limit, this dwell continuing until points 256a and 255a which lie in the same radial plane reach line x—x, at which point the loaf has been deposited upon the elevator, and after which the ram starts its movement away from the elevator and the elevator starts upwardly.

As the loaves are moved upwardly along line A—A by the elevator, they pass along an adjustable guide plate 680 (see Figs. 5 and 7) which is attached to the heads 682 of a pair of threaded stub shafts 681 as by flush headed screws 683. Stub shafts 681 are threadedly received by a pair of internally threaded sleeves 684 which are rotatably mounted within transversely spaced bearing blocks 685 carried by transverse frame member 686. Sleeves 684 are provided at one end with enlarged heads 687, and at the other end are threaded to receive nuts 688 which are held by set screws 689. Heads 687 and nuts 688 serve to longitudinally confine the sleeve by bearing on opposite sides of blocks 685. Accordingly, rotation of the sleeves in one direction or the other causes movement of guide plate 680 toward or away from line A—A. The sleeves are interconnected to rotate together in the following manner. Integrally formed on the enlarged heads of the sleeves are sprocket teeth 690 which are interconnected by a continuous chain 691 passing over sprockets 690, beneath an idler sprocket 692, and around a manually rotatable sprocket 693. Idler sprocket 692 is rotatably mounted on a stub shaft 694 which is carried by one of the bearing blocks 685, while sprocket 693 is rotatably mounted on a stub shaft 695 which is carried by transverse frame member 686. Thus, rotation of sprocket 693, as by hand knob 696 secured thereto, causes rotation of sleeves 684 and movement of plate 680 toward or away from line A—A.

This guide plate 680 has secured to its upper edge, as by means of angle iron 697 and screws 698, the forward edge of the aforementioned wrapper support member 215, which will be more fully described at a later point in the specification.

As above described with reference to Fig. 53, the wrapper after having been engaged by the upwardly moving loaf is then caused to drape along the sides of the loaf by the opposed vertical side surfaces of side folding plates 220 and 221. Side folding plate 220 (Fig. 7) is comprised of sheet metal and is secured, as by spot welding, to a transversely extending bar 700 which is secured at its ends to the upper ends of a pair of angle iron brackets 701. As indicated in Fig. 5, brackets 701 are secured, as by spot welding, to the ends of angle iron 697 which extend beyond the ends of guide plate 680.

Side folding plate 221 is also formed of sheet metal and is secured, as by spot welding, to a transversely extending bar 702. As indicated in Figs. 7 and 26, bar 702 is provided at its ends with horizontal portions 703 which extend through and are slidably received by ways 704 formed between horizontal guide members 705 and 706. Guide members 705 are secured to guide members 706 by screws 707, while guide members 706 are respectively secured to frame members 106 and 114 by brackets 708. As guide plate 680 is adjusted toward or away from line A—A to accommodate loaves of various widths, side folding plate 220, which is carried thereby, is also adjusted toward or away from line A—A. Side folding plate 221 is likewise adjusted toward or away from line A—A by a suitable link connection with brackets 701, as follows: Bar 702 is provided at its ends with pins 710 which are received by the upper forked ends of levers 711. Said levers are centrally pivoted at 712 to brackets 713 which are attached to and depend from guide members 706. Levers 711 are connected to brackets 701 (which move with side folding plate 220) by means of links 714 which are pivoted at 715 to the lower ends of the levers and at 716 to the brackets. Thus, as plate 680, brackets 701 and side folding plate 220 are moved toward or away from line A—A, side folding plate 221 is likewise moved equally and oppositely toward or away from line A—A by means of the described linkage connection with brackets 701.

As above described with reference to Figs. 50 to 59 inclusive, the loaf and its wrapper, after passing upwardly from between side folding plates 220 and 221, then moves between primary end folding plates 224 and side engaging plates 225 and 226, after which bottom folding plate 229 and secondary end folding plates 235 move to operative positions. All of the above elements are mounted upon or carried by a pair of transverse frame members 673 and 674 which are mounted at their ends upon frame members 105 and 113.

As shown best in Figs. 5 and 7, a pair of longitudinally extending, transversely spaced guide members 715 and 716 are mounted upon transverse frame members 673 and 674 near the wrapper supply end of the machine. The opposed sides of the guide members are each provided with a pair of longitudinally extending, vertically spaced ways 717 and 718, ways 717 providing a slide mounting for a horizontal frame member 719, and ways 718 providing a slide mounting for horizontal frame member 720.

Frame member 719 is provided at its inner end with a pair of parallel arms 721 which extend horizontally toward the wrapping mechanism, opposed sides of said arms being provided with ways 722 (see Figs. 7 and 7c). A rectangular frame 723, comprising longitudinal side members 724 and transverse end members 725 and 726, is disposed between arms 721, side members 724 being provided with elongated projections 727 which are adjustably slidable within ways 722. In its adjusted position, frame 723 is held from movement relative to arms 721 by the following clamping means. Arms 721 are provided near their ends with squared apertrures 728 which receive the square portion 729 of carriage bolts 730, said bolts passing through elongated, horizontal slots 731 provided in side members 724 of frame 723. Bolts 730 are provided at their inner ends with threads of opposite pitch which threadedly engage the hub portion 733 of a hand nut 732. As nut 732 is rotated in one direction, bolts 730 are drawn inwardly, heads 734 of the bolts bearing against the outer sides of arms 721 and causing them to be moved into clamping engagement with frame 723.

Side engaging plate 225 is carried by horizontally slidable frame member 719 by means of bracket 736 which is attached to and depends from end member 725 (Fig. 7). As illustrated in Figs. 7 and 7d, side engaging plate 225 is provided on its outer surface with a pair of transversely spaced lugs 737 (one only being illustrated), within which a transversely extending rod 738 is mounted. This rod is received between lugs 737 by a semi-cylindric recess 739 provided in the upper surface of the horizontal portion 740 of bracket 736. Rod 738 is rotatably held in recess 739 by means of a keeper plate 741 which is provided with a complementary semi-cylindric recess 742, and which is clamped against the upper surface of horizontal portion 740 by means of bolt 743 and hand nut 744. Plate 741 is provided with a limiting stop 745 to prevent counterclockwise movement of plate 225 from the position illustrated in Fig. 7d.

Plate 225 is of a length, transversely of the machine, substantially shorter than the length of the loaf being wrapped (see Fig. 3). Although one short plate may be used in wrapping loaves of various lengths, it is preferable that a separate plate 225 be provided for each standard length of loaf. The various plates are similarly provided with lugs 737 and rods 738, and are quickly interchangeable simply by loosening hand nut 744 a sufficient amount for rod 738 to pass between bracket 736 and plate 741.

Side engaging plate 225 is reciprocated between the positions shown in Figs. 50 and 52, respectively, by a suitable drive connection with cam 252, as will now be described. As shown in Figs. 5 and 7, a transversely extending shaft 750 is journalled for rotation at its rearward end within a bearing 751 carried by frame member 113, and at its forward end within a split housing 752 which is secured to the upper surfaces of guide members 715 and 716. Rearwardly from bearing 751, shaft 750 has attached thereto a sprocket 753 (see Fig. 32) which is drivingly connected as by chain 754 to sprocket 332 (Fig. 35) which in turn is drivingly connected with cam 252, as previously described. Keyed to the forward end of shaft 750, within housing 752, is a gear 755 which meshes with a longitudinally disposed rack 756 secured to the upper surface of frame member 719. Thus, as gear 755 is oscillated by its driving connection with cam 252, frame member 719 and side engaging plate 225 carried thereby are longitudinally reciprocated in accordance with the characteristics of said cam.

The limits of travel of frame member 719 are accordingly fixed; however, side engaging plate 225 may be longitudinally adjusted relative to the frame member by loosening hand nut 732 and manually moving frame 723. This adjustment is necessary to accommodate loaves of various widths, and, when frame member is at its limit of movement to the left (as viewed in Fig. 7), frame 723 is adjusted so as to bring side engaging plate 225 approximately in the same vertical transverse plane as guide plate 680 and side folding plate 220.

Frame member 720, slidably mounted within ways 718, is provided with a pair of parallel arms 758 extending horizontally toward the wrapping mechanism, these arms being braced near their ends by a transverse member 759. Secured to arms 758 and extending outwardly therefrom is a transversely extending guide rod 760, and rotatably mounted in the ends of arms 758, ahead of and parallel to rod 760, is a second rod 761 which projects outwardly from arms 758. Rod 761 is held against endwise movement by set collars 762. The aforementioned secondary end folding plates 235 are slidably mounted upon the projecting portions of guide rod 760, and threadedly engage the projecting end portions of rod 761, which are provided with threads of opposite pitch. Rod 761 is provided at one end with a manually operable hand knob 763, rotation of which causes the secondary end folding plates to be adjusted toward or away from one another for loaves of different lengths.

Frame 720 and secondary end folding plates 235 carried thereby are longitudinally reciprocated by a suitable drive connection with cam 251 as will now be described. Referring to Figs. 7 and 32, a transversely extending shaft 765 is mounted at its forward end for rotation within a housing 766 which is attached to the under surface of guide members 715 and 716, and is journalled near its rearward end within a suitable bearing (not shown) carried by frame member 113. A sprocket 767 is attached to the rearward end of shaft 765, and is drivingly connected with sprocket 331 (see Fig. 35) by chain 768. A gear 769, positioned within housing 766, is keyed to shaft 765 and meshes with a rack gear 770 which is attached to the under surface of frame member 720. Thus, as sprocket 331 is oscillated by drive connection with cam 251, as previously described, gear 769 is correspondingly oscillated and frame member 720 and the secondary end folding plates are thereby longitudinally reciprocated in accordance with the characteristics of said cam.

A pair of longitudinally extending, transversely spaced guide bars 672 (Figs. 5 and 7) are secured to the under surfaces of transverse frame members 673 and 674, and are provided in their opposed faces with longitudinally extending ways 761. A pair of rack bars 670 are slidably mounted within ways 671 and carry at their inner ends the horizontally disposed bottom folder plate 229. Rack bars 670 and bottom folder plate 229 are longitudinally reciprocated by a suitable drive connection with cam 253 as will now be described. Referring to Figs. 2, 7 and 32, a transversely extending shaft 675 is mounted for rotation within a pair of transversely spaced housings 676 which are attached to guide bars 672. Attached to the rearward end of shaft 675 is a sprocket 677 which is drivingly connected with sprocket 333 (see Fig. 35) by chain 678. A pair of gears 679, respectively positioned within the two housings 676, are keyed to shaft 675 and mesh with rack bars 670. Thus, as sprocket 333 is oscillated by its driving connection with cam 253, as previously described, gears 679 are oscillated and rack bars 670 and bottom folder plate 229 are thereby longitudinally reciprocated in accordance with the characteristics of said cam.

Referring to Figs. 5 and 7, a pair of brackets 773 and 774 are mounted on the upper surfaces of guide members 745 and 716, respectively, and project upwardly and toward the right (as viewed in Fig. 7) from their mountings. These brackets are provided at their projecting ends with vertically perforated bosses 775, the vertical axes of which lie in a vertical transverse plane containing elevator center line A—A. Bosses 775 slidably receive a pair of vertically extending, transversely spaced guide rods 776. A frame 777, comprised of side members 778 and transverse member 779, is fixed to the lower ends of rods 776, the rods being entered into vertical bores provided in side members 778 and secured thereto by means of bolts 780 (see Fig. 7a). A pair of transversely disposed, axially alined guide rods 781 are pinned at 782 to side members 778 and extend outwardly therefrom, and a rod 783 is rotatably mounted within side members 778 in parallel relation to rods 781, rod 783 being held against endwise movement by means of set collars 784. Rod 783 extends outwardly from frame 777, and is provided at its opposite end portions with threads of opposite pitch, a hand knob 785 being provided at one end of said rod.

A pair of transversely spaced mounting members 786 are carried by rods 781 and 783, the mounting members being provided with tubular bosses 787 which slidably engage guide rods 781, and internally threaded tubular bosses 788 which threadedly engage the end portions of rod 783. Mounting members 786 are provided with registering pins 789 and stud bolts 790 upon which the primary end folding plates 224 are removably mounted, said plates being clamped in place by means of hand nuts 791 threaded on the stud bolts. Thus mounted, plates 224 are adjustable toward and away from one another by manual rotation of hand knob 785, in order to accommodate loaves of various lengths. Although one narrow pair of plates 224 may be utilized in wrapping loaves of various widths, it is preferable to have a separate pair of plates for each standard width of loaf to be wrapped, the various plates of course being similarly apertured to receive pins 789 and bolts 790.

A horizontal transversely extending shaft 794 is mounted for rotation within brackets 773 and 774 and a bracket 795 mounted on frame member 113, and has attached thereto, outside of brackets 774 and 775, a pair of arms 796. As shown in Figs. 2, 5, 7 and 7a, a pair of links 797 are pivotally connected at their upper ends, as at 798, to the swinging ends of arms 796, and are provided at their lower ends with elongated slots 799 which slidably take the shanks of bolts 780. As viewed in Figs. 2 and 7, rods 776 and frame 777 are held in their elevated positions by links 797 and arms 796, bolts 780 resting at the lower ends of slots 799, while upon clockwise movement of shaft 794 and arms 796, are lowered until buffers 801 beneath heads 800 of rods 776 come into engagement with the upper ends of bosses 775. After frame 777 thus reaches its limit of downward movement, slots 799 permit arms 796 and shaft 794 to rotate a slight amount further in the same direction, the reason for which will later be described.

Referring to Figs. 7, 7a and 7b, transverse frame member 779 is provided with a pair of upturned bracket arms 802, between which a transverse shaft 803 is non-rotatably mounted. Rotatably mounted on this shaft is the hub portion 804 of an arm 805, the latter carrying at its extremity the side engaging plate 226. Also rotatably mounted upon shaft 803 is the hub portion 806 of a lever generally indicated at 807. Arm 808 of this lever is provided with a flat portion 809 which lies directly beneath arm 805, and which is adapted to engage the lower end of an adjustment bolt 810 which is threaded into arm 805, the bolt being provided with a lock nut 811. Arm 808 is also provided with a pair of transverse pin members 812 which provide mountings for one end each of a pair of tension springs 813. The other ends of tnese springs are mounted on transverse pin portions 814 of arm 805. Thus, the lower end of bolt 810 carried by arm 805 is yieldingly held in engagement with portion 809 of arm 808.

Plate 226, similarly to plate 225, is provided on its rearward face with a pair of transversely spaced lugs 815 which are apertured to receive a transversely disposed rod 816. Rod 816 is rotatably taken within semi-cylindric recesses formed in the opposed faces of bifurcations 817 and 818, provided on the end of arm 805 and on clamping member 819, respectively. Clamping member 819 is pivotally mounted at 820 to arm 805 and is provided with an ear portion 821 which lies directly beneath arm 805, and which is adapted to be engaged by the lower end of clamping bolt 822 threaded in arm 805. Transverse portion 823 of clamping member 819 threadedly receives a stop bolt 824 which may be provided with a lock nut 825. This stop bolt is adapted to engage the back surface of plate 226 and prevent clockwise rotation of plate 226 about rod 816 (as viewed in Fig. 7) beyond a substantially vertical position when said plate is engaging the side of the loaf (as in Fig. 55).

Side engaging plate 226, thus carried by frame 777, moves vertically with the frame and also has a swinging movement about shaft 803 which moves bodily with said frame. To accomplish this swinging action, lever 807 is provided with an arm 830, the end of which is connected at 833 to one end of a link 831. The other end of this link is connected at 834 to the end of an arm 832 which is secured to shaft 794. As arms 796 swing in a clockwise direction from the position illustrated in Fig. 7, frame 777 and the members carried thereby are caused to move vertically downwardly until buffer 801 engages the upper end of bosses 775. At the same time, arm 832 swinging in a clockwise direction causes arm 805 to swing in a clockwise direction about shaft 803. As these parts, at the end of this movement, reach the position illustrated in Figs. 53 to 55, bolts 780 are vertically spaced a short distance above the lower ends of slots 799. Accordingly, as arms 796 and 832 are then moved in a counter-clockwise direction from this position, arm 805 is caused to move in a counter-clockwise direction about shaft 803, moving side engaging plate 226 away from the loaf a suitable distance before the lower end of slot 799 engages bolts 780 and causes frame 777 and end folding plates 224 carried thereby to move vertically upwardly. Thus the path of the loaf is cleared just before end folding plates 224 are elevated, the loaf being moved to the right (Fig. 7) immediately that plates 224 are lifted.

Shaft 794 is oscillated by a suitable drive connection with a constantly rotating cam, as will now be described. Secured to the rear end of shaft 794 (see Fig. 32) is an arm 836 which is pivotally connected at 837 to one end of a longitudinally extending link 838. At its other end, said link is pivotally connected at 839 to the upper end of a lever 840. As illustrated in Figs. 32, lever 840 is pivotally mounted, intermediate its ends, at 841 upon frame member 110, and carries at its lower end an anti-friction roller 842 which is adapted to engage the double surfaces 843 of a cam 844. Cam 844 is keyed to a transversely extending shaft 845 which is journalled within suitable bearings (hereinafter described) carried by the frame of the machine. Keyed to the rear end of shaft 845 is a sprocket 846 which is drivingly connected with a sprocket 847 by chain 848. Sprocket 847 is keyed to a sleeve 849 which is rotatably mounted upon a stub shaft 850, the latter being carried by the frame of the machine (see Fig. 7). A sprocket 851 is also keyed to sleeve 849, and is drivingly connected with a sprocket 852 by chain 853, sprocket 852 being keyed to the rearwardly projecting end of cam shaft 250. Thus, cam 844 and shaft 845 are driven by shaft 250, and the drive connection between the shafts is such that both of said shafts will rotate at the same speed.

In order that the above described drive connection be relieved of the weight of frame 777 and the parts carried thereby, a counter-weight arm 854 is secured to shaft 794 and acts to balance said shaft.

Top plate 227 is formed on the swinging end of a longitudinally extending arm 857, the hub of which is pinned on a transversely extending shaft 858 mounted for rotation in a bracket 859 secured to the inner face of frame member 719. Pinned to the rear end of shaft 858 is an arm 860 carrying a roller 861 which is adapted to come into engagement with the under surface of a sloping bar 862 secured by bracket 863 to bracket 774, roller 861 being held in engagement with bar 862 by the weight of arm 857 and top plate 227. Thus mounted, top plate 227 moves longitudinally with frame member 719 that carries bracket 774, and also moves vertically as roller 861 follows the under surface of bar 862, causing rotation of shaft 858. As frame member 719 moves to the left (as viewed in Fig. 7), arm 860 and shaft 858 rotates slightly in a clockwise direction allowing the top plate to move downwardly. As frame member 719 reaches its limit of movement toward the left, the top plate is moved to the position illustrated in Figs. 51 and 52. After the top plate is engaged by the upwardly moving loaf, it is moved upwardly by the loaf causing a counter-clockwise movement of shaft 858 and arm 860, thus moving roller 861 out of engagement with bar 862. Accordingly, the top plate then rests upon the top of the loaf until, during movement of frame member 719 toward the right, roller 861 again engages downwardly sloping bar 862 and finally moves the top plate upwardly and away from the loaf.

The timed sequence of operation of primary end folding plates 224 and side engaging plate 226, side engaging plate 225, bottom folder plate 229, and secondary end folding plates 235 will now be described with reference to the schematically illustrated cams in Figs. 32a and 40 to 42, inclusive. Although the cam 844 shown in Fig. 32 (similarly to cams 251 to 259 inclusive) is of the grooved or double surface type, the cam curve illustrated in Fig. 32a is a diagram representing simply the effective cam groove center line followed by the center of the associated roller or cam follower 842. In referring to Fig. 32a, the diagrammatically represented cam curve will for convenience be considered as the actual cam represented.

With cam 844 in the position illustrated in Fig. 32a (corresponding to the zero degree position of the cycle), cam follower 842 is at its limit of movement toward the right along the arcuate line of cam follower movement x—x. At this limit of movement, primary end folding plates 224 and side engaging plate 226 are at their upward limit of movement corresponding to Figs. 7 and 50. As the cam rotates in a counter-clockwise direction from this position, the cam follower remains at this limit of movement until point 844a of the cam reaches line x—x. Further counter-clockwise movement of the cam then causes the follower to move toward the left along line x—x until point 844b of the cam reaches line x—x. This movement of the follower causes the primary end folding plates 224 and side engaging plate 226 to move downwardly from the position illustrated in Fig. 50 to the position illustrated in Fig. 53. Upon further counter-clockwise movement of the cam, the follower dwells at its limit of movement toward the left until point 844c of the cam crosses line x—x, whereupon the follower is then moved toward the right along line x—x until point 844d of the cam reaches line x—x. This movement causes the primary end folding plate 224 and side engaging plate 226 to move upwardly. Upon further counter-clockwise movement of the cam, the follower dwells at its limit of movement toward the right, plates 224 and 226 remaining at their upward limit of movement, until the point 844a of the cam again reaches line x—x.

As compared with Fig. 44, it will be noted that point 844b of cam 844 lies in a radial plane substantially in advance of point 255c of cam 255. Accordingly, plates 224 and 226 reach their downward limit of movement during the time that the elevator (moved vertically by cam 255) is on its way up.

With cam 252 in the position illustrated in Fig. 41, point 252a of the cam coincides with line x—x which corresponds to the limit of movement toward the left along line x—x of the related cam follower 300. This position corresponds to the advanced position of the loaf-advancing side engaging plate 225 as indicated in Fig. 50. As the cam rotates in a counter-clockwise direction from this position, the associated cam follower is moved toward the right along line x—x which effects a movement of side engaging plate 225 toward the left as indicated in Fig. 51. This movement continues until point 252b of the cam reaches line x—x, at which point the follower has reached its limit of movement toward the right along line x—x and the side engaging plate has reached its limit of movement toward the left. The follower then dwells at this limit position until point 252c crosses line x—x whereupon the follower is caused to move toward the left until point 252a again reaches line x—x, this movement effecting a movement of side engaging plate 225, toward the right, as indicated in Figs. 57 to 59, inclusive. As compared with Fig. 32a, it will be noted that point 252b of cam 252 lies substantially in the same radial plane as point 844b of cam 844. Accordingly, plates 224 and 226 reach their limits of downward movement and plate 225 reaches its limit of movement toward the left at substantially the same point in the cycle. It will also be noted that point 252c of cam 252 lies in a radial plane substantially midway between points 844c and 844d of cam 844. Accordingly, the loaf-advancing side engaging plate 225 starts its movement toward the right at substantially the same time that the lower ends of plates 224 clear the loaf in their upward movement.

As illustrated in Fig. 42 at the "zero degree" position of the cycle (Fig. 50), cam 253 is in the act of moving its associated follower toward the left along line x—x, effecting a movement of bottom folder plate 229 toward the left. With the cam rotating counter-clockwise, this movement continues until point 253a of the cam reaches line x—x, at which point the follower has reached its limit of movement toward the left along line x—x and bottom folder plate 229 has reached its limit of movement toward the left as indicated in Fig. 51. As the cam rotates further, the associated parts dwell at this limit of movement until point 253b of the cam crosses line x—x. The follower is then moved toward the right along line x—x until point 253c crosses line x—x whereupon the follower then dwells at this position until point 253d crosses line x—x. The follower is then moved further toward the right until point 253e reaches line x—x, at which position the follower has reached its limit of movement toward the right. The first movement of the follower toward the right, between points 253b and 253c, effects a movement of the bottom folder plate toward the right as indicated in Fig. 54. The dwell of the follower between points 253c and 253d effects a dwell of the bottom folder plate at the position indicated in Figs. 55 and 56. The additional movement of the follower toward the right, between points 253d and 253e, effects a further movement of the bottom folder plate toward the right as indicated in Fig. 57. The limit of movement toward the right, corresponding to point 253e, is shown in Fig. 58. Further rotation of the cam then causes the follower to move toward the left along line x—x until point 253a again reaches line x—x, the corresponding movement of the bottom folder plate being indicated in Figs. 59 and 50.

Referring now to Fig. 40, cam 251, in the position illustrated, is in the act of moving its associated follower toward the left along line x—x, effecting a movement of secondary end folding plates 235 toward the left as indicated in Fig. 50. This movement continues until point 251a of the cam reaches line x—x, at which position the follower is at its limit of movement toward the left and the secondary end folding plates are at their limit of movement toward the left as indicated in Fig. 51. The follower then dwells at this limit of movement, effecting a dwell of the secondary end folding plate as indicated in Figs. 51 to 54, inclusive, until point 251b of the cam crosses line x—x whereupon the follower is then moved toward the right along line x—x effecting a movement of the secondary end folding plates toward the right as indicated in Fig. 55. As point 251c of the cam crosses line x—x, this movement of the secondary end folding plates is momentarily checked at the position indicated in Fig. 56. Further rotation of the cam causes additional movement of the follower toward the right, and additional movement of the secondary end folding plate toward the right as indicated in Fig. 57, until point 251d of the cam reaches line x—x, at which position the follower is at its limit of movement toward the right and the secondary end folding plates are at their limit of movement toward the right as indicated in Fig. 58. Upon further counter-clockwise movement of the cam from this position, the follower is then moved toward the left, effecting a movement of the secondary end folding plate toward the left as indicated in Figs. 59 and 50, until point 251a again reaches line x—x, at which point the secondary end folding plates have reached their limit of movement toward the left as indicated in Fig. 51.

By comparing Figs. 32a and 41 with Fig. 44, it is revealed that points 844b and 252b lie in a radial plane in advance of point 255c. Accordingly, primary end folding plates 224 and side engaging plates 225 and 226 reach their limits of movement as indicated in Fig. 53 before the loaf, carried by the elevator, is thrust upwardly between said plates. Also, a comparison of Figs. 42 and 44 reveals that point 253b lies in a radial plane in advance of point 255c, so that bottom folder plate 229 starts its movement toward the right (as indicated in Fig. 54) before the elevator reaches its uppermost limit of movement. However, the bottom folder plate does not pass beneath the loaf until after the elevator has started its downward movement. During the interim, the loaf is frictionally held in its elevated position between plates 224, 225 and 226. A comparison of Figs. 40 and 42 reveals that, since point 253b lies in a radial plane in advance of point 251b, bottom folder plate 229 starts its movement toward the right in advance of secondary end folding plates 235, as indicated in Fig. 54, and also, that the bottom folding plate, having moved beneath the loaf (Fig. 55) dwells (between points 253c and 253d of cam 253) during the time that secondary end folding plates 235 move from the position illustrated in Fig. 55 to the position illustrated in Fig. 56. Comparing with Fig. 41, it will be noted that point 251c of cam 251, point 252c of cam 252, and point 253d of cam 253 all lie substantially in the same radial plane; also, that point 844c of cam 844 (Fig. 32a) lies in a radial plane in advance of said aforementioned radial plane. Accordingly, upon movement of plates 224 and 226 away from the loaf, side engaging plate 225, bottom folding plate 229, and secondary end folding plates 235 then simultaneously move toward the right, as indicated in Fig. 57. Since point 253e lies in a radial plane in advance of point 251d, bottom folding plate 229 stops at its limit of movement toward the right while secondary end folding plates 235 continue to their limit of movement toward the right, as indicated in Fig. 58. After reaching their respective limits of movement toward the right, the bottom folding plate and secondary end folding plates immediately move toward the left as indicated in Fig. 59. The side engaging plate 225, however, continues to move toward the right until point 252a of cam 252 reaches line x—x, the position indicated in Fig. 50.

As above described with reference to Figs. 50 to 59 inclusive, each successive loaf, during movement toward the right, is moved onto the loaf receiving plate 236 and between the transversely spaced pairs of end plates 237 and 237a, and during this movement the final wrapping operations are completed.

Plate 236, the mounting thereof, and the parts associated therewith will now be described, reference being had to Figs. 6, 7 and 26. A pair of brackets 867, attached to frame members 106 and 114, receive and support the ends of a transversely extending rod 868, the brackets being provided with keeper plates 869 which hold the rod in position. Rod 868 is confined against endwise movement by means of set collars 870 which are positioned on the rod to bear against the brackets. Rod 868 supports one end of plate 236 by means of transversely spaced mounting blocks 871 (see Figs. 6 and 26) which are apertured to receive rod 868, and which are secured to the under surface of plate 236 by means of screws 872. The mounting members 871 may be fixed to rod 868 by means of set screw 873.

Secured to the under surface of plate 236 at its other end, as by screws 875, are a pair of transversely spaced mounting members 874 which are slotted at 877 to engage and be supported by a transversely extending rod 876. Rod 876 is secured at its ends to brackets 878 which are respectively mounted on frame members 106 and 114.

A pair of transversely spaced arms 880, the mounting of which will later be described, are provided to support the transversely spaced pairs of end plates 237 and 237a and transversely spaced sealing fingers 244. As viewed in Fig. 6, plates 237 are substantially triangular in shape, and are provided with rounded leading edges 881 (see Fig. 26). Plates 237 are supported in spaced relationship to the opposed faces of arms 880 by means of spacer bolts 882. The opposed faces 883 of plate 237 diverge slightly toward the oncoming loaf, as indicated in Fig. 26, in order that the overlapping portions of the wrapper at the ends of the loaf may be firmly pressed against the ends of the loaf. Plates 237a, the opposed faces 884 of which are substantially coplanar with the faces 883 of plate 237, are substantially triangular in shape and are mounted in spaced relationship to the opposed faces of arms 880 by means of spacer bolts 885. Edges 887 of plates 237a are spaced from plates 237 as indicated at 238. Plates 237a are provided with ear portions 886 which extend outwardly from edges 887 and slope downwardly along said edge toward plate 236. Plate 236 is recessed as indicated at 888 to receive the lower ends of ear portion 886 in order that the upwardly curved surface of the ears be flush with the top surface of plate 236.

Comparing Figs. 6 and 26 with Figs. 56 and 57, as the loaf is moved onto plate 236 the portion of the wrapper which depends from the right side of the loaf contacts the curved leading edge 880 of the plate and is then folded upwardly against the under surface of the loaf by said plate. Upon further movement of the loaf to the position of Fig. 58, the portion of the wrapper which extends outwardly from the ends of the right side of the loaf engage the curved leading edges 881 of plates 237 and are folded rearwardly against the ends of the loaf. At this point the loaf is completely wrapped except for the wrapper portion which extends outwardly from the ends of the bottom of the loaf. Upon further movement of the loaf from the position of Fig. 58 to the position of Fig. 59, these wrapper portions engage ear portions 886 and edge 887 of plates 237a and are folded upwardly, faces 884 of plates 237a pressing them firmly against the ends of the loaf. The side engaging plate 225 then continues to move the loaf further until it is centered within the sealing compartment generally indicated at 91, which comprises heated sealing fingers 244 and 245 which contact the overlapping portions of the wrapper at the ends of the loaf and the bottom of the loaf, respectively.

As illustrated in Figs. 26, there are a number of fingers 245 which are transversely alined and project upwardly through an elongated opening 891 in plate 236. These fingers are formed on the end portions of a corresponding number of arms 892 (see Fig. 6) which are pivotally mounted on a transversely extending tubular shaft 893 carried by mounting members 871. Carried within this tubular shaft is a heating element 894 which at its ends is connected by wires 895 to a suitable source of electric energy (not shown). The heat radiated by the heating element is conducted by arms 892 to sealing fingers 245. As illustrated in Fig. 6, fingers 245 extend a slight distance above the top surface of plate 236, and are limited from further upward movement by means of lugs 896 which are formed on the free ends of arms 892 and are adapted to engage the under surface of plate 236. Fingers 245 are yieldably held in this position by means of compression springs 897 which are positioned between the free ends of arms 892 and bar 898, the latter being secured at its ends to mounting members 871.

A hold-down device generally indicated at 900 in Figs. 1, 2, 3, 7 and 25 includes a pair of longitudinally disposed, transversely spaced skids which are adapted to ride over the top of the loaves and bear downwardly thereupon. This device will more fully be described below. As each loaf is moved into the sealing compartment, the hold-down device causes the loaves to bear downwardly upon fingers 245 and depress the fingers against the action of springs 897. However, in case of any irregularities in the bottom surface of the loaf, the fingers will conform to such irregularities and thus evenly seal the overlapping portions of the wrapper.

Referring again to Figs. 6 and 26, fingers 244, which are adapted to contact and seal the overlapping portions of the wrapper and the ends of the loaf, are attached as by screws 903 to heater element containing members 902. Members 902 are fixed, as by screws 904, to brackets 905, which in turn are attached, as by bolts 907, to the free ends of flat spring arms 906. At their other ends, spring arms 906 are secured to arms 880 by means of bolts 907a. Spring arms 906 tend to move members 902 and fingers 244 inwardly toward one another; however, this movement is adjustably limited by engagement of heads 908 of bolts 909 against arms 880, said bolts 909 being secured to brackets 905 by means of nuts 911 and passing through apertures 910 in arms 880. The action of spring arms 906 may be augmented by compression springs 912 positioned between the free ends of spring arms 906 and arms 880.

Fingers 244 are heated by suitable electric heater elements (not shown, since they may be of any conventional type), contained within members 902, which are connected by wires 914 to a source of electric energy (not shown). If desired, plates 237 and 237a may also contain heater elements (not shown) which may be connected to a suitable source of energy as by wires 915 and 916, respectively.

As illustrated in Fig. 6, a plate 917 is connected at one edge by means of a strip 918 of suitable heat insulating material to the end of plate 236 and serves as an extension thereof. The opposite edge of plate 917 is undercut at 919 in order that said plate may be positioned closely to belt 920 of outfeed conveyor 92 as it moves upwardly over roller 921, thus making the upper surfaces of plate 917 and belt 920 substantially continuous.

The hold-down device 900 mentioned above is supported by a hanger which comprises vertical end members 923, secured to the frame of the machine by bolts 925, and a horizontal transverse member 924 connecting the upper ends of members 923 (see Figs. 2, 3, 6, 25 and 26). Attached, as by welding, to the upper and lower edges of member 924, at the center thereof, is a pair of vertically spaced T-shaped members 926. Formed between the ends of the transverse portion of members 926 are bosses 927 which are adapted to slidably receive a pair of transversely spaced, vertically disposed rods 928. Formed between members 926, at their other end, is a boss 929 which is adapted to slidably receive a vertically disposed rod 930. The lower ends of rods 928 are universally connected, as indicated at 931, to the leading end portions of skids 901, while the lower end of rod 930 is universally connected as indicated at 933 to a bridge member 932 which interconnects the skid members 901 at their other end portions. Rods 928 and 930 are provided with adjustable set collars 934 which are adapted to engage the upper member 926 and thus limit the lowermost position of skids 901. The set collars are adjusted along rods 928 and 930 to normally position skids 901 a distance above the loaf receiving plate 236 equal to an amount less than the height of the loaf. Thus, as the loaves are moved beneath the skids, said skids are moved upwardly by the loaf and bear downwardly, by their own weight, upon the loaf, pressing the loaf against heated sealing elements 245.

*Outfeed conveyor*

As shown best in Figs. 3, 6 and 25, a transverse frame member 937, connected at its ends to frame members 103 and 111 by bolts 938, provides a mounting for one end of a pair of transversely spaced, longitudinally disposed tubular frame members 939 which at their other ends are respectively connected at 940 to upright members 377 (see Fig. 1). Tubular members 939 pass through apertures in transverse frame member 937 and are secured to said frame member by means of nuts 941 (see Fig. 6).

Pinned to tubular members 939 are a pair of bearing members 942, within which are journalled a pair of parallel shafts 943 and 944, which extend transversely of the machine. As indicated in Figs. 6 and 25, shaft 943 has pinned thereto roller 921, around which passes horizontally disposed continuous conveyor belt 920. The upper horizontal run of belt 920, upon passing from roller 921, is supported by runners 945 which in turn are supported by a number of transversely disposed brackets 946 secured at their ends to tubular members 939 (see Figs. 1, 1b, 2 and 3). At the end of the outfeed, belt 920 passes over an idler roller 947, the end shaft portions 948 of which are journalled within blocks 949 carried by member 940. Belt 920 may be tensioned by a suitable tensioning device generally indicated at 950 (Fig. 1).

Belt 920 is constantly driven during operation of the machine by a suitable drive connection between shaft 943 and the main drive or cam shaft 250 as will now be described. As illustrated in Figs. 3 and 32, shafts 943 and 944 extend outwardly from bearing members 942, shaft 943 carrying at its rearward end a sprocket 954. This sprocket is drivingly connected by chain 955 with a sprocket 956 which is keyed to sleeve 849. As previously described, sleeve 849, mounted on stub shaft 850, is driven by chain 853 connecting sprockets 851 and 852 which are keyed to sleeve 849 and cam shaft 250, respectively.

Referring to Figs. 3 25 and 26, the end portions of shafts 943 and 944 support a pair of housings generally indicated at 957. These housings are provided with bosses 958, which rotatably and slidably engage shaft 943, and with bosses 959 which threadedly engage the end portions of shaft 944, the latter being provided with threads of opposite pitch. Shafts 943 and 944 are held from endwise movement by means of set collars 960 and 961 which are positioned to engage the inner and outer faces of bearing members 942, respectively. Thus mounted, for reasons that will later appear, housings 957 may be adjusted toward or away from one another rotation of shaft 944 in one direction or the other as by hand crank 962 provided on the forward end of the shaft.

As shown in Fig. 25, housings 957 are provided with bosses 963 which are spaced from the opposed faces of bosses 958, and which are apertured to pass shaft 943. Positioned between bosses 958 and 963 are a pair of bevel gears 964 which are longitudinally slidably mounted on shaft 943 and drivingly connected with said shaft by means of keys 965 and keyways 969, the latter being provided in the end portions of the shaft.

Housings 957 are also provided with vertically alined bosses 968 and 969, within which are journalled vertically disposed shafts 970. Attached to the lower ends of shafts 970, as by set screws 972, are a pair of bevel gears 971; the latter mesh with and are driven by bevel gears 964. Shafts 970 are also provided with sprockets 973 which are secured thereto as by set screws 974.

Positioned within bosses 975 of housings 957, as by set screw 976, are a pair of vertically disposed stub shafts 977 which lie in the same vertical transverse plane as shafts 970. Rollers 978 are mounted for rotation on shafts 977 and are provided with sprockets 980 which may be secured thereto as by force fit between sprocket hub portions 981 and bores 982 of the rollers. Endwise movement of the rollers is prevented by their engagement with heads 979 of shafts 977 and the under faces of bosses 975. Sprockets 980 are drivingly connected with sprockets 973 by chains 983.

As shown in Figs. 1 and 1b, tubular members 939 have secured thereto a pair of bearing members 986 within which is journalled a transversely extending shaft 987. Endwise movement of the shaft is prevented by set collars 988 positioned to engage the opposed faces of the bearing members. The outwardly extending end portions of this shaft are provided with threads of opposite pitch which threadedly engage the hub portions 989 of a pair of brackets 990. A pair of transversely spaced, longitudinally disposed channel members 991 are secured at one end, as by bolts 992, to brackets 990. The other ends of these channel members (see Fig. 25) are secured, as by bolts 993, to bosses 994 which are provided on housings 957. Referring to Figs. 1 and 1b, a pair of hanger brackets 995, mounted on channel members 991, are provided at their inner ends with bosses 996, and received within these bosses 996 and fixed thereto, as by set screws 998, are a pair of transversely spaced, vertical stub shafts 997. A pair of idler rollers 999 are mounted on rotation on stub shafts 997 and are held from vertical endwise movement by engagement with heads 1000 formed on the lower end of shaft 997, and the faces of bosses 996. A pair of endless belts 1001 are passed around rollers 978 and 999, extending longitudinally over the edge portions of belt 920. Belts 1001 are spaced a short distance above the upper run of belt 920 and are held in their elevated position by the crowned faces 1002 and 1003 of pulleys 978 and 999, respectively. Pulleys 978, driven by their above described driving connection with shaft 943, drive belts 1001, the drive connections being such that peripheral speed of belts 1001 will be substantially the same as the peripheral speed of belt 920.

The mounting of hanger brackets 995 upon channel members 991 is such as to provide a means for tensioning belts 1001, as will now be described. Referring to Figs. 1 and 1b, brackets 995 are provided with foot members 1004, which are adapted to rest on the upper surfaces of channel members 991, and overhanging guide members 1005 which are adapted to engage the outer surfaces of the channel members. The upper flanges of channel members 991 are provided with bolts 1007 which pass through elongated slots 1006 in the foot members. A pair of tensioning bolts 1008 threadedly engage bosses 1009 of brackets 995 and extend through arms 1010 which extend upwardly from the ends of channel members 991. The heads 1011 of the bolts which engage arms 1010, may be rotated to move brackets 995 toward the left as viewed in Fig. 1 and thus tension belts 1001. After the belts have been tensioned, brackets 995 are clamped to the channel members by bolts 1007.

Pulleys 978 and 999 are positioned so that the opposed faces of the inner runs of belts 1001 will engage and hold the overlapping portions of the wrapper at the ends of the loaf during passing of the loaves from the sealing compartment to the end of the outfeed conveyor. The inner runs of belts 1001 are prevented from flexing, between rollers 978 and 999, by means of runners 1014 which are positioned to engage the outer surfaces of said runs (see Figs. 3 and 26). Runners 1014 are mounted on the inner ends of transversely disposed, inverted U-shaped hangers 1015, which are secured at their other ends, as by bolts 1016, to channel members 991.

As above described, housings 957 carrying belt rollers 978 may be adjustably moved toward or away from one another by manual rotation of shaft 944. As shown in Figs. 1b and 3, shaft 987 is drivingly connected with shaft 944 by means of sprocket 1017, pinned to shaft 944, chain 1018, and sprocket 1019 pinned to shaft 987. Accordingly, manual rotation of hand crank 962 on shaft 944 causes simultaneous rotation of shafts 944 and 987, effecting movement of channel members 991, rollers 978 and 999, and runners 1014 toward or away from one another. One of the purposes of this adjustable movement is to adjust the spacing of the inner runs of belts 1001 in order that loaves of various lengths may be accommodated.

The above mentioned arms 880, which carry end plates 237—237a and sealing fingers 244, are secured by bolts 1020 (see Figs. 25 and 26) to housings 957. Accordingly, as housings 957 are adjusted toward or away from one another, end plates 237—237a and fingers 244 are likewise adjusted toward or away from one another.

Infeed guide rails

As shown in Figs. 1, 2, 3 and 4, infeed conveyor 80 is provided with a pair of longitudinally extending guide rails 1021 and 1022, guide rail 1021 being positioned over one side of the infeed conveyor and extending substantially the full length of the conveyor terminating over pulley 362, and guide rail 1022 being positioned over the other side of the infeed conveyor and extending only from roller 360 to roller 362. Rail 1021, spaced a short distance above the infeed conveyor, is mounted on the lower ends of a pair of arms 1023 which at their upper ends are secured to one of the channel members 991. Rail 1022, spaced a short distance above the infeed conveyor, is supported on the lower end of arm 1024, which at its upper end is secured to the other channel member 991. The loaves are placed on the infeed conveyor with their ends in engagement with guide rail 1021. As they are carried into the machine by the infeed conveyor, the other ends of the loaves are brought into engagement with guide rail 1022. These rails are positioned to center the loaves with respect to the machine as they are carried inwardly by the infeed conveyor. The spacing of the guide rails is dependent upon the spacing of channel members 991; accordingly, as shafts 944 and 987 are rotated to adjust belts 1001 for loaves of a given length, end plates 237—237a, sealing fingers 244, and guide rails 1021—1022 are likewise adjusted to properly space them for the same loaves.

Wrapper feed and measuring mechanism

As previously explained with reference to the diagrammatic illustrations, each loaf as it is carried upwardly by the elevator is moved into contact with the underside of a wrapper which has previously been fed out to the proper length and severed. The preferred and illustrative mounting of the wrapper rolls, wrapper feeding mechanism, measuring mechanism which actuates the feed mechanism causing same to feed out the wrapper to any desired length in timed relation with the machine, and wrapper severing mechanism will now be described in detail, though without intention of limiting the invention thereto, since these parts of the machine are obviously subject to extensive modification within the broad scope of the invention.

According to present practice, the wrapper comprises one or more plies of waxed paper, "Cellophane" or other similar material (which may carry printed matter), and in some cases a narrow strip (carrying other printed matter) is applied to the outside of the wrapper or the wrapped loaf. As here typically illustrated, the wrapper comprises two plies of waxed paper or "Cellophane" having the above mentioned narrow strip applied thereto. The present illustrated embodiment of the invention has been designed to handle wrapper materials which may be sealed at overlapping portions thereof by the application of heated members. However, the invention is not to be construed as limited to the number of plies comprising the wrapper, to the use of such wrapper material, or to the particular method of sealing same.

As shown in Figs. 1, 2 and 35, a pair of brackets 635 are attached to the lower portions of vertical frame members 102 and 110 and provide mountings for three parallel, vertically spaced, transversely extending slide shafts 636, 637 and 638. A pair of transversely spaced arms 639 are slidably mounted upon shaft 636 and have depending portions 640 which slidably engage shaft 637 whereby rotation of arms 639 about shaft 636 is prevented. A pair of axially alined, truncated-cone-shaped discs 641 are rotatably mounted, with their base portions disposed outwardly, on the outer ends of arms 639 and are adapted to be entered into the open ends of a wrapper roll 642. A right and left hand screw shaft 643 threadedly engages arms 639 and is provided at one end (to the right as viewed in Fig. 35) with a hand crank 644, rotation of which causes arms 639 to be moved toward or away from one another. Screw shaft 643 is mounted within the bracket 635 (nearest to hand crank 644) for longitudinal and rotative movement, and is centrally journalled for rotation within a bracket 645 which in turn is adjustably slidably mounted on slide shaft 636. Bracket 645 is provided with an upwardly projecting lug 647 which is apertured to threadedly receive the threaded portion 648 of an adjustment shaft 646, the forwardly projecting end portion of the adjustment shaft being journalled for rotation in bracket 635 and being provided with a hand adjustment knob 649, the hub portion of which coacts with collar 650 to bear on opposite sides of bracket 635 and thus longitudinally confine the shaft. Rotation of adjustment shaft 646 causes bracket 645 to be moved longitudinally along shaft 636 within the limits defined by collars 651. Screw shaft 643 is longitudinally moved with bracket 645 by means of collar 652 pinned to the screw shaft.

Wrapper roll 642 is mounted on the machine by placing it between discs 641 and rotating hand crank 644 until the inner portions of the disc enter into the open ends of the roll and thus hold it in alinement with the axis of the discs. In case the wrapper roll is not centrally located with respect to the machine, it may be adjusted in position by rotation of hand knob 649.

Upper wrapper roll 642 supplies the inner ply of the wrapper while lower wrapper roll 653 supplies the outer ply. Wrapper roll 653 is supported by truncated-cone-shaped discs 654 which are rotatably mounted on the outer end of arms 655 in the same manner as described above with reference to arms 639, discs 641 and roll 642. The arms are slidably mounted on shaft 638 and are adjusted by hand crank 656 and hand knob 657 in substantially the same manner as arms 639 are slidably mounted on shaft 636 and adjusted by hand crank 644 and hand knob 649, the only difference being that the mounting of one is turned top for bottom with respect to the mounting of the other.

The wrapper plies are passed upwardly from rolls 642 and 653 and over an idler roller 660 from which they pass downwardly and under a floating roller 661, then upwardly again over idler roller 662, and thence into the machine over a support plate 212. The floating roller is free to move vertically within ways 664 and serves to prevent tearing of the wrapper in case either of the plies should tend to adhere to its respective roll.

The narrow strip roll 667 is rotatably mounted on brackets 668, the strip leading downwardly therefrom around idler roller 669 and beneath an electrically heated element 670 whereupon it immediately passes into adhering contact with the outer ply of the wrapper and is carried thereby into the machine.

As shown particularly in Figs. 2, 5 and 7, the above mentioned transverse frame member 686 and a transverse frame member 1030, carried by frame members 102 and 110, both project forwardly from the frame of the machine and provide mountings for a base plate 1031 which carries the wrapper feed control mechanism. As illustrated in Figs. 2, 5 and 27 to 29, inclusive, the base plate is provided with brackets 1032, 1033 and 1034 within which a shaft generally indicated at 1035 is rotatably mounted. This shaft comprises two relatively rotatable, axially alined shaft portions 1036 and 1037 which are drivingly interconnected by means of a clutch generally indicated at 1038 (see Fig. 28).

As above described with reference to Fig. 32, shaft 845, which carries cam 844, is constantly driven by its driving connection with the main drive or cam shaft 250. This shaft 845 extends transversely across the machine and is journalled for rotation within brackets 1039 carried by frame members 102 and 110 (Fig. 27). The forward end of the shaft is provided with a bevel gear 1040 which meshes with and drives a bevel gear 1041 pinned to the end of shaft portion 1036.

Splined to shaft portion 1037 is a bevel gear 1042 (see Figs. 27 to 29) which is positioned to mesh with a bevel gear 1043 pinned to the end shaft portion 1044 of wrapper feed roll 1045. During engagement of clutch 1038, shaft portion 1037 is driven thus causing the wrapper feed roll to be driven by gears 1042—1043.

The wrapper feed roll is carried by a pair of mounting members 1046 and 1047 (see Figs. 7, 27, 29 and 32), end shaft portion 1044 of the roll being journalled within mounting block 1046 and end shaft portion 1048, at the other end of the roll, being journalled within mounting block 1047. Mounting block 1046 is supported by and threadedly engages a screw shaft 1049 which extends longitudinally of the machine near the front side thereof. This screw shaft is mounted for rotation within brackets 1050 secured to base plate 1031 and is provided at its outer end with a hand crank 1051 (see Fig. 2).

Mounting block 1047 is similarly carried by a screw shaft 1052 which extends longitudinally of the machine near the rear side thereof. Screw shaft 1052 is mounted for rotation within a pair of brackets 1053 (see Figs. 7 and 27) which are secured to a base plate 1054 carried by frame members 686 and 1030.

Screw shafts 1049 and 1052 are drivingly interconnected by means of sprockets 1055, pinned thereto, and chain 1056. Rotation of the screw shafts, as by manual operation of crank 1051, causes mounting members 1046 and 1047 and the parts carried thereby to be adjustably moved longitudinally of the machine toward or away from center line A—A.

The wrapper, upon passing from support plate 212, passes over feed roll 1045 and is held in frictional engagement with said roll by means of a spring pressed roll generally indicated at 1057 which is positioned directly over the feed roll and bears downwardly upon the wrapper. Although other types of rolls may be used, the preferred type of roll, as illustrated, comprises a number of rubber rolls 1058 suitably fixed on a transversely extending shaft 1059. At its ends, this shaft is rotatably mounted within mounting members 1046 and 1047. While only the mounting of shaft 1059 within mounting member 1046 has been illustrated in detail, it is to be understood that the other end of said shaft is mounted within mounting member 1047 in substantially the same manner. As shown in Figs. 2 and 27, shaft 1059 is journalled within a pair of slide blocks 1060 which are vertically slidable within ways 1061 provided in the mounting members. Roll 1057 is yieldably pressed downwardly by compression springs 1062 which are positioned within recesses provided in the mounting members and engage the upper ends of the slide blocks.

In handling certain types of wrapper, it may be desirable to positively drive roll 1057. To accomplish this, the rear end of shaft portion 1048 (see Fig. 32) may be provided with a spur gear 1080 which meshes with a spur gear 1081 mounted on the rear end of shaft 1059, the pitch diameter of the gears being such that the peripheral speeds of rolls 1045 and 1057 will be the same. Either of the gears may be suitably mounted for removal when positive drive of roll 1057 is not required.

Positioned adjacent the opposed faces of the mounting members are a pair of yoke members 1063 which are apertured to rotatably receive shaft 1059 (see Figs. 7 and 27). Each of these yoke members is provided with a pair of oppositely disposed arms 1064 and 1065, arm 1064 being provided with a slot 1066 which receives the pin portion 1067 of the corresponding mounting member. These yoke members are provided to lift roll 1057, against the pressure of springs 1062, upwardly from the feed roll for the purpose of facilitating the primary threading of the wrapper into the machine. It will be obvious that upon upward movement of arms 1065, roll 1057 will be raised, the yoke members fulcruming about pin members 1067. For so moving arms 1065, a pair of cams 1068 are pinned to a transversely extending shaft 1069 and are positioned to engage the under surfaces of said arms. Shaft 1069 is journalled for rotation within bosses 1070 provided in the mounting members and is provided at its forward end with a hand crank 1071 (see Figs. 2, 27 and 29). Rotation of the hand crank in a clockwise direction as viewed in Fig. 2 from the position of engagement with a tubular shaft 1208 (later to be described) causes cams 1068 to engage arms 1065 and cam them upwardly. With rolls 1045 and 1057 thus spaced, the wrapper may be passed therebetween, whereupon the crank is then rotated counter-clockwise to the position illustrated in Fig. 2 permitting the roll 1057 to bear downwardly upon the wrapper.

The wrapper support plate 212 comprises a pair of relatively movable, overlapping sections 1071 and 1072 (see Figs. 7 and 29), section 1072 being slidably retained by the underturned edge portions 1073 of section 1071. Secured to these underturned edge portions are a pair of depending arms 1074 (only one of which is illustrated) which are forked at their lower ends to rest upon and be held by a transversely extending rod 1075 secured at its ends to frame members 102 and 110. The inner end of section 1072 is provided with a pair of upturned, hook-ended arms 1076 which are adapted to hook over shaft 1069 and thus support the inner end of the wrapper support plate. With the support plate thus mounted, section 1071 is held from longitudinal movement, while section 1072 is longitudinally movable with mounting members 1046—1047. Accordingly, the outer end of section 1071 remains in close proximity to roller 662 (see Fig. 2) and the inner end of section 1072 remains in close proximity to the feed roll, the upper surface of the support plate being substantially continuous throughout its length.

Since each loaf is centered with respect to line A—A as it is moved upwardly by the elevator, it is necessary that the wrapper, after being fed out across supports 215 and 216 and severed, be centered with respect to line A—A. The wrapper must also be sufficiently large to completely cover the loaf and overlap at the ends and bottom of the loaf. The amount of overlap at the ends of the loaf is dependent upon the size of the loaf and width of wrapper chosen. Accordingly, the operator is provided with rolls of wrapper varying in width which are suitable for wrapping the various sized loaves. The length of wrapper required depends upon the circumference of the loaf, being equal to the circumference plus an additional amount for overlap. Since the loaf, upon being moved into the sealing compartment, is centered with respect to the sealing fingers, it is desired that the overlap at the bottom of the loaf be centered with respect thereto. Accordingly, the degree of rotation of the wrapper feed roll is adjustable to vary the length of wrapper and the severing element is adjustable toward and away from line A—A so that the distance therebetween will always be equal to one-half the desired length of wrapper.

Although the severing element may be made adjustable with respect to the feed roll, for reasons that will appear below, the severing element is preferably fixed relative to the feed roll, and the wrapper feed mechanism and severing element are adjustably moved as a unit toward and away from line A—A. This adjustment movement, as described above, is accomplished by manual rotation of hand crank 1051.

A novel feature of the invention resides in the means for adjusting the degree of rotation of the wrapper feed roll. This means is automatically controlled by the longitudinal adjustment movement of the wrapper feed-severing element unit. In other words, as hand-crank 1051 is rotated to move the severing element to a given distance from line A—A, the wrapper feed drive mechanism is automatically adjusted so that the feed roll will feed out a length of wrapper equal to twice said distance, thus automatically centering the wrapper with respect to line A—A. This mechanism is principally illustrated in Figs. 27 to 30, inclusive. While all of said figures show the mechanism in clutch disengaged position, Fig. 30 shows a different position from that indicated in Figs. 27, 28 and 29.

The above mentioned shaft portion 1036 (Figs. 27 and 28) is constantly driven by its drive connection with the main drive shaft 250 and is drivingly connected with shaft portion 1037 by a multiple-toothed clutch 1038, shaft portion 1037 being in turn drivingly connected with the feed roll, as previously described. This clutch is actuated by a link connection with a cam actuated follower, described below. Another novel feature of the invention lies in a trip actuated release which is interposed in the link connection between the clutch and cam follower. This trip is acted upon by the successive loaves as they are moved through the machine, and is positioned so that each loaf will trip the release and allow the wrapper feed to feed out the wrapper for that particular loaf. Thus, in case the succession of loaves is interrupted or after the last loaf passes through the machine, the release is not actuated and operation of the wrapper feed mechanism is accordingly interrupted.

Referring particularly to Figs. 27 and 28, mounting member 1046 is provided with a forwardly disposed projection 1082 which comprises one-half of a split bearing within which the hub 1083 of gear 1042 is journalled. The other half of the bearing comprises a forwardly disposed member 1084 which is secured to projection 1082 by bolts 1085. As illustrated in Fig. 28, gear 1042 is held from axial movement relative to projection 1082 by flange 1086 of the gear hub. However, since the gear is splined to shaft portion 1037, it is free to move longitudinally with the mounting member.

The forward end of member 1084 is apertured to threadedly receive the threaded end portion 1087 of a longitudinally disposed tubular sleeve 1088. This end portion is provided with a hand adjustment knob 1089 which may be grasped to rotate and adjust the sleeve longitudinally relative to member 1087. A set-screw 1090 may be threaded into member 1087 to lock the sleeve in adjusted position. The free end of the sleeve is supported by a telescopically received rod 1091, one end of which is mounted on a bracket 1092 carried by base plate 1031.

The hub portions 1093 of a pair of yoke members 1094 are apertured to rotatably receive the free end portion of sleeve 1088 and are held from axial movement relative to the sleeve between a flange 1095 formed on the sleeve and a collar 1096 fixed to the outer end of the sleeve.

Parallel with sleeve 1088 is a square shaft 1097, the reduced cylindrical end portions 1098 and 1099 of which are rotatably mounted in brackets 1092 and 1100, respectively, stationarily mounted on base plate 1031. The hub portion 1101 of a cam follower arm 1102 is provided with a squared aperture 1103 which slidably receives shaft 1097. At its ends, hub portion 1101 is provided with cylindrical trunnions 1107 (one of which is illustrated in Fig. 29) which are rotatably received within the ends of yokes 1094. The free end of follower arm 1102 is provided with bifurcations 1104 between which is rotatably mounted a cam follower roller 1105. This follower roller is adapted to be engaged by a substantially cylindrical shaped cam 1106, formed integral with shaft portion 1036, which oscillates follower arm 1102 and shaft 1097.

Clutch 1038, as illustrated in Fig. 28, comprises axially fixed and movable multiple-toothed clutch jaws 1110 and 1111, the hub portion 1112 of the fixed jaw being rotatably mounted within bracket 1033 but held from axial movement by flange 1113. The hub is provided with a bore 1114, within one end of which the reduced end 1115 of shaft portion 1037 is taken, the shaft being drivingly connected to jaw 1110 by key 1116. The other end of the bore is provided with a bushing 1117 which rotatably receives the reduced end 1118 of shaft portion 1036.

The hub 1120 of clutch jaw 1111 is slidably mounted on shaft portion 1036 but is rotatably fixed thereto by key 1121. A flanged ring 1122 is rotatably mounted and axially fixed on hub 1120 by means of an anti-friction bearing 1123 which is retained on the hub by a nut 1124 threaded onto the end of the hub. Clutch jaw 1111 is urged toward engagement with jaw 1110 by means of a compression spring 1125 which bears at one end against the end 1126 of cam 1106 and bears at the other end against the end of hub 1120.

The action of spring 1125 is resisted by means of a pair of clutch actuating arms 1127 (see Figs. 27, 28 and 29) which are fixed to a transversely disposed shaft 1128 journalled at one end within bracket 1100 and at the other end within bracket 1129 fixed to base plate 1031. The upper free ends of arms 1127 are provided with anti-friction rollers 1127a which engage the flange of ring 1122.

The forward end of shaft 1128 has pinned thereto a substantially horizontally disposed arm 1130 (see Fig. 30) which has a link connection with a substantially horizontally disposed arm 1131 pinned to the end of shaft 1097. This link connection comprises a bolt 1132 which passes through apertures provided in arms 1130 and 1131 and which is provided with semi-spherical head 1133 and semi-spherical nut 1134 received by correspondingly shaped recesses in the underside of arm 1130 and upperside of arm 1131, respectively. A compression spring 1135, encircling bolt 1132, is disposed between the two arms to urge them against the head and nut of the bolt.

When follower arm 1102 is moved counter-clockwise by cam 1106, as viewed in Fig. 29, the end of arm 1131 is moved upwardly, thereby causing arm 1130 and shaft 1128 to rotate counter-clockwise as viewed in Figs. 28 and 30 and move clutch jaw 1111, against the action of spring 1125, out of engagement with clutch jaw 1110. Conversely, when the follower arm is permitted to move clockwise as viewed in Fig. 29, spring 1125 moves the jaw 1111 into engagement with jaw 1110 causing clockwise movement of shaft 1128 as viewed in Figs. 28 and 30, and clockwise movement of shaft 1097 and the follower arm as viewed in Fig. 29. The full and dotted line positions of arm 1130 illustrated in Fig. 30 correspond respectively to the limits of counter-clockwise and clockwise movement of the follower arm as viewed in Fig. 29.

To prevent engagement of the clutch and operation of the wrapper feed in the event of an interruption of the succession of loaves, or during running of the machine at a time when no loaves are passing therethrough, a trip actuated release generally indicated at 1140 is provided which prevents movement of arm 1130 from the full to dotted line position of Fig. 30. This release comprises an arm 1141 mounted on and extending upwardly from a transversely disposed shaft 1142 which is mounted for rotation in brackets 1143 and 1144 secured to the under surfaces of base plates 1031 and 1054, respectively (Figs. 30 and 7). Arm 1141 passes through an elongated opening 1145 in the base plate which affords the arm a suitable degree of movement about the axial center of the shaft. The upper free end of the arm is provided with a projection 1146 which, when the arm is in the full line position of Fig. 30, is engageable by a depending lug 1147 on the free end of arm 1130 and to prevent movement of the last mentioned arm to the dotted line position and therefore engagement of the clutch. However, when arm 1141 is moved to the dotted line position, arm 1130 is free to move to its dotted line (clutch-engaged) position upon downward movement of arm 1131.

Arm 1141 is urged to move from the full line to the dotted line position through the medium of a yieldable connection with shaft 1142, the latter being rotated by a link connection with the loaf actuated trip, as will later be described. This yieldable connection comprises a stop 1148 which is secured to shaft 1142 by set screw 1149 and a torsion spring 1150 encircling the shaft. The stop is positioned to be engaged by arm 1141 to limit counter-clockwise movement of the arm with reference to the shaft (as viewed in Fig. 30), and the torsion spring is positioned to yieldably urge the arm toward engagement with the stop.

An upwardly disposed arm 1151 (see Fig. 7) is secured to shaft 1142 and has connected to its free end one end of a link 1152. This link extends longitudinally of the machine, and at its other end is connected to the free end of an arm 1153 secured to and extending downwardly from a transversely disposed shaft 1154. This last mentioned shaft is mounted for rotation in brackets 1155 and 1156 (see Fig. 8) which are secured to guide bar 124. Preferably, arm 1153, positioned adjacent bracket 1155, is provided with a stop 1157 which is adapted to engage the underside of the bracket and limit clockwise movement of the shaft. Secured to shaft 1154, and centrally located transversely of the machine, is a trip plate 1158 which is normally disposed at an angle to stop plate 82 (as illustrated in Fig. 7). This trip plate is adapted to be successively engaged by the loaves, as they are carried outwardly from the end of the infeed conveyor by fingers 81, and be moved into engagement with the stop plate. Upon such movement, link 1152 causes shaft 1142 to rotate counter-clockwise effecting a movement of arm 1141 from full to dotted line position (Fig. 30) and thereby permitting engagement of the clutch and operation of the wrapper feed mechanism. Arm 1141 is normally held in the full line position of Fig. 30, and the trip plate is normally disposed at an angle with stop plate 82, by means of a weight 1160 adjustably carried by the free end of a substantially horizontal arm 1161 fixed to shaft 1142 (see Figs. 20 and 30).

As above stated, the slicer unit may be removed for the purpose of wrapping unsliced loaves. When the slicer unit is removed, stop plate 82 being removed therewith, the clockwise movement of trip plate 1158 (as viewed in Fig. 7) is limited by the engagement of stop 1157 with bracket 1156. The position at which the trip plate is limited by stop 1157 corresponds to substantially the same position at which the trip plate is limited by stop plate 82. Accordingly, when the slicer unit is removed, the trip plate serves as a stop plate to limit the movement of the loaves as they are successively moved from the end of the infeed conveyor by fingers 81. After removal of the slicer unit, a plate indicated at 1162 (Fig. 1), mounted in any suitable manner, is substituted for plate 532 to span the gap between table 84 and the channel shaped member 581 (Fig. 6).

Referring now to Figs. 27, 28 and 29, cam 1106 comprises three cylindrical, concentric surfaces 1165, 1166 and 1167 of progressively increasing diameters, shoulder 1168 between surfaces 1165 and 1167 and shoulder 1169 between surfaces 1166 and 1167 extending in straight parallel lines longitudinally of the cam and parallel to its axis. Shoulder 1170 between surfaces 1165 and 1166 is in the form of a helix extending in the present embodiment, approximately half around the cam, the arcuate extent or width of surface 1165 (between defining shoulders 1168 and 1170) being variable from a maximum at the left end of the cam (as viewed in Fig. 27) to a minimum at the right end. Since the follower is at its limit of clockwise movement (as viewed in Fig. 29) when in engagement with cam surface 1165, the time interval of dwell at this limit (and of engagement with said surface) is dependent upon the position of the follower longitudinally with respect to the cam, i. e., upon the arcuate extent of that portion of cam surface 1165 engaged by the follower when in such position longitudinally of the cam. The follower, being connected with mounting member 1046, is moved longitudinally of the cam while the wrapper feed rollers and severing element (to be described) which are carried by mounting members 1046 and 1047 are adjusted as a unit toward and away from line A—A by operation of crank 1051. Accordingly, the time interval of engagement of clutch 1038, which, as will be remembered, is in engaged position when the follower is at its clockwise limit of rotation (Fig. 29) and therefore the degree of rotation of the wrapper feed roll, is dependent upon the position of the follower longitudinally of the cam. Cam surface 1165 is so designed that, for any given position of the wrapper feed roll, severing element, and cam follower with reference to center line A—A, the dwell of the cam follower at its clockwise limit in engagement with surface 1165 and therefore the duration of engagement of wrapper feed controlling clutch 1038, will be such as to cause the wrapper feed roll to feed out a length of wrapper equal to twice the distance between the severing element and the working center (line A—A) of the machine.

The screwthreaded connection between sleeve 1088 and member 1084 is provided to permit a small degree of longitudinal adjustment of the cam follower relative to the mounting members. Although this adjustment may be dispensed with after the proper relative position of the follower is determined, its incorporation is preferred in order that the slight inaccuracies of manufacture may be compensated.

The operation of the wrapper feed control is as follows: Assuming first that trip plate 1158 is in the extended or angular position illustrated in Fig. 7 and release arm 1141 is correspondingly in the full line position of Fig. 30, arm 1130 bears downwardly, under the influence of clutch spring 1125 (Fig. 28), upon the upper end of projection 1146, and the follower is held out of engagement with cam surface 1165 by action of spring 1135 upwardly on arm 1131. This position of the follower is indicated in Fig. 29. A loaf, being moved from the end of the infeed conveyor by fingers 81, then engages the trip plate and moves it into engagement with stop plate 82. Upon such movement, stop 1148 (Fig. 30) is moved counter-clockwise to the dotted line position and away from arm 1141. Arm 1141 remains in the full line position of Fig. 30, however, by virtue of the continued engagement against its upper end of spring actuated arm 1130. After the zero degree position of the machine cycle is passed (Fig. 49) the cam turning in the direction indicated by the arrow (Fig. 29), the follower is engaged by shoulder 1168 and moved counter-clockwise, turning shaft 1097 and lifting arm 1130 through arm 1131 and bolt 1132. Arm 1130 is thus raised to the full line position (Fig. 30), releasing arm 1141 for movement to the dotted line position of Fig. 30 by action of spring 1150. The arm remains in this position while the follower traverses surface 1167, and upon movement of the follower off of surface 1167 onto shoulder 1169 and thence onto surface 1166, arm 1130 moves, under influence of the clutch spring, from its elevated position (full line, Fig. 30) to a position substantially midway between its full and dotted line positions. In this midway position of arm 1130, its lug 1147 is in overlapping relation to projection 1146 and thus arm 1141 is prevented from returning to the full line position when the trip plate 1158 is released for movement away from stop plate 82, as by movement of the loaf gripping and lowering mechanism carrying the loaf downwardly away from the trip plate (see 60° position—Figs. 49 and 51). Upon further rotation of the cam, the follower traverses surface 1166 until shoulder 1170 passes the follower, whereupon the follower, under influence of the clutch spring, then moves inwardly into engagement with surface 1165, there being an accompanying downward movement of arms 1131 and 1130 to their lowermost "clutch-engaged" position, indicated for arm 1130 in dotted lines in Fig. 30. Clutch 1038 is therefore moved to engaged position, and the wrapper feed roll is accordingly driven during the time that the follower traverses cam surface 1165. Subsequent engagement of the follower with shoulder 1168 causes arm 1130 to be raised to disengage the clutch and stop the feed roll. In the event that there are no loaves immediately following the above mentioned loaf, arm 1141 then moves to the full line position of Fig. 30 and the trip plate moves to the position indicated in Fig. 7. Then, as the follower moves off of shoulder 1167, arm 1130 is prevented from moving downwardly to the clutch-engaging position by the engagement of lug 1147 with projection 1146.

As shown in Figs. 7, 27 and 32, a pair of blocks 1175 and 1176 are secured, in any suitable manner, to mounting blocks 1146 and 1147, respectively. The lower ends of these blocks are recessed to retentively receive the ends of a pair of longitudinally spaced transversely disposed bars 1177 and 1178. The bars are held in spaced relation by means of a pair of shims 1179 positioned between the bars at their ends as indicated in Fig. 32.

Vertically alined with the space 1180 between the bars (as illustrated in Fig. 31) is a shearing knife 1181 which is held between the vertically disposed flange 1182 of a T-shaped bar 1183 and a clamping bar 1184 by screws 1185. The ends of flange 1182 extend beyond the ends of the horizontal flanges 1186 and of bar 1184, and are slidably received within vertical ways 1187 (see Fig. 27) provided in the opposed faces of blocks 1175 and 1176. Flanges 1186 are apertured to slidably receive the shank portions of a number of bolts 1188 which carry at their lower ends a pair of transversely disposed bars 1189. The heads of the bolts are yieldably held in engagement with flanges 1186 by compression springs 1190 which encircle the bolts and bear at their ends against bars 1189 and flanges 1186. Bars 1189 are recessed to receive the upper portions of a pair of rubber strips 1191, a pair of angles 1192 secured to bars 1189 by flush headed screws 1193 serving to retain the strips within the recesses. The vertical legs of angles 1192 are adapted to slidably engage the outer surfaces of flange 1182 and bar 1184, while the horizontal legs of the angles are adapted to engage the under surfaces 1195 thereof to limit vertical movement of bars 1189 relative to the T-shaped member. Positioned directly beneath strips 1191 are a pair of rubber strips 1194 which are positioned within recesses provided in the upper surfaces of bars 1177 and 1178. The upper edges of strips 1194 are slightly curved and protrude a slight distance above the upper surfaces of the bars.

When the wrapper is to be severed, knife carrying member 1183 is moved downwardly. As strips 1191 are moved into engagement with the wrapper, strips 1194 are slightly depressed within their retaining recesses. The wrapper thus being held between strips 1191 and 1194 is, in effect, longitudinally tensioned. Upon further downward movement of member 1183, springs 1190 are compressed until the horizontal portions of angles 1192 engage surfaces 1195. At this point, the serrated edge 1196 of the shearing knife has partly penetrated the wrapper. Bars 1189 then move downwardly with member 1183 causing strips 1191 and 1194 to be further compressed. This movement results in a further tensioning of the wrapper and a further penetration of the shearing knife, and finally a sudden parting of the wrapper. The parts are then returned to the position illustrated in Fig. 31, the flexure of strips 1191 and 1194, upon expanding, in effect preventing adhesion of the wrapper thereto.

As shown in Fig. 27, knife carrying member 1183 is vertically reciprocated by a lever 1200 which is pivotally mounted intermediate its ends at 1201 upon block 1175. The inner free end 1202 of the lever is pivotally connected as indicated at 1203 (Fig. 7) to member 1183, and the outer free end 1204 of the lever is provided with a cam follower roller 1205. As illustrated in Figs. 28 and 29, roller 1205 engages a cam 1206 which is keyed to a shaft 1207 rotatably mounted in projection 1082. The squared end portion 1208 of the shaft is telescopically taken within and rotatably connected with a sleeve 1209 which is rotatably mounted within the upper portions of brackets 1032 and 1033 (see Figs. 2 and 27). As indicated in Fig. 2, the sleeve is provided, adjacent bracket 1032, with a spur gear 1210 which meshes with a spur gear 1211, of equal diameter, keyed to shaft portion 1036. Thus, cam 1206 is driven in timed relation with cam 1106.

The cam 1206 is circular except for a projection 1212 (see Fig. 29) which, when moved into engagement with roller 1205, actuates arm 1200 to move member 1183 downwardly. Knife carrying member 1183 reaches its limit of downward movement at substantially 30° of the machine cycle, as indicated in Fig. 49, the wrapper blank thus being severed from the web substantially 30° of the cycle after the wrapper feed stops feeding the web.

It will thus be evident that the oncoming loaf trips a release, permitting the wrapper feed to start feeding the web at some subsequent instant depending upon the adjustment of the wrapper feed and severing mechanism with reference to working center line A—A, and it will be recalled that the wrapper feed and severing mechanism is so adjusted with reference to said center line A—A for any given required width of wrapper blank, that the blank when fed and severed, is left centered on A—A. Thus different wrapper blank widths are provided by starting operation of the feed mechanism at different times, the time at which the wrapper stops feeding remaining the same in all cases. And the adjustment of the wrapper feed and severing mechanism to start feeding at such a time as will provide a wrapper blank of the desired width by the time the wrapper feeding operation stops, and the adjustment of the wrapper feed and severing mechanism to feed such a blank to centered position on line A—A, are both taken care of by adjustment of the position of the wrapper feed and severing mechanism toward and from said line A—A.

A transversely disposed bar 1213 (see Figs. 7 and 27) is secured at its ends to blocks 1175 and 1176, and has secured to its under surface a guide plate 1214 which is spaced slightly above the feed roll 1045 and serves to guide the wrapper as it passes from the feed roll beneath the severing element. The guide plate is notched as indicated at 1215 (Fig. 29) to provide fingers which extend between the disc rolls 1058.

A support plate 1216 (see Fig. 7) substantially flush with the upper surface of bar 1177, is secured at one edge to said bar and at its other edge rides upon the feed roll. This plate serves to strip the wrapper from the feed roll and support it as it moves from the feed roll onto bars 1177 and 1178.

A support plate 1217 is similarly mounted on bar 1178 and extends horizontally a short distance from the bar. Adjustable support 215, which serves as an extension of support 1217, is comprised of flexible fabric, one end of which is secured to guide plate 680 as above described, and the other end being wound around a torsion spring loaded roller 1218 (see Fig. 7) which is mounted, in close proximity to the under surface of support 1217, upon brackets 1219 carried by blocks 1175 and 1176. Roller 1218 may be considered as being comprised of an ordinary window shade roller having the stop pawls removed, and which will reel in the support 215 as the feed roll and severing element are moved toward line A—A.

As above described, a movable support plate 216 is moved across line A—A to receive and support the wrapper as it is fed from support 215 across line A—A. As shown in Figs. 7, 8 and 26, support plate 216 is comprised of a rectangular sheet of metal having its ends 1220 and 1221 curved downwardly and downwardly disposed flanges 1222 along its sides. The flanges are secured to a pair of rack bars 1223 which are slidable within guides 1224. A pair of gears 1225, positioned to mesh with the rack bars, are received within housings 1226 formed integral with the guides. The gears are pinned to a transversely disposed shaft 1227 which is rotatable within the hub portions of the housings. Thus, the guides are supported at one end by shaft 1227, the other ends being secured to brackets 867. The shaft is rotatably mounted at its forward end within a bearing 1228 secured to frame member 106, and at its rearward end portion within a bearing 1229 secured to frame member 114 (Fig. 33).

Shaft 1227 projects outwardly from the end of bearing 1229 as illustrated in Fig. 33, and has pinned thereto the hub of a friction disc 1230. Axial movement of the shaft is prevented by engagement of said hub with the outer end of bearing 1229 and engagement of a set collar 1231 with the inner end of the bearing. A friction disc 1232, spaced from friction disc 1230, is mounted on the shaft and is urged toward disc 1230 by a compression spring 1233 abutting nut 1234 threaded on the end of the shaft. Positioned between the discs is a sprocket 1236 rotatably mounted on the shaft and having friction washers 1237 engaging its sides. The sprocket is frictionally held from rotation relative to the shaft by the pressure of spring 1233 urging the discs into frictional engagement with the washers. The pressure of the spring is adjusted by turning nut 1234 and after the adjustment is made, the nut is locked in position by cotter pin 1238.

Sprocket 1236 is drivingly connected by chain 1239 (see Fig. 32) to sprocket 334. As above described, sprocket 334 is oscillated in accordance with the characteristics of cam 254. The cam as illustrated in Fig. 43 is in the position of zero degrees of the cycle. At this position, point 254a of the cam coincides with line x—x and the associated cam follower is at its limit of movement toward the right along line x—x. Correspondingly, sprocket 334 is at its limit of counter-clockwise movement (in the aspect of Fig. 32) and support plate 216 is at its limit of movement inwardly toward guide plate 680. Preferably, at this limit, the end 1220 of the support plate is just out of engagement with guide plate 680 so that the wrapper will be supported substantially throughout its length. It is at this point in the cycle that the wrapper feed stops, the wrapper having been fed out to the proper length.

Upon counter-clockwise rotation of the cam from this position, the follower is moved toward the left along line x—x, sprocket 334 is rotated clockwise, and the support plate is moved away from guide plate 680, until point 254b reaches line x—x. This movement of the support plate is comparatively fast, requiring approximately 54° of the cycle (see Fig. 49), and the wrapper, during this movement, remains longitudinally stationary, being held first, between rolls 1045 and 1058, and then, momentarily after being severed, between rubber strips 1191 and 1194. As soon as the end 1220 of the support plate moves a suitable distance away from line A—A, the wrapper, being momentarily unsupported, is then engaged by the upwardly moving loaf.

As point 254b crosses line x—x, the support plate reaches its limit of movement away from the guide plate 680, the end 1220 of the support plate being well spaced from line A—A as indicated in Fig. 53; the support plate then dwells at this limit until point 254c crosses line x—x. The cam follower is then moved toward the left along line x—x effecting a counter-clockwise movement of sprocket 334 and movement of the support plate toward the guide plate, the elevator by this time having reached its limit of downward movement. This movement of the support plate continues until point 254d of the cam crosses line x—x, whereupon the support plate dwells at its limit of inward movement until point 254a again crosses line x—x, the wrapper being fed across the support plate during said dwell.

When the guide plate 680 is adjusted toward or away from line A—A, it is necessary to adjust the limit of inward movement of the support plate. This is accomplished by applying a suitable tool to nut 1234 and rotating shaft 1227 relative to sprocket 1236 (Fig. 33), thereby effecting rotation of gears 1225 pinned on said shaft, and consequent translation of racks 1224 which carry support plate 216.

Auxiliary side feed

In some instances when the machine is used for slicing and wrapping loaves which may be considerably non-uniform in size, the machine is adjusted to accommodate the average sized loaves, and, after passing the loaves through the machine, it may be found that a small number of them have been improperly wrapped. It then becomes necessary to strip the wrapper from these loaves, alter the adjustment of the machine, and again pass the loaves through the machine. Since it may be considered impractical to remove the slicer unit for the wrapping of such a small number of loaves, an auxiliary infeed, by-passing the slicer unit, has been found desirable. It is to be understood, however, that this infeed, now to be described, is not restricted to feeding into the machine only the sliced loaves required to be rewrapped, but may also be utilized for feeding unsliced loaves into the machine, and thus adapts the machine to be used as a wrapping machine for sliced or unsliced loaves even when the slicing unit remains in the machine.

As shown in Fig. 4, a pair of longitudinally spaced frame members 594 and 1240 are disposed transversely across the machine and project outwardly from the front side of the machine. These frame members, as illustrated in Figs. 14, 19 and 20, are comprised of angles having vertically disposed flanges 1241 and 1242 depending from the adjacent sides of horizontally disposed flanges 1243 and 1244, respectively.

Flange 1243 is provided with elongated apertures 1245 and 1246 (see Fig. 4) which slidably receive a pair of transversely movable brackets 1247 and 1248, respectively. A longitudinally disposed stop plate 1250 is secured to the upper portion of bracket 1247 and is provided with a slot 1249 (see Fig. 14). Secured to the upper portion of bracket 1248 is a transversely disposed guide bar 1251 which, at its inner end, is provided with a longitudinally disposed guide element 1252. Stop plate 1250 and guide element 1252 are positioned to longitudinally aline with fingers 228 of the elevator, and are therefore transversely adjustable toward and away from one another to accommodate loaves of various lengths. This adjustment is accomplished by the lower ends of brackets 1247 and 1248 threadedly engaging the right and left hand threaded end portions of a screw shaft 1253 (see Fig. 5) which is rotatably mounted at its forward end within a bracket 1254 secured to flange 1243 and at the center (see Fig. 14) within a bracket 1255 secured to flange 1241. Forwardly of bracket 1254, the shaft carries a bevel gear 1256 (see Fig. 5) which meshes with a bevel gear 1257 formed on a hand knob 1258 which is rotatably mounted at 1259 upon flange 1241. The screw shaft is held from axial movement by the engagement of the hub of gear 1256, and of collar 1260, with the opposite ends of bracket 1254. Rotation of hand knob 1258 causes movement of stop plate 1250 and guide element 1252 toward or away from one another and also endwise movement of guide bar 1251.

The guide bar rests upon the upper surface of flange 1243 and, near its forward end, is guided between pins 1261 (see Fig. 19) provided on the upper surface of flange 1243. This end portion of the guide bar is provided with a socket 1262 which receives the end of a finger 1263 carried by a channel shaped member 1264. This channel member is transversely slidably guided by a housing 1265 which is secured to flanges 1243 and 1244. A longitudinally disposed guide bar 1266 is secured at one end to the channel member, and, upon endwise movement of guide bar 1251, the channel member 1264 and guide bar 1266 are caused to move transversely of the machine.

A guide bar 1267 (see Fig. 4) is disposed parallel with and transversely spaced from guide bar 1266, and is formed integral with a guide bar 1268 extending parallel with guide bar 1251. Near the rear end thereof (see Fig. 21) guide bar 1268 is provided with a bolt portion 1269 which extends through an elongated opening 1270 in bracket 1271, and is provided with a hand nut 1272. Bracket 1271 extends horizontally over flange 1244, and thence downwardly where it is secured to a longitudinally movable member 1273. This member is slidably mounted on a guide rod 1274, secured to flange 1242, and threadedly engages the threaded end of a shaft 1275, the latter being rotatably mounted within flanges 1241 and 1242, and provided with collars 1276 which engage said flanges and prevent axial movement of the shaft. The other end of the shaft is provided with a hand knob 1277, rotation of which adjusts guide bar 1268 toward or away from guide bar 1251. Guide bar 1267 is adjustable toward or away from guide bar 1266 by loosening the hand nut 1272 and sliding bar 1268 relative to bracket 1271.

A support plate 1278 is positioned beneath guide bars 1266 and 1267, and is secured to brackets 1279 (see Fig. 2) which are suitably mounted on the frame of the machine. The upper surfaces of the support plate and flange 1244 are substantially flush and continuous.

The loaves that are to be fed into the machine by way of the side feed are first placed upon the support plate between guide bars 1266 and 1267, which engage the ends of the loaves, and are then successively moved by hand to a position over flanges 1243 and 1244, in engagement with guide bar 1251, and between a pair of loaf-end engaging fingers (later to be described) rising from the space between frame members 594 and 1240. The loaf, so positioned, is then moved transversely between guide bars 1251 and 1268 over flanges 1243 and 1244 and into engagement with stop plate 1250, whereupon ram 567 engages the loaf and moves it between the stop plate and guide element 1252 and onto the elevator 87, ram 85, in this instance, serving as a limiting stop.

The loaf-end engaging fingers are carried by a pair of endless chains 1280 and 1281 (see Figs. 4, 14 and 19), the upper horizontal runs of which are spaced beneath the upper surfaces of flanges 1243 and 1244 and supported by a rail 1282 secured to flange 1241. The fingers 1284 carried by chain 1280 are adapted to engage the loaves at one end, while the fingers 1285 carried by chain 1281 are adapted to engage the loaves at their other end, the fingers being secured to their respective chains substantially as illustrated in Fig. 18.

Secured to flanges 1241 and 1242, near their forward ends, and depending therefrom, are a pair of brackets 1286 (see Fig. 19) which are apertured to receive a bolt 1287, said bolt passing through a spacer sleeve 1288 positioned between the brackets. Rotatably mounted on this sleeve are a pair of idler sprockets 1290 and 1291 around which chains 1280 and 1281 respectively pass. The chains pass upwardly around sprockets 1290 and 1291, thence horizontally inwardly along rail 1282, and thence downwardly over a pair of drive sprockets 1292 and 1293 (see Figs. 14 and 17).

Sprockets 1292 and 1293 are drivingly connected, in a manner later to be described, to a shaft 1294 (Figs. 17 and 18) which is rotatably mounted in a bearing 1295 secured to frame member 595 (see Fig. 5). A bevel gear 1296 is keyed to shaft 1294, and meshes with a bevel gear 1297 keyed to a shaft 1298, the latter shaft being journalled for rotation within a bearing 1299 secured to frame members 112 and 595, and extending toward the rear of the machine. A mutilated gear 1300 is fixed to the rear end of shaft 1298 (see Fig. 32), and is adapted to be intermittently driven by a mutilated gear 1301 which is rotatably mounted upon a stub shaft 1302 carried by frame member 112. Fixed to gear 1301 is a sprocket 1303 which is drivingly connected by chain 1304 with a sprocket 1305 keyed to the constantly driven sleeve 849, gear 1301 being rotated one revolution for each cycle of operation. Gear 1300 is rotated by gear 1301 one complete revolution during approximately one half the cycle of operation of the machine, and remains idle during the remainder of the cycle. Since intermittent drives of this type are well known to the art, it is herein considered unnecessary to give a further detailed description of this particular form of drive.

During the idle period of gear 1300, one pair of fingers 1284 and 1285 are longitudinally alined with guide bars 1267 and 1266, respectively, while the preceding pair are longitudinally alined with stop plate 1250 and guide element 1252, respectively. Upon rotation of gear 1300, the first mentioned pair of fingers is moved to a position of alinement with the stop plate 1250 and guide element 1252, the preceding pair passing downwardly around the drive sprockets, and the succeeding pair moving upwardly around the idler sprockets to a position of alinement with guide bars 1267 and 1266. Thus, each pair of fingers dwells at a position of alinement with guide bars 1266 and 1267 for approximately one half of the cycle, there being ample time for the operator to place a loaf between the fingers. The fingers then move the loaf to a position of engagement with stop plate 1250, and thereupon dwell at this position for another half cycle. During this dwell, the ram 567 is moved inwardly to engage the loaf and move it onto the elevator, and then is immediately moved outwardly so that it will be clear of the fingers when they again are moved.

The fingers are adapted to engage the ends of each loaf, and, if sliced loaves are being fed into the machine, to hold them in unitary relation during movement toward the stop plate.

Stop plate 1250 and guide bar portion 1252 are adjustable equally toward and away from a vertical longitudinal plane passing through line A—A (the center of the elevator). Since guide bar 1266 is transversely fixed relative to portion 1252 and movable therewith, it follows that guide bar 1267, when properly adjusted, will bear the same relation to the stop plate. Accordingly, a vertical longitudinal plane passing midway between guide bars 1266 and 1267 bears a fixed relation to the vertical longitudinal plane passing through line A—A. In order to accommodate loaves of various lengths, it is necessary that fingers 1284 and 1285 be relatively adjustable, and also that they be equally spaced, at their positions of dwell, from the above mentioned planes. To provide such an adjustment, sprockets 1292 and 1293 are so mounted upon shaft 1294 that upon adjustment movement of one sprocket in one direction relative to the shaft, the other sprocket is automatically moved an equal amount in the opposite direction relative to the shaft, and, after such adjustment, the sprockets are then held from further movement relative to the shaft by suitable clamping means.

A more detailed description of this adjustment will now be given, reference being had to Figs. 17 and 18. Sprockets 1292 and 1293 are rotatably mounted on the hub portions 1306 of a disc 1307 which is keyed to shaft 1294, the sprockets being positioned on opposite sides of the disc. Shaft 1294 is provided with a flange 1308 which engages the outer face of sprocket 1292. A flange 1309, positioned to engage the outer face of sprocket 1293 is threadedly mounted upon the threaded end of a rod 1310 which passes through the axial center of shaft 1294, which is hollow, and is provided at its other end with a bolt head 1311. Flange 1309 is held from rotation relative to disc 1307 and shaft 1294 by a pin 1312. Sprockets 1292 and 1293 are normally held from rotation relative to disc 1307 (and the shaft) by the engagement of flanges 1308 and 1309 therewith urging them into frictional engagement with the disc. The sprockets may be freed for rotation relative to the disc by turning rod 1310 to back off flange 1309. Sprockets 1292 and 1293 are respectively provided in their adjacent faces with gear teeth 1313 and 1314 which engage a bevel gear 1315 positioned within an aperture 1316 provided in the disc and rotatably mounted upon pin 1317 radially positioned in the disc and extending across aperture 1316. Thus, as one sprocket is manually rotated in one direction relative to the disc, bevel gear 1315 causes the other sprocket to rotate in the opposite direction. After fingers 1284 and 1285 are spaced the required distance, rod 1310 is then turned to clamp the sprockets against the disc against further relative movement.

The actuation of clutch 1038 (Fig. 28) is also controllable by means of a trip plate 1320 (Fig. 4) which has a link connection with rod 1142 (Fig. 30). Referring to Figs. 4 and 20, a rod 1321, positioned within suitable recesses provided in the adjacent edges of plate 1278 and flange 1244, is rotatably mounted within brackets 1322 and 1323 secured to flange 1244. The trip plate is secured to rod 1321, and is normally disposed upwardly at an angle with flange 1244. One end of the trip plate is bent diagonally downwardly as indicated at 1324, so that said end is disposed just below the upper surface of flange 1244 when the trip plate is in its normal position, flanges 1244 and 1242 being suitably recessed, as indicated at 1325, to receive the downwardly bent end. At its inner end, rod 1321 is rotatably mounted within a bracket 1326 secured to flange 1244, and is provided with an arm 1327 which is connected by link 1328 to arm 1161 (see Fig. 30). Adjacent brackets 1322 and 1326, rod 1321 is bent downwardly beneath flange 1244 to prevent interference therewith.

As a loaf is moved onto flanges 1243 and 1244 and between fingers 1284 and 1285, the trip plate is depressed thereby. This causes rod 1321 to rotate moving link 1328 upwardly and rotating shaft 1142 counter-clockwise as viewed in Fig. 30. The wrapper feed is then caused to operate as above described.

*Modified loaf gripping and lowering mechanism*

A modified form of loaf gripping and lowering mechanism as applied to the machine is illustrated in Figs. 60 to 69 inclusive, unchanged parts of the machine carrying the same reference numerals as applied above.

As shown particularly in Figs. 60 and 61, this mechanism is carried by a base plate 1330 which extends transversely across the machine and is suitably mounted upon frame members 103 and 111 of the machine. Mounted near the rear end of the base plate are a pair of transversely spaced brackets 1331 and 1332 within which a transversely disposed shaft 1333 is rotatably mounted. A sprocket 1334 is pinned to the rear end of shaft 1333, and is drivingly connected by means of chain 1335 with a sprocket 1336, of equal diameter, which is pinned to the rear end of the main drive shaft 250. Accordingly, shaft 1333 is uniformly rotated one revolution for each cycle of operation of the machine.

Parallel with shaft 1330 is a jack shaft 1337 which is rotatably mounted within brackets 1338 and 1339 secured to the base plate. The jack shaft is intermittently drivingly connected with shaft 1333 by means of an intermittent drive of the type generally known as a register wheel gear. Since this type of drive is well known to the art, it is considered sufficient to state that the driven member 1340, pinned to shaft 1337, is rotated one-eighth of a revolution by the driving member 1341, keyed to shaft 1333, during approximately 45° of the cycle, and remains idle during the remainder of the cycle.

Keyed to shaft 1337 is a gear 1342 which meshes with a pinion 1343 pinned to a shaft 1344 axially alined with shaft 1333 and extending transversely across the machine, said shaft 1344 being rotatably mounted at its rearward end within a bore 1345 (see Fig. 67) provided in the enlarged forward end of shaft 1333, at its central portion within a bracket 1346, and at its forward end within a bracket 1347. Axial movement of the shaft is prevented by the engagement of pinion 1343 with bracket 1332, and of set-collar 1348 with bracket 1347. Thus connected, shaft 1344 is rotated during approximately 45° of the cycle and remains idle during the remainder of the cycle. The ratio of gears 1342 and 1343 is such that shaft 1344 is rotated one-half a revolution for each one-eighth revolution of shaft 1337.

Keyed to shaft 1333, adjacent driving member 1341, is a cam 1350 which reciprocates a cam follower generally indicated at 1351. This cam follower is longitudinally slidably mounted on a pair of rectangular bearing blocks 1352 and 1353 which rotatably receive and are supported by shafts 1333 and 1337, respectively, the blocks respectively being received within ways 1354 and 1355 provided in the follower. A cam engaging roller 1356 is carried by the follower as illustrated in Figs. 66 and 68.

With the cam in the position illustrated in Fig. 68, point 1350a of the cam coincides with the center of the follower roller, and the follower is at its limit of movement toward the left. Clockwise rotation of the cam, from this position, causes movement of the follower toward the right until point 1350b of the cam reaches the center of the follower roller. The follower then dwells at its limit of movement toward the right until point 1350c crosses the center of the roller, whereupon the follower is moved toward the left. The follower reaches its limit of movement toward the left when point 1350d crosses the center of the follower roller, and then remains or dwells at this limit until point 1350a again reaches the center of the roller. The angular relation of cam 1350 to driving member 1341 is such that shaft 1337 is rotated during the dwell of the cam follower at its limit of movement toward the right, the radial angle between points 1350b and 1350c being substantially 45°.

The cam follower is connected with the free end of one arm 1357 of a bell crank 1358, by means of a pin 1359, the flat sided head of which is slidably received within a transverse way 1360 provided in the follower. The bell-crank is pivotally mounted between bracket arms 1361, and is provided with an arm 1362 substantially at right angle to arm 1357. The free end of arm 1362 is provided with a pin 1363, the flat sided head of which is slidably received within a way 1364 provided in a block 1365. This block is apertured to rotatably receive a shaft 1367 which is parallel to and located immediately below shaft 1344, but is held from axial movement relative thereto by means of set-collars 1368 fixed to the shaft. The rearward end portion of shaft 1367 is slidably and rotatably received within a bore 1369 provided in bracket 1332.

Axially alined with shaft 1367 and extending forwardly therefrom is a shaft 1370. The split, overlapping ends 1371 and 1372 of shafts 1367 and 1370, respectively, are rotatably and slidably received within a bore 1373 provided in bracket 1346, the shafts thus being relatively axially movable but held against rotation relative to one another. The forward end portion of shaft 1370 is slidably and rotatably mounted in bracket 1347, and at its end carries a hand knob 1374.

As the follower 1351 is moved toward the right (as viewed in Fig. 68), the bell-crank 1358 is turned clockwise (as viewed in Fig. 66), and shaft 1367 is moved toward the right (as viewed in Figs. 61 and 66). For a given distance of movement of shaft 1367 in one direction, shaft 1370 is moved an equal distance in the opposite direction by means of a suitable link connection between the two shafts, as will now be described.

Referring to Fig. 65, shafts 1367 and 1370, near their adjacent ends, are provided with spaced collars 1375 and 1376, respectively. A pair of slide members 1377 and 1378 are disposed on opposite sides of shafts 1367 and 1370, parallel therewith, and are provided with hooked ends 1379 and 1380 which engage shafts 1367 and 1370 and the opposed faces of collars 1375 and 1376, respectively. Slide members 1377 and 1378 are slidably mounted within ways 1381 and 1382 provided between the sides of bracket 1346 and guide blocks 1383 and 1384, respectively, which are secured to the bracket by bolts 1385.

Bracket 1346 is apertured at 1386 to receive a link 1387 which is centrally pivotally mounted upon pin 1388 carried by the bracket. The free ends 1389 and 1390 of the link are provided with rotatable pins 1391 and 1392, the flat sided heads of which are received within ways 1393 and 1394 provided in slide members 1377 and 1378, respectively. Thus, as shaft 1367 is moved toward the right (as viewed in Fig. 65), slide member 1377 causes link 1387 to rotate clockwise about pin 1388 to move slide member 1378 and shaft 1370 toward the left.

It will now be evident that as follower roller moves outwardly (to the right in Fig. 68), shafts 1367 and 1370 will move towards one another, and that 45 degrees later in the cycle, as the follower roller moves back inwardly (to the left), said shafts will be moved apart.

Supported for sliding movement on shaft 1344 are a pair of upwardly extending arms 1397 and 1398, the offset hub portions 1393 and 1394 of the arms being apertured to slidably and rotatably receive said shaft. The arms are held in their upright position by the engagement of spaced pairs of guide bars 1399 and 1400, secured to the base plate, with the lower ends of lugs 1395 and 1396 which are formed integral with hub portions 1393 and 1394, respectively.

Shafts 1367 and 1370 are provided with threads of opposite pitch and threadedly engage lugs 1395 and 1396, respectively. Thus arms 1397 and 1398, which are movable axially of shaft 1344, are reciprocated toward and away from one another by cam 1350 and the linkage connection between shafts 1367 and 1370, and are also movable toward or away from one another by concurrent rotation of said shafts, as by manual operation of hand knob 1374.

A pair of bevel gears 1401 and 1402 are splined to shaft 1344, as indicated at 1349 (Fig. 63), and are axially positioned within recesses 1403 and 1404 provided in arms 1397 and 1398, respectively. Rotatably mounted at 1405 and 1406 upon hub portions 1393 and 1394, respectively, are a pair of bevel gears 1407 and 1408 which mesh with gears 1401 and 1402, respectively. Secured to the hub portions of gears 1407 and 1408 are a pair of drive pulleys 1409 and 1410, and vertically spaced from said pulleys are a pair of idler pulleys 1411 and 1412 which are rotatably mounted at 1413 and 1414 within the upper forked ends of arms 1397 and 1398.

In this modified form, the loaf end engaging members comprise a pair of endless belts 1415 and 1416 which respectively pass inwardly over pulleys 1411 and 1412, thence downwardly under pulleys 1409 and 1410, and then upwardly to pulleys 1411 and 1412. Arms 1397 and 1398 are provided with belt engaging surfaces 1417 and 1418 which engage the inner runs of belts 1415 and 1416, respectively, and prevent outward flexing thereof. The diameter of the drive pulleys and the ratio of gears 1401—1402 to gears 1407—1408 are so proportioned that for one-half of a revolution of shaft 1344, belts 1415—1416 will be moved a peripheral distance equal to the vertical distance between the upper surfaces of loaf supporting fingers 81 and table 84'.

In operation, arms 1397—1398 are moved inwardly by cam actuated shafts 1367 and 1370 to a position of gripping engagement of belts 1415—1416 with the ends of a loaf, which at the time is supported upon fingers 81. Immediately upon such engagement fingers 81 are retracted, and shaft 1344 begins to rotate, causing the belts to convey the loaf downwardly. As the loaf reaches table 84', shaft 1344 ceases to rotate and shafts 1367—1370 are then actuated to move the arms outwardly to release the loaf.

The timing of this modified form of loaf gripping and lowering mechanism is substantially the same as that of the first form, the only difference being that the loaf engaging members of the modified form remain stationary during the same portion of the cycle occupied by the upward movement and dwell at upper and outer limit of the loaf engaging members of the first form (see Fig. 49). The above described actuating mechanism (comprising members 1340, 1341, 1350, 1351, etc.) substantially corresponds to cams 258 and 259 and the members associated therewith.

In order that the spacing between belts 1415—1416 may be adjustable to the same degree as the spacing between the loaf engaging members of the first form, it becomes necessary to modify certain of the other parts of the machine, since the loaf engaging members of the modified form do not overhang the feed table as do the loaf engaging members of the first form. This modification includes the substitution of hangers 351' for hangers 351 in order that guide bars 520' (same as guide bars 520) may be mounted closer together, and thus permit arms 1397—1398 to be adjustably moved further inwardly. Accordingly, a narrower ram carriage 517' is substituted for ram carriage 517 and brackets 352', provided with correspondingly longer horizontal portions, are substituted for brackets 352. Aside from such modifications, the machine remains substantially the same as set forth above and is operated in substantially the same manner.

An illustrative embodiment of the invention will now be understood. The particular embodiment of the invention herein shown for illustrative purposes, however, is of course to be considered as merely illustrative of rather than restrictive on the invention, and is therefore subject to various changes in design, structure and arrangement without departing from the spirit and scope of the present invention or of the appended claims.

I claim:

1. In a bread slicing and wrapping machine, the combination of a generally horizontally travelling infeed conveyor, means for receiving loaves one at a time from the discharge end of said conveyor and lowering said loaves to a slicing level, a reciprocating ram for engaging said loaf in its last mentioned position and moving it along said slicing level through a slicing zone the same general direction as it was moved by the infeed conveyor, an elevator adapted to receive the loaf from said ram after passing through said slicing zone, said elevator being movable to raise the sliced loaf into engagement with a wrapper blank positioned over it and to raise said loaf and blank to a wrapping level which is spaced above the level of the infeed conveyor, loaf advancing means for moving said loaf along said wrapping level in a direction contrary to the direction of infeed while the wrapping of the loaf is completed and an outfeed conveyor operating at said wrapping level and adapted to receive the wrapped loaves from said loaf advancing means and to deliver them from the machine.

2. In a bread slicing and wrapping machine, the combination of a generally horizontally travelling infeed conveyor, means for receiving loaves one at a time from the discharge end of said conveyor and lowering said loaves to a slicing level, a reciprocating ram for engaging said loaf in its last mentioned position and moving it along said slicing level through a slicing zone in the same general direction as it was moved by the infeed conveyor, an elevator adapted to receive the loaf from said ram after passing through said slicing zone, said elevator being movable to raise the sliced loaf into engagement with a wrapper blank positioned over it and to raise said loaf and blank to a wrapping level which is spaced above the level of the infeed conveyor, loaf advancing means for moving said loaf along said wrapping level in a direction contrary to the direction of infeed while the wrapping of the loaf is completed, and an outfeed conveyor adapted to receive the wrapped loaves from said loaf advancing means and to deliver them from the machine along a path spaced above and in a direction contrary to the travel of said infeed conveyor.

3. In a bread slicing and wrapping machine, the combination of a reciprocating ram adapted to move loaves one at a time through a slicing zone, a loaf carrier adapted to receive a loaf moved through said slicing zone by said ram and movable from said position in a direction substantially at right angles to the direction of travel of said ram, and means for feeding and positioning a wrapper blank across the course of said loaf carrier whereby said blank is engaged by the loaf and partially wrapped thereabout by such movement of the carrier.

4. In a bread slicing and wrapping machine, the combination of a loaf support means for supporting the bottom of a loaf while it is moved through a slicing zone, a reciprocating ram for moving loaves one at a time through said slicing zone, an elevator adapted to come to rest in substantial alinement with said loaf support, and in position to receive a loaf moved through said blades by said ram, said elevator being movable from said position in an upward direction, and means for feeding and positioning a wrapper blank across the course of said elevator whereby said blank is engaged by the loaf and partially wrapped thereabout by such upward movement of the elevator.

5. In a machine of the character described, the combination of conveyor belt means for intermittently advancing loaves into the machine, a reciprocating load supporting means adapted to be projected from the discharge end of said conveyor belt means to carry a loaf beyond the discharge end of said conveyor belt means, loaf carrying means adapted to receive a loaf supported on said loaf supporting means when in projecting position, and drive means for simultaneously intermittently advancing the conveyor belt means and the loaf supporting means, and for retracting the loaf supporting means between times of advancement of the conveyor belt means.

6. In a machine of the character described, the combination of conveyor belt means for intermittently advancing loaves into the machine, a reciprocating loaf supporting means adapted to be projected from the discharge end of said conveyor belt means to carry a loaf beyond the discharge end of said conveyor belt means, loaf carrying means adapted to receive a loaf supported on said loaf supporting means when in projecting position, drive means for simultaneously intermittently advancing the conveyor belt means and the loaf supporting means, and for retracting the loaf supporting means between times of advancement of the conveyor belt means, and means for lowering said loaf carrying means and loaf carried thereby following retraction of the loaf supporting means.

7. In a machine of the character described, the combination of conveyor belt means for intermittently advancing loaves into the machine, said conveyor belt means embodying a plurality of transversely spaced belts and belt pulleys therefor, reciprocating loaf supporting means comprising a plurality of fingers adapted to be projected from the discharge end of the conveyor belts between said belts and approximately in the plane of the upper surface of said belts, and drive means for simultaneously intermittently advancing the conveyor belts and fingers, and for retracting said fingers between times of advancement of the conveyor belts.

8. In a machine of the character described, the combination of conveyor belt means for intermittently advancing loaves into the machine, a reciprocating loaf supporting means adapted to be projected from the discharge end of said conveyor belt means to carry a loaf beyond the discharge end of said conveyor belt means, a drive shaft, means for oscillating said shaft, a gear on said shaft, a rack gear on said loaf supporting means meshing with the last mentioned gear, and a one way driving interconnection between said drive shaft and said conveyor belt means so arranged that rotation of the shaft in a direction to advance the loaf supporting means acts to advance the conveyor belt means while reverse rotation of the shaft retracts the loaf supporting means but leaves the conveyor belt means at rest.

9. In a machine of the character described, the combination of conveyor belt means for intermittently advancing loaves into the machine, a reciprocating loaf supporting means adapted to be projected from the discharge end of said conveyor belt means to carry a loaf beyond the discharge end of said conveyor belt means, and drive means for simultaneously intermittently advancing the conveyor belt means and the loaf supporting means, and for retracting the loaf supporting means between times of advancement of the conveyor belt means, said drive means including adjustment means for varying the length of stroke of the loaf supporting means and the linear travel of the conveyor belt means without varying the limit of forward travel of the loaf supporting means.

10. In a machine of the character described, the combination of conveyor belt means for intermittently advancing loaves into the machine, a reciprocating loaf supporting means adapted to be projected from the discharge end of said conveyor belt means to carry a loaf beyond the discharge end of said conveyor belt means, and drive means for simultaneously intermittently advancing the conveyor belt means and the loaf supporting means, and for retracting the loaf supporting means between times of advancement of the conveyor belt means, said drive means including an oscillative shaft, a driving interconnection between said shaft and said loaf supporting means, a one-way driving interconnection between said shaft and said conveyor belt means, a swinging arm on said oscillative shaft by which said shaft is oscillated, a link connectible at one end to said arm at different positions along the length of said arm, and an oscillating crank arm connected to the other end of said link, said link and swinging arm being arranged to stand at substantially right angles to one another when the loaf supporting means is at its extreme advanced position.

11. In a machine of the character described, the combination of conveyor belt means for intermittently advancing loaves into the machine, a reciprocating loaf supporting means adapted to be projected from the discharge end of said conveyor belt means to carry a loaf beyond the discharge end of said conveyor belt means, a stop member at the discharge end of said conveyor belt means adapted to be engaged by loaves moved outwardly on the advancing loaf supporting means, drive means for simultaneously intermittently advancing the conveyor belt means and the loaf supporting means, and for retracting the loaf supporting means between times of advancement of the conveyor belt means, said drive means including adjustment means for varying the length of stroke of the loaf supporting means and the linear travel of the conveyor belt means without varying the limit of forward travel of the loaf supporting means, and means for shifting the position of the conveyor belt means toward and from said stop member to adjust the distance between the discharge end of the conveyor belt means and the stop member for loaves of different widths.

12. In a machine of the charatcer described, the combination of a conveyor belt unit embodying a conveyor belt, rollers for said conveyor belt, supporting means for said rollers mounted in the machine for adjustment movement longitudinally of the conveyor belt, a slide member mounted on said support for reciprocating sliding movement with reference thereto in a direction parallel to said conveyor belt, a loaf supporting means mounted on said slide member adapted to be projected from the discharge end of said conveyor belt unit at approximately the level of the upper surface of the conveyor belt by movement of said slide member on said conveyor support member, and drive means for simultaneously intermittently advancing the conveyor belt and said slide member, whereby the loaf supporting means is moved to projecting position, and for returning said slide member to retract the loaf supporting means between times of advancement of the conveyor belt means.

13. In a slicing machine, the combination of infeed means for forwarding a loaf to a position vertically spaced above a slicing level, and mechanism for receiving said loaf at the last mentioned position and lowering it to the slicing level, said mechanism embodying a pair of loaf end engaging elements, and means for moving said elements towards one another to engage the ends of a loaf in said position, then lowering said loaf end engaging elements and loaf to said slicing level, and then moving said elements away from one another to release the loaf.

14. In a slicing machine, the combination of infeed means for forwarding a loaf to a position vertically spaced above a slicing level, and mechanism for receiving said loaf at the last mentioned position and lowering it to the slicing level, said mechanism embodying a pair of loaf end engagng elements, means for moving said elements towards one another to engage the ends of a loaf in said position, then lowering said loaf end engaging elements and loaf to said slicing level, and then moving said elements away from one another to release the loaf, and a cam for operating said last mentioned means, said cam being designed to effect lowering of said loaf end engaging elements through a substantial portion of the downward stroke of said elements with an acceleration of approximately gravity.

15. In a slicing machine, the combination of infeed means for forwarding a loaf to a position vertically spaced above a slicing level, and mechanism for receiving said loaf at the last mentioned position and lowering it to the slicing level, said mechanism embodying a pair of loaf end engaging elements, and means for moving said elements towards one another to engage the ends of a loaf in said position, then lowering said loaf end engaging elements and loaf to said slicing level, then moving said elements away from one another to release the loaf, and then elevating said elements to their original said position preparatory to engagement of the next loaf.

16. In a slicing machine, the combination of infeed means including a projecting reciprocating loaf supporting means adapted to receive loaves one at a time and to move said loaves to an advanced position vertically spaced above a slicing level, and mechanism for receiving a loaf from said projecting means and lowering it to said slicing level, comprising a pair of loaf end engaging elements, and means operating in timed relation with said projecting reciprocating means for moving inwardly and engaging a loaf at its ends while said loaf is held in advanced position on said loaf supporting means, lowering said elements and loaf to the slicing level immediately following withdrawal of said loaf supporting means from below the loaf, then moving away from one another to release the loaf, and then returning upwardly to receive the loaf next moved to advanced position on the reciprocating loaf supporting means.

17. Loaf lowering mechanism, comprising a vertically movable carrier member, a pair of loaf end engaging elements mounted for movement toward and from one another on said carrier member, a vertical drive shaft, means on said vertically movable carrier member slidably but non-rotatably engaging said vertical drive shaft, operative interconnections between said last mentioned means and said loaf end engaging elements so arranged that oscillation of said vertical drive shaft effects movement of said loaf end engaging members toward and from one another, and drive means for oscillating said vertical drive shaft and vertically moving said carrier member in timed relation such that the vertical drive shaft rotates in a direction to move the loaf end engaging elements toward one another when the carrier member is at the upper end of its stroke and rotates in the opposite direction to move the loaf end engaging elements from one another when the carrier member is at the lower end of its stroke.

18. Loaf carrying mechanism, comprising a vertically movable carrier member, a pair of loaf end engaging elements mounted for movement toward and from one another on said carrier member, a vertical drive shaft, means on said vertically movable carrier member slidably but non-rotatably engaging said vertical drive shaft, operative interconnections between said last mentioned means and said loaf end engaging elements so arranged that oscillation of said vertical drive shaft effects movement of said loaf end engaging members toward and from one another, and drive means for oscillating said vertical drive shaft and vertically moving said carrier member in timed relation such that the vertical drive shaft rotates in a direction to move the loaf end engaging elements toward one another when the carrier member is at one end of its stroke and rotates in the opposite direction to move the loaf end engaging elements from one another when the carrier member is at the other end of its stroke.

19. In a slicing machine having a plurality of slicing blades, the combination of a loaf supporting table defining a slicing path intersecting said slicing blades, a reciprocating ram for moving a loaf along said table and through said slicing blades, an elevator having a loaf carrying platform and arranged to come to a lowermost position of rest with said platform in line with said table and in position to receive the sliced loaf moved through and beyond the slicing blades by said ram, said elevator being upwardly movable from said lowermost position of rest along an upwardly extending center line, and a reciprocating centering ram movable in opposition to said first mentioned ram and adapted to move toward and engage the side of the loaf opposite to that engaged by the first mentioned ram as the sliced loaf is moved by the latter onto the elevator platform and to cooperate with the latter ram to center the loaf on the elevator platform with reference to said elevator center line.

20. In a slicing machine having a plurality of slicing blades, the combination of a loaf supporting table defining a slicing path intersecting said slicing blades, a reciprocating ram for moving a loaf along said table and through said slicing blades, an elevator having a loaf carrying platform and arranged to come to a lowermost position of rest with said platform in line with said table and in position to receive the sliced loaf moved through and beyond the slicing blades by said ram, said elevator being upwardly movable from said lowermost position of rest along an upwardly extending center line, and a reciprocating centering ram movable in opposition to said first mentioned ram and adapted to move toward and engage the side of the loaf opposite to that engaged by the first mentioned ram as the sliced loaf is moved by the latter onto the elevator platform and to cooperate with the latter ram to center the loaf on the elevator platform with reference to said elevator center line, a common drive mechanism for said two opposed rams, and means in said mechanism for equally and oppositely adjusting the forward limits of the strokes of said rams with respect to said elevator center line.

21. In a slicing machine having a plurality of slicing blades, the combination of a loaf supporting table defining a slicing path intersecting said slicing blades, a reciprocating ram for moving a loaf along said table and through said slicing blades, an elevator adapted to receive the loaf so moved through the slicing blades by said ram, and a reciprocating centering ram movable in opposition to said first mentioned ram and adapted to move toward and engage the side of the loaf opposite to that engaged by the first mentioned ram as the sliced loaf is moved by the latter to position to be elevated by said elevator and to cooperate with the latter ram to center the loaf with reference to the elevator.

22. In a slicing machine, the combination of infeed means for advancing loaves, a stop member engaged by the advanced side of a loaf as it passes beyond the discharge end of said infeed means, loaf lowering means for lowering the loaf after engagement against said stop member, a feed table for receiving the loaf lowered by said lowering means, a reciprocating ram for engaging the side of the loaf opposite to that which engaged said stop member and pushing said loaf through a slicing zone along a slicing path defined by said table, an elevator adapted to receive the loaf so moved through said slicing zone by said ram and to elevate said loaf along an upwardly extending path, and mechanism for reciprocating said ram, said mechanism embodying means for simultaneously adjusting the forward and rearward stroke limits of the ram with reference to the elevator in approximately a one to two ratio.

23. In a slicing machine, the combination of infeed means for advancing loaves, a stop member engaged by the advanced side of a loaf as it passes beyond the discharge end of said infeed means, loaf lowering means for lowering the loaf after engagement against said stop member, a feed table for receiving the loaf lowered by said lowering means, a reciprocating ram for engaging the side of the loaf opposite to that which engaged said stop member and pushing said loaf through a slicing zone along a slicing path defined by said table, an elevator adapted to receive the loaf so moved through said slicing zone by said ram and to elevate said loaf along an upwardly extending path, and mechanism for reciprocating said ram, said mechanism embodying an oscillative shaft drivingly interconnected with said ram, a swinging arm on said shaft, a revoluble lead screw on said arm, a nut member having a threaded connection with said screw, a link pivotally connected at one end to said nut member, and a driving crank arm having a pivotal connection with the other end of said link, said screw being at such an angle with reference to said link that adjustment of the nut member and associated link end along said lead screw both swings and varies the effective length of said swinging arm to adjust the forward and rearward stroke limits of the ram with reference to the elevator in approximately a one to two ratio.

24. In a machine of the character described, a loaf elevator having a platform portion adapted to have a loaf deposited thereon, means for moving said elevator between lowermost and uppermost positions, loaf end engaging members mounted for vertical movement on said elevator between an upper loaf-end engaging position above said platform and a position below said platform, yielding means urging said loaf-end engaging members to said upper position, and means active just before the elevator reaches the upper limit of its travel to arrest further upward movement of said loaf-end engaging members, whereby when the elevator platform reaches the upper limit of its travel, the loaf-end engaging members are held against said yielding means in said position below the elevator platform.

25. In a machine of the character described, a loaf elevator having a platform portion adapted to have a loaf deposited thereon, means for moving said elevator between lowermost and uppermost positions, loaf-end engaging members mounted for vertical movement on said elevator between an upper loaf-end engaging position above said platform and a position below said platform, yielding means urging said loaf-end engaging members to said upper position, means active just before the elevator reaches the upper limit of its travel to arrest further upward movement of said loaf-end engaging members, whereby when the elevator platform reaches the upper limit of its travel, the loaf-end engaging members are held against said yielding means in said position below the elevator platform, and loaf wrapping mechanism receiving and acting on said loaf when the elevator platform is at its upper limit of movement.

26. In a loaf wrapping machine, the combination of a loaf elevator embodying a platform adapted to carry a loaf and to elevate said loaf in a fixed, centered position thereon along a center line, means for positioning a wrapper blank in the path of the loaf moved upwardly by said elevator, whereby said loaf engages said blank and moves it upwardly, and a pair of parallel side folding plates positioned on opposite sides of the path of the loaf and between which the loaf is passed by the elevator after engaging the wrapper, said side folding plates being movable toward and from one another, and means interconnecting said side folding plates for equal and opposite movements toward and from said elevator center line in such manner that both said plates are always at equal distances from the elevator center line, said plates being adapted to press the sides of the wrapper down along the sides of the loaf as the loaf and wrapper are passed upwardly therebetween.

27. In a loaf slicing and wrapping machine having loaf slicing means and loaf wrapping means, the combination of a main infeed conveyor, means for forwarding loaves from said infeed conveyor to and through said slicing means, loaf transporting means adapted to receive loaves moved through said slicing means and to carry said loaves to said wrapping means, outfeed means for delivering wrapped loaves from said wrapping means, and an auxiliary infeed means for delivering loaves to said loaf transporting means to be taken immediately to the wrapping means without passing through the slicing means.

28. In a loaf slicing and wrapping machine, the combination of a reciprocating ram for moving loaves one at a time through a slicing zone along a predetermined slicing path, an elevator adapted to come to rest in a lowermost position and onto which the sliced loaves are moved by said ram, another reciprocating ram adapted to move loaves onto said elevator from the opposite direction, and means for delivering loaves one at a time in front of said last mentioned ram, said elevator being movable substantially vertically from said lowermost position to deliver loaves one at a time to a wrapping level located above the level of said slicing path.

29. In a loaf slicing and wrapping machine, the combination of a reciprocating ram for moving loaves one at a time through a slicing zone along a predetermined slicing path, an elevator adapted to come to rest in a lowermost position and onto which the sliced loaves are moved by said ram, another reciprocating ram adapted to move loaves onto said elevator from the opposite direction, and intermittently operating side feed conveyor means movable in a direction at right angles to the travel of the last mentioned ram and adapted to advance loaves to a position in front of said ram when said ram moves to retracted position, said elevator being movable substantially vertically from said lowermost position to deliver loaves one at a time to a wrapping level located above the level of said slicing path.

30. In a wrapping machine, the combination of means for elevating an article along a given center line, wrapper feed mechanism adapted to feed a wrapper web across the path of said elevating means, adjustable means for stopping the feed of the wrapper web when its leading edge has travelled to different distances beyond said center line of travel of the elevating means, and web severing means adjustable along the course of the web to sever the web at different distances ahead of said center line.

31. In a wrapping machine, the combination of means for elevating an article along a given center line, wrapper feed mechanism adapted to feed a wrapper web across the path of said elevating means, web severing means adjustably movable along the course of the web ahead of said center line, and means for automatically adjusting said wrapper feed mechanism in accordance with the position of said severing means to feed the wrapper web to a distance beyond said center line substantially equal to the distance between said severing means and said center line.

32. In a wrapping machine, the combination of means for elevating an article along a given center line, and wrapper feed and severing mechanism for intermittently feeding a wrapper web across the path of said elevating means and severing it to provide a wrapper blank positioned over said elevating means, said wrapper feed and severing mechanism being adjustably movable along the course of the wrapper web to sever said web at different distances from said center line and embodying means for simultaneously automatically adjusting the mechanism to feed the leading edge of the web to substantially equal distances beyond said center line prior to severing.

33. In a wrapping machine, the combination of means for elevating an article along a given center line, and wrapper feed and severing mechanism for intermittently feeding a wrapper web across the path of said elevating means and severing it at a distance ahead of said center line substantially equal to the distance the leading edge of the web is moved beyond said center line, said wrapper feed and severing mechanism being adjustably movable along the course of the wrapper web to regulate the distance ahead of said center line at which the web is severed, and embodying means for simultaneously automatically increasing or decreasing the length of web fed by substantially twice the distance of such adjustment movement as said mechanism is moved away from or toward said center line.

34. In a bread slicing and wrapping machine, the combination of a generally horizontally travelling infeed conveyor, means for receiving loaves one at a time from the discharge end of said conveyor and lowering said loaves to a slicing level, a reciprocating ram for engaging said loaf in its last mentioned position and moving it along said slicing level through a slicing zone in the same general direction as it was moved by the infeed conveyor, an elevator adapted to receive the loaf from said ram after passing through said slicing zone, said elevator being movable to raise the sliced loaf into engagement with a wrapper blank positioned over it and to raise said loaf and blank to a wrapping level, loaf advancing means for moving said loaf along said wrapping level in a direction contrary to the direction of infeed while the wrapping of the loaf is completed, and an outfeed conveyor adapted to receive the wrapped loaves from said loaf advancing means and to deliver them from the machine.

35. In a wrapping machine, the combination of a frame, means supported on said frame for moving an article along a given center line, wrapper web feed and severing mechanism adapted to feed a wrapper web across and beyond said center line in a position to be engaged by the article moved along said line, said wrapper feed and severing mechanism being movable relatively to the frame along the course of said wrapper web, driving means for said wrapper mechanism, a clutch controlling said driving means, means for engaging and disengaging said clutch, and means for actuating said severing means following disengagement of said clutch.

36. In a wrapping machine, the combination of a frame, means supported on said frame for moving an article along a given center line, wrapper web feed and severing mechanism adapted to feed a wrapper web across and beyond said center line in a position to be engaged by the article moved along said line, said wrapper feed and severing mechanism being movable relatively to the frame along the course of said wrapper web, driving means for said wrapper mechanism, a clutch controlling said driving means, means for engaging and disengaging said clutch, said means being adjustable to regulate the time of engagement of said clutch, and means for actuating said severing means following disengagement of said clutch.

37. In a wrapping machine, the combination of a frame, means supported on said frame for moving an article along a given center line, wrapper web feed and severing mechanism adapted to feed a wrapper web across and beyond said center line in a position to be engaged by the article moved along said line, said wrapper feed and severing mechanism being movable relatively to the frame along the course of said wrapper web, driving means for said wrapper mechanism, a clutch controlling said driving means, means for engaging and disengaging said clutch, said means being adjustable to regulate the time of engagement of said clutch in accordance with the position of the wrapper feed and severing mechanism along the course of the wrapper web, in such manner that the leading edge of the wrapper will be fed a distance beyond said center line substantially equal to the distance between said severing means and center line, and means for actuating said severing means following disengagement of said clutch.

38. In a wrapping machine, the combination of a frame, means supported on said frame for moving an article along a given center line, wrapper web feed and severing mechanism adapted to feed a wrapper web across and beyond said center line in a position to be engaged by the article moved along said line, said wrapper feed and severing mechanism being movable relatively to the frame along the course of said wrapper web, driving means for said wrapper mechanism, a clutch controlling said driving means, clutch engaging and disengaging means automatically adjustable to regulate the time of engagement of the clutch in accordance with the position of the wrapper feed and severing mechanism along the course of the wrapper web in such a manner that the leading edge of the wrapper will be fed a distance beyond said center line substantially equal to the distance between said severing means and center line, said means comprising a driven rotating cam, a cam follower therefor, and an operative connection between said cam follower and said clutch, said follower being adjustably movable to different operative positions with relation to said cam, and said cam being shaped to effect movement of the cam follower to disengage the clutch at a given cam position for all positions of adjustment of the cam follower but to effect movement of the cam follower to engage the clutch at different cam positions for different positions of adjustment of said follower, means for adjusting the position of the cam follower with relation to the cam as the wrapper feed and severing mechanism is adjusted along the course of the wrapper web, and means for actuating said severing means following disengagement of said clutch.

39. In a wrapping machine, the combination of a frame, means supported on said frame for moving an article along a given center line, wrapper web feed and severing mechanism adapted to feed a wrapper web across and beyond said center line in a position to be engaged by the article moved along said line, said wrapper feed and severing mechanism being movable relatively to the frame along the course of said wrapper web, driving means for said wrapper mechanism, a clutch controlling said driving means, means for engaging and disengaging said clutch, said means comprising a driven rotating cam, a cam follower therefor, and an operative connection between said cam follower and said clutch, said follower being adjustably movable to different operative positions with relation to said cam, and said cam being shaped to effect movement of the cam follower to disengage the clutch at a given cam position for all positions of adjustment of the cam follower but to effect movement of the cam follower to engage the clutch at different cam positions for different positions of adjustment of said follower, and means for actuating said severing means following disengagement of said clutch.

40. In an article wrapping machine, means for transporting articles to be wrapped along a given path of travel, wrapper feed mechanism adapted to intermittently feed a wrapper web across said path of travel to a position with its leading edge positioned a given distance beyond said path, means operative prior to arrival of the loaf to be wrapped at the wrapping mechanism for starting said wrapper feed mechanism and for stopping same when the leading edge of the web has been fed to said given distance beyond said path of loaf travel, means for severing the web at a substantially equal distance on the other side of said path of travel following stopping of said feed mechanism, releasable means for preventing operation of the wrapper feed starting means, and trip means actuated by an article being carried forward on said article transporting means for releasing said releasable means to permit the wrapper feed mechanism to be started.

41. In an article wrapping machine, the combination of means for transporting articles along a predetermined path of travel, wrapper feed mechanism adapted to feed a predetermined length of wrapper web across the path of said articles, means for severing said web at a predetermined distance back of its leading edge to form a wrapper blank, means for starting the feeding action of said wrapper feed mechanism and for stopping same when said predetermined length of web has been fed, said last mentioned means being synchronized with said article transporting means to start and stop the web feeding mechanism prior to arrival of a given article at the location of the wrapper blank, releasable means for preventing operation of said wrapper feed starting means, and means actuated by an article being carried forward on said article transporting means for releasing said releasable means to permit the wrapper feed mechanism to be started.

42. In an article wrapping machine, the combination of means for transporting articles to be wrapped along a predetermined path of travel, wrapper feed mechanism adapted to feed a wrapper web across said path, means for severing said web back of its leading edge to form a wrapper blank, wrapper feed control means for starting and stopping the feeding action of said wrapper feed mechanism, said control means being adjustable to vary the time of starting of the wrapper feed mechanism to regulate the length of wrapper web fed, releasable means normally preventing said control means from starting said wrapper feed mechanism, and means actuated by an article being carried forward on said article transporting means for releasing said releasable means to permit said wrapper feed mechanism to be started.

43. In an article wrapping machine, the combination of means for transporting articles along a predetermined path of travel, wrapper feed mechanism adapted to feed a wrapper web across said path of travel, web severing means adjustably movable toward and from said path of travel, wrapper feed control means for starting and stopping the feeding action of said wrapper feed mechanism, said control means being automatically adjustable to vary the time of starting of the wrapper feed mechanism as the web severing means is moved toward or from the path of travel of the articles to decrease or increase, respectively, the length of web fed, releasable means for preventing said control means from starting said wrapper feed mechanism, and means actuated by an article being carried forward on said article transporting means for releasing said releasable means to permit said wrapper feed mechanism to be started.

44. In an article wrapping machine, the combination of means for transporting articles along a predetermined path of travel, wrapper feed mechanism adapted to feed a wrapper web across said path of travel, web severing means adjustably movable toward and from said path of travel, and wrapper feed control means for starting and stopping the feeding action of said wrapper feed mechanism, said control means being automatically adjustable to vary the time of starting of the wrapper feed mechanism as the web severing means is moved toward or from the path of the articles to decrease or increase, respectively, the length of web fed.

45. In a machine of the character described, the combination of a plurality of reciprocable loaf engaging members adapted to engage and advance a loaf in timed sequence, a driven cam shaft, a plurality of angularly related cams on said cam shaft adapted to operate said loaf engaging and moving members in predetermined timed sequence, follower members engaged by said cams, reciprocable racks moved by said follower members, pinions meshing with said racks, revoluble shafts carrying said pinions, and driving interconnections between said shafts and corresponding reciprocable loaf engaging members.

46. In a machine of the character described, the combination of a plurality of reciprocable loaf engaging members adapted to engage and advance a loaf in timed sequence, a driven cam shaft, a plurality of angularly related cams on said cam shaft adapted to operate said loaf engaging and moving members in predetermined timed sequence, follower members engaged by said cams, a corresponding plurality of concentric nested relatively rotatable shafts, shafts outside the innermost shaft being hollow, said shafts extending parallel to said cam shaft, pinions on said shafts, reciprocable racks meshing with said pinions and operated by said cams, and driving interconnections between the shafts and corresponding reciprocable loaf engaging members.

WILLIAM WALTER HARTMAN.